Figure 2A:
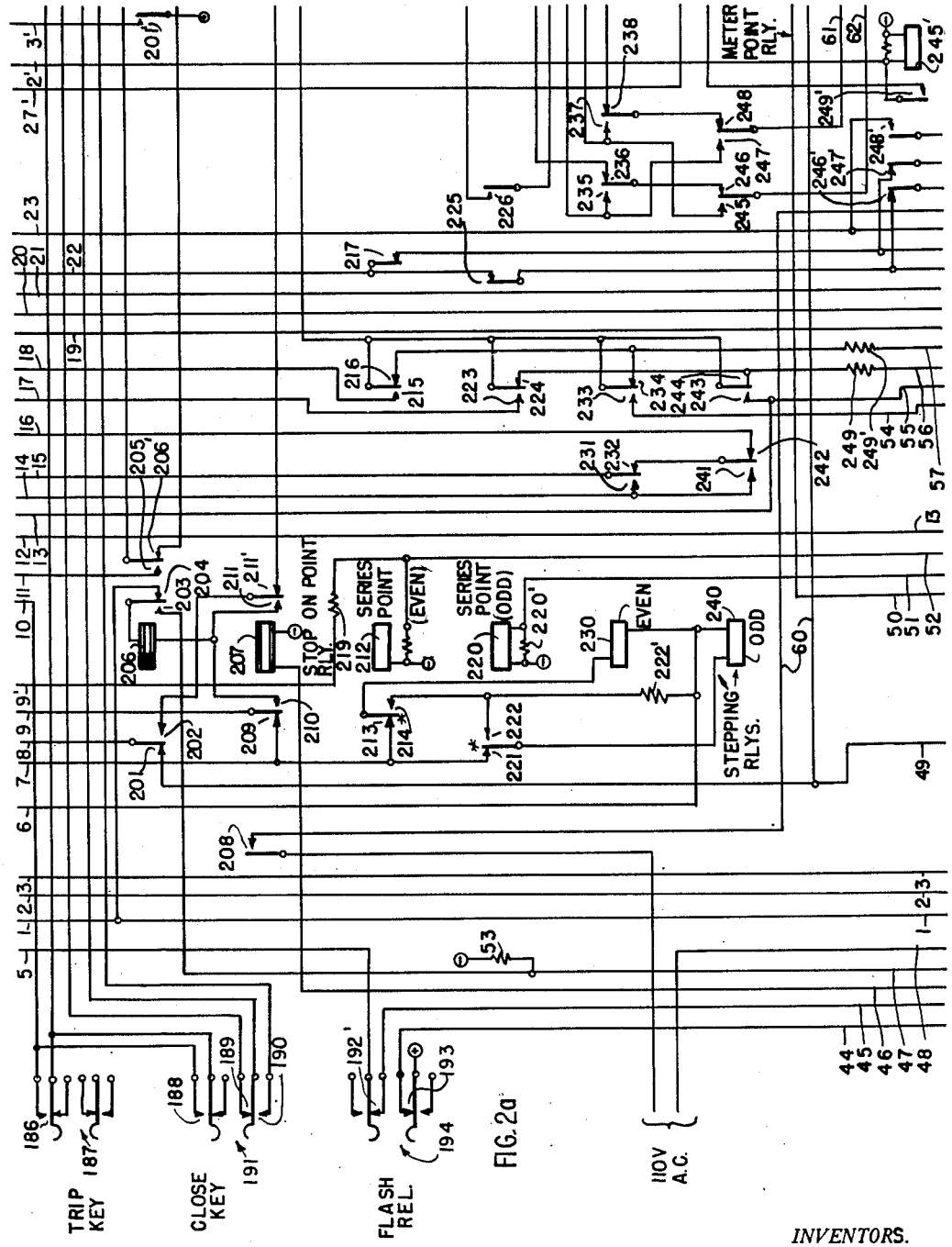

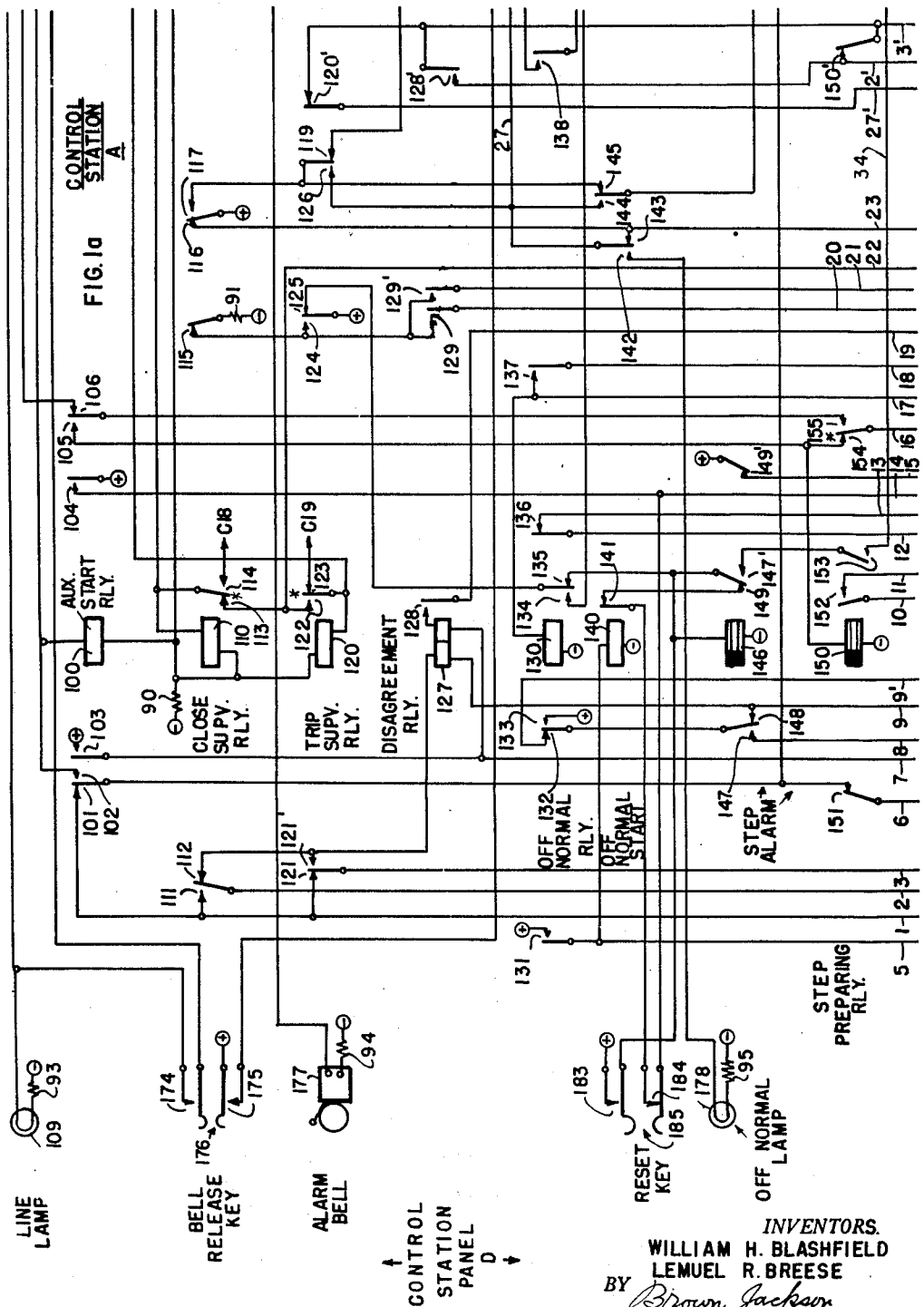

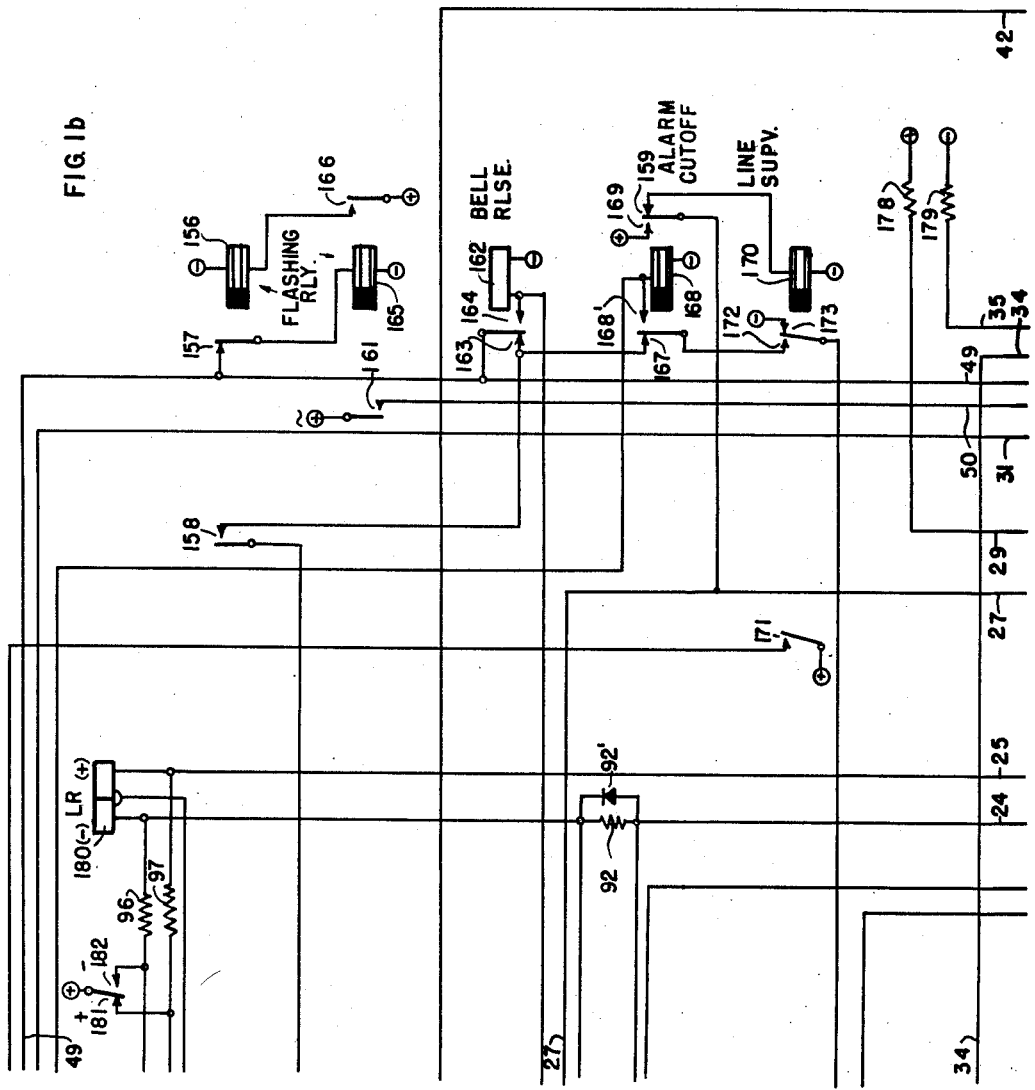

May 25, 1954

W. H. BLASHFIELD ET AL 2,679,637

SYNCHRONOUS SUPERVISORY CONTROL SYSTEM

Filed June 6, 1950

12 Sheets-Sheet 3

INVENTORS.
WILLIAM H. BLASHFIELD
LEMUEL R. BREESE
BY Brown, Jackson,
Boettcher & Driemer
ATTORNEYS

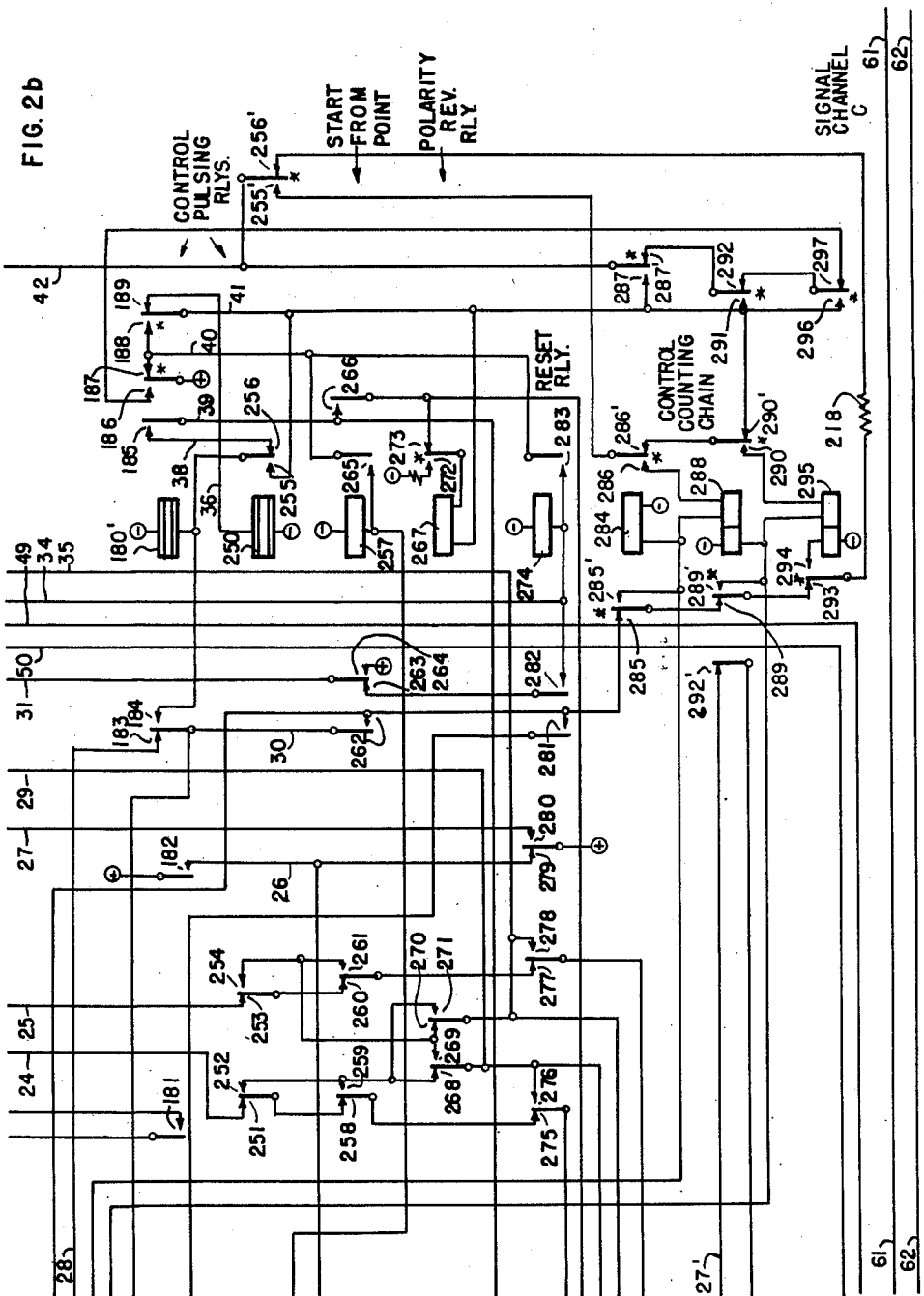

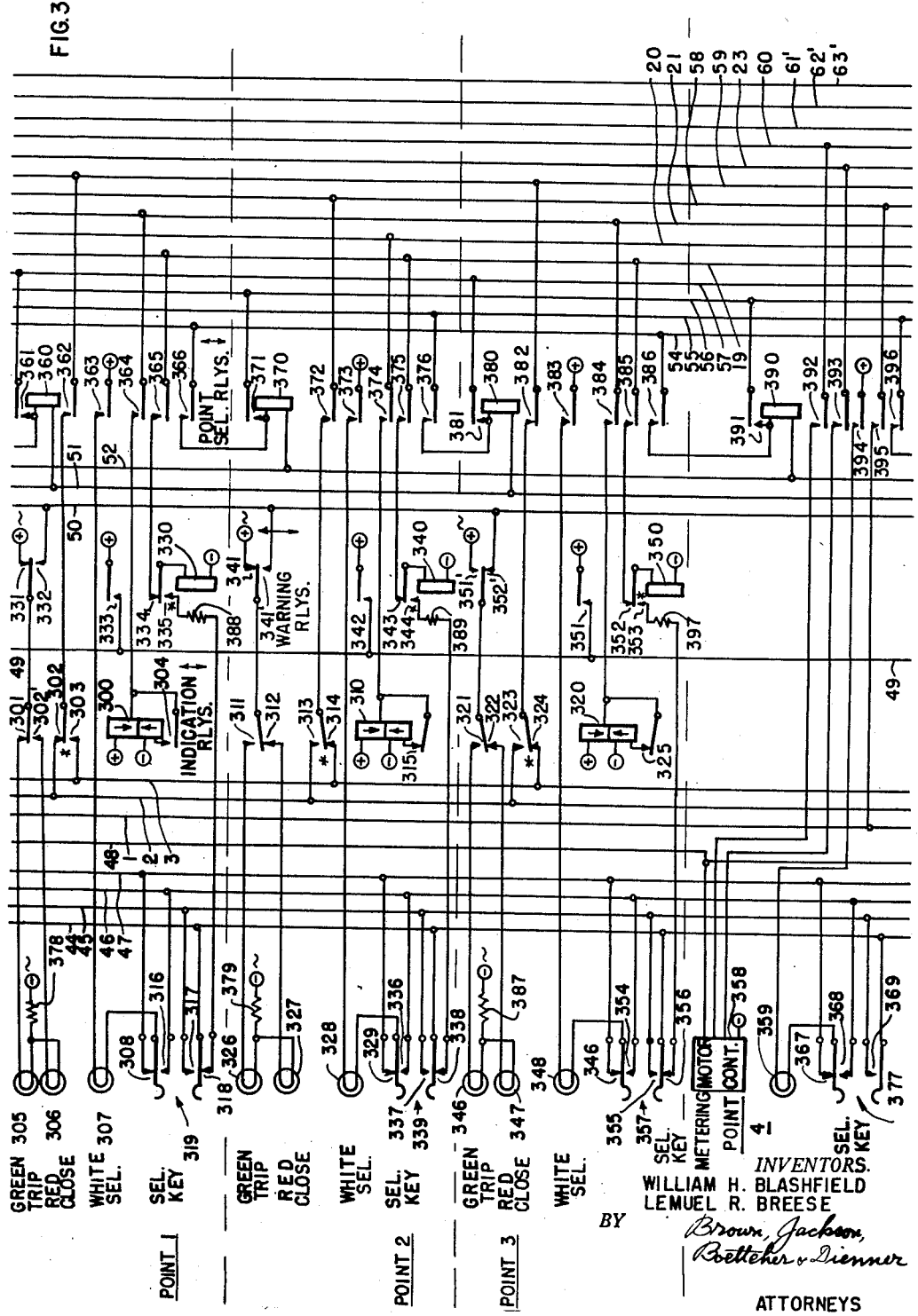

May 25, 1954  W. H. BLASHFIELD ET AL  2,679,637
SYNCHRONOUS SUPERVISORY CONTROL SYSTEM
Filed June 6, 1950  12 Sheets-Sheet 6
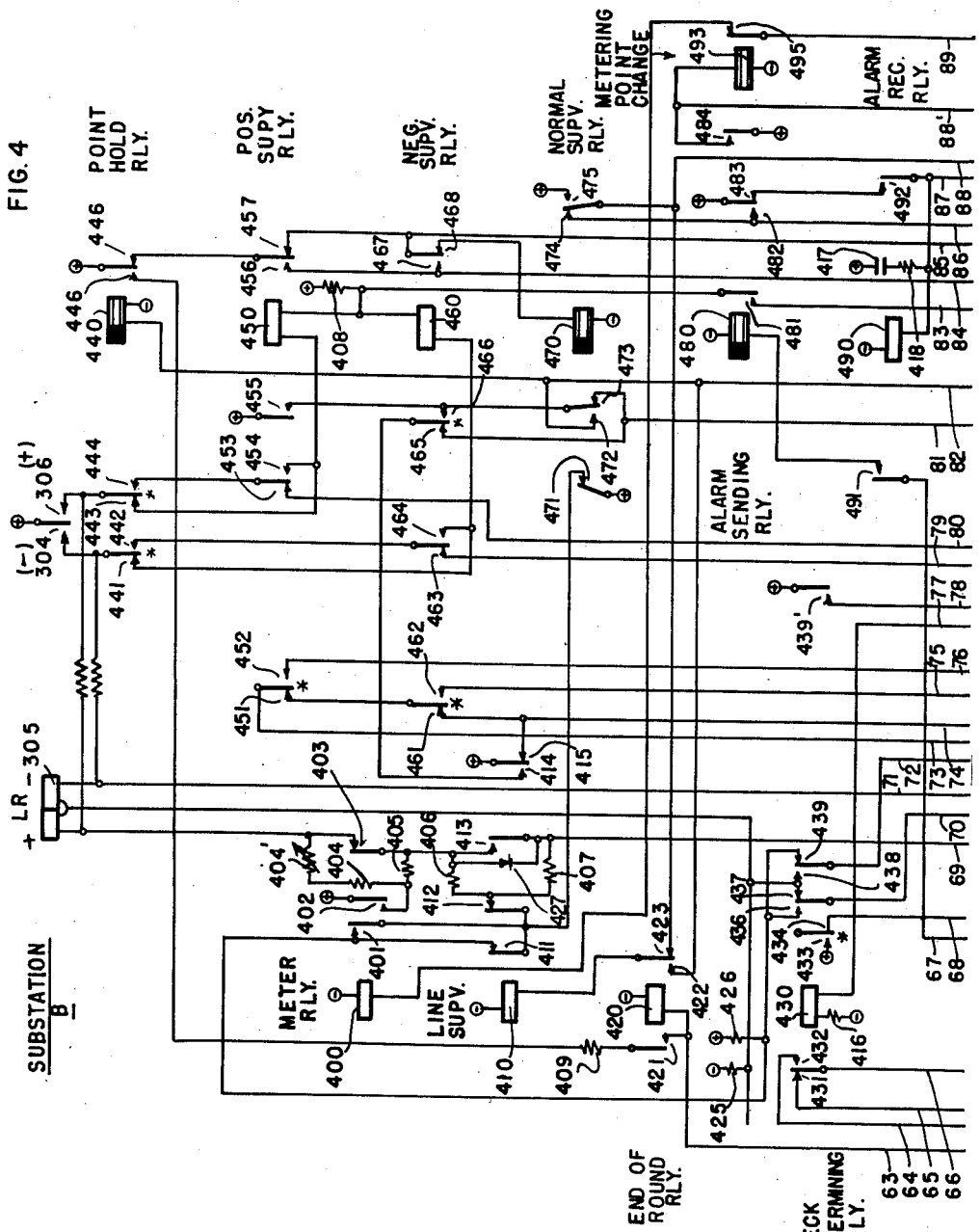
INVENTORS.
WILLIAM H. BLASHFIELD
LEMUEL R. BREESE
BY Brown, Jackson,
Boettcher & Dienner
ATTORNEYS

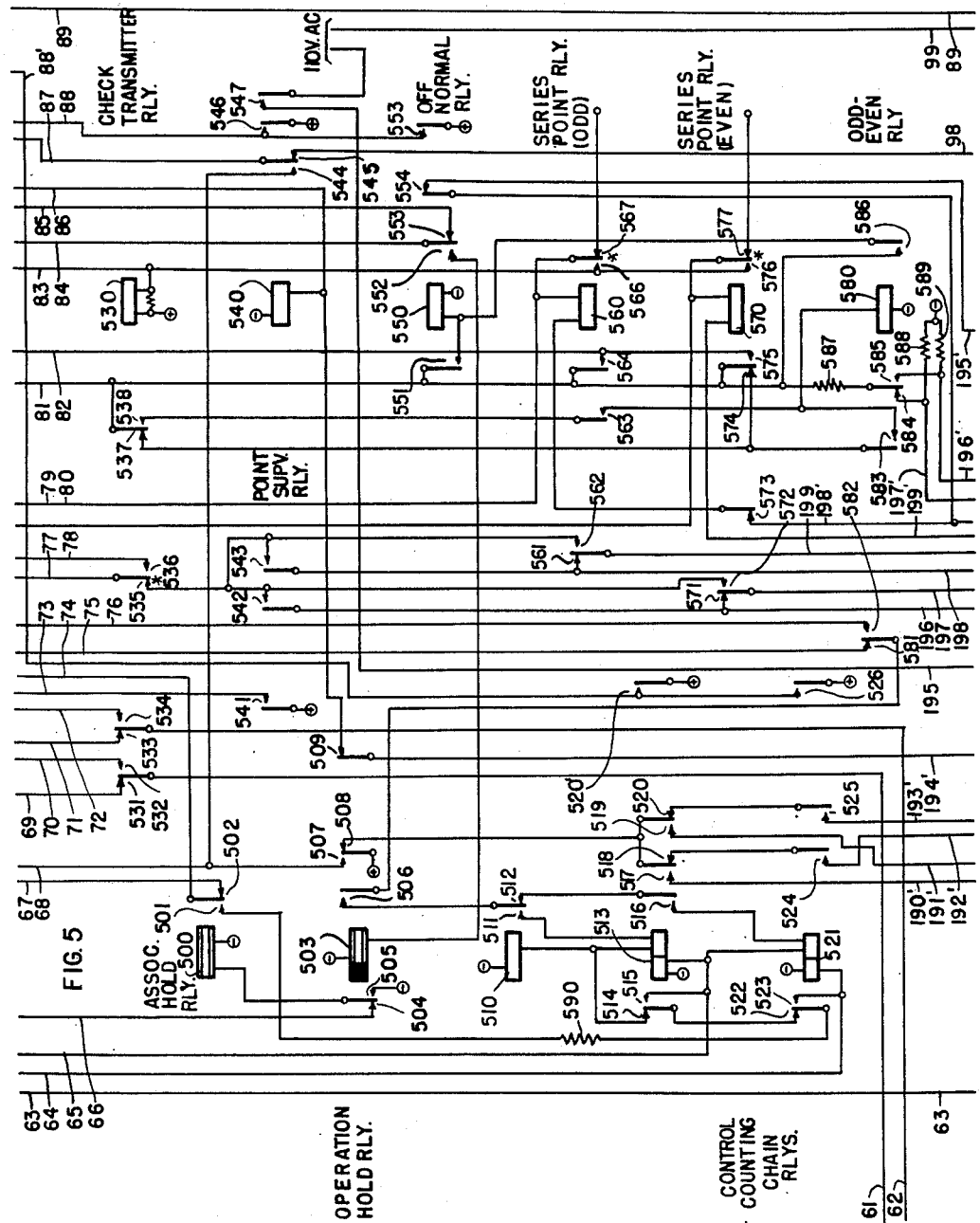

INVENTORS.
WILLIAM H. BLASHFIELD
LEMUEL R. BREESE

ATTORNEYS

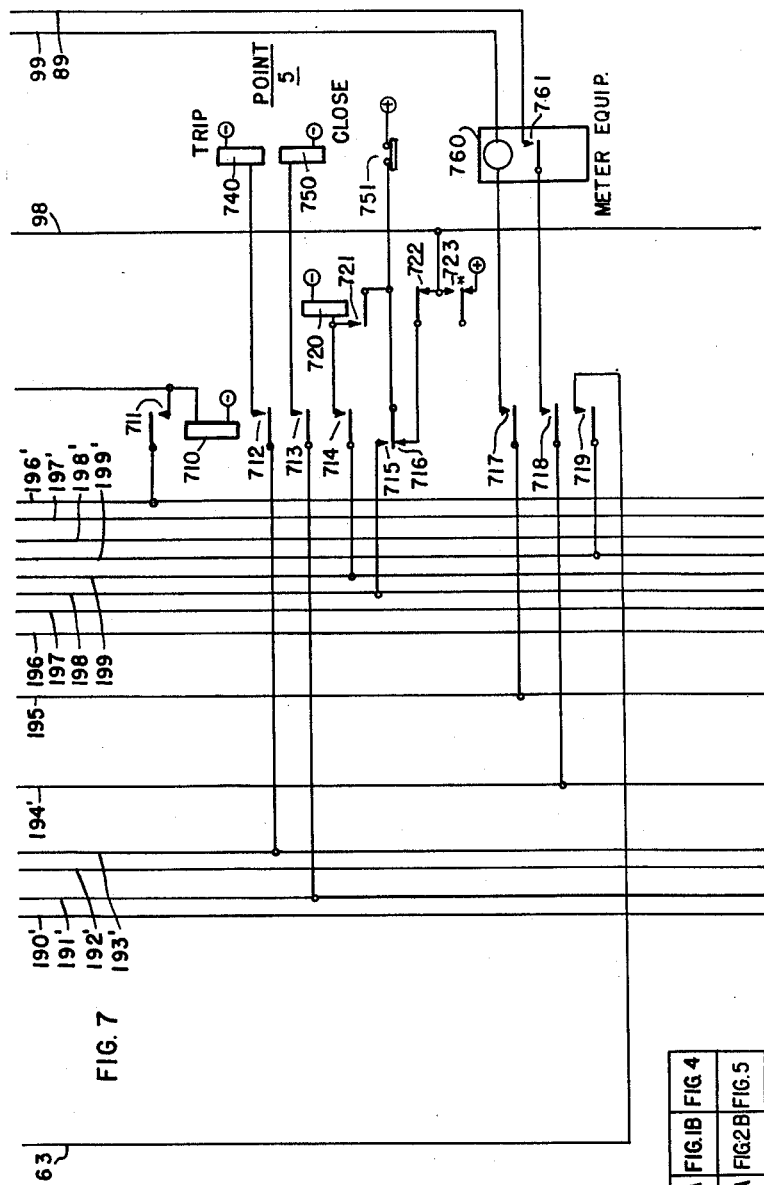

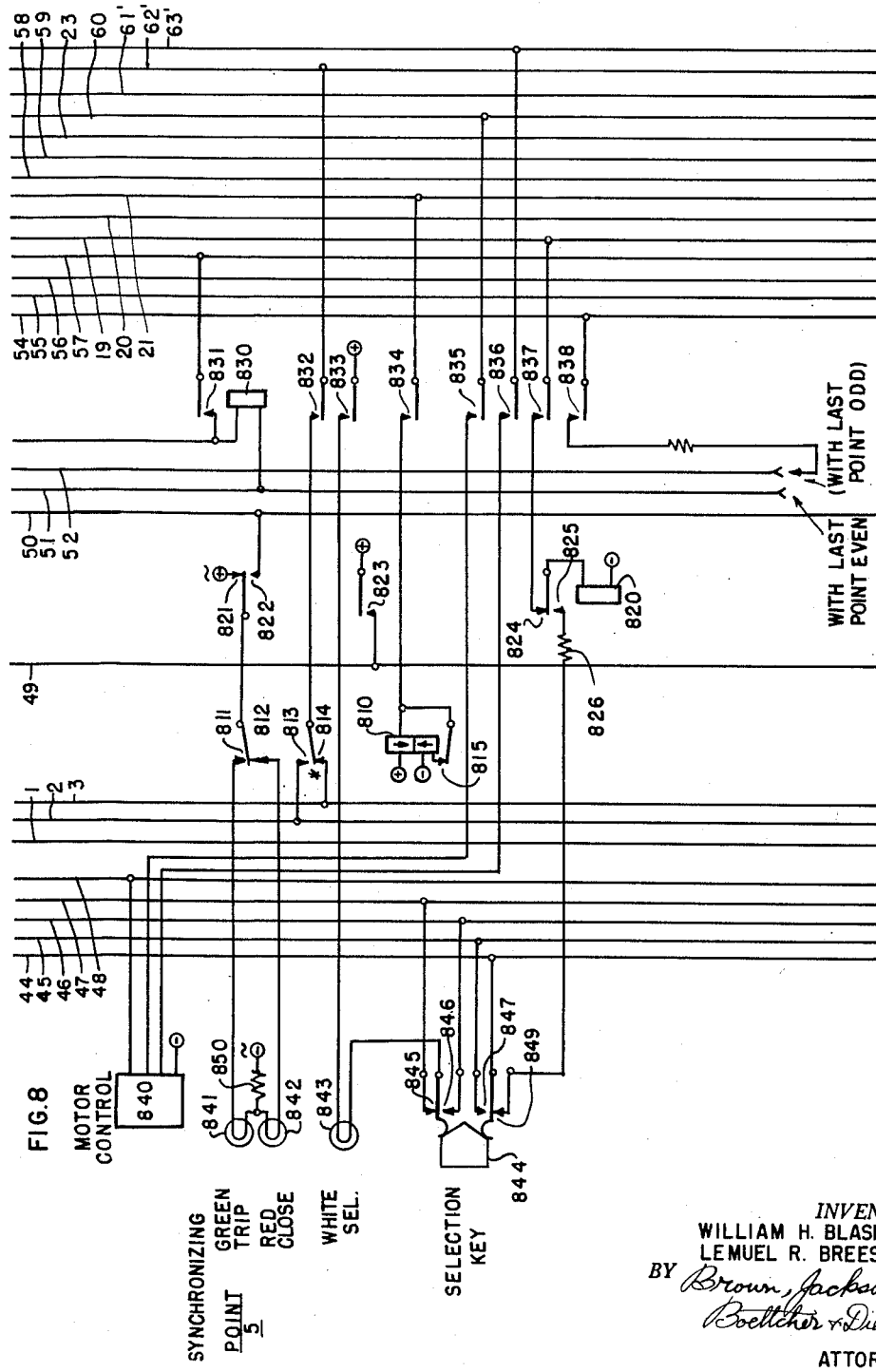

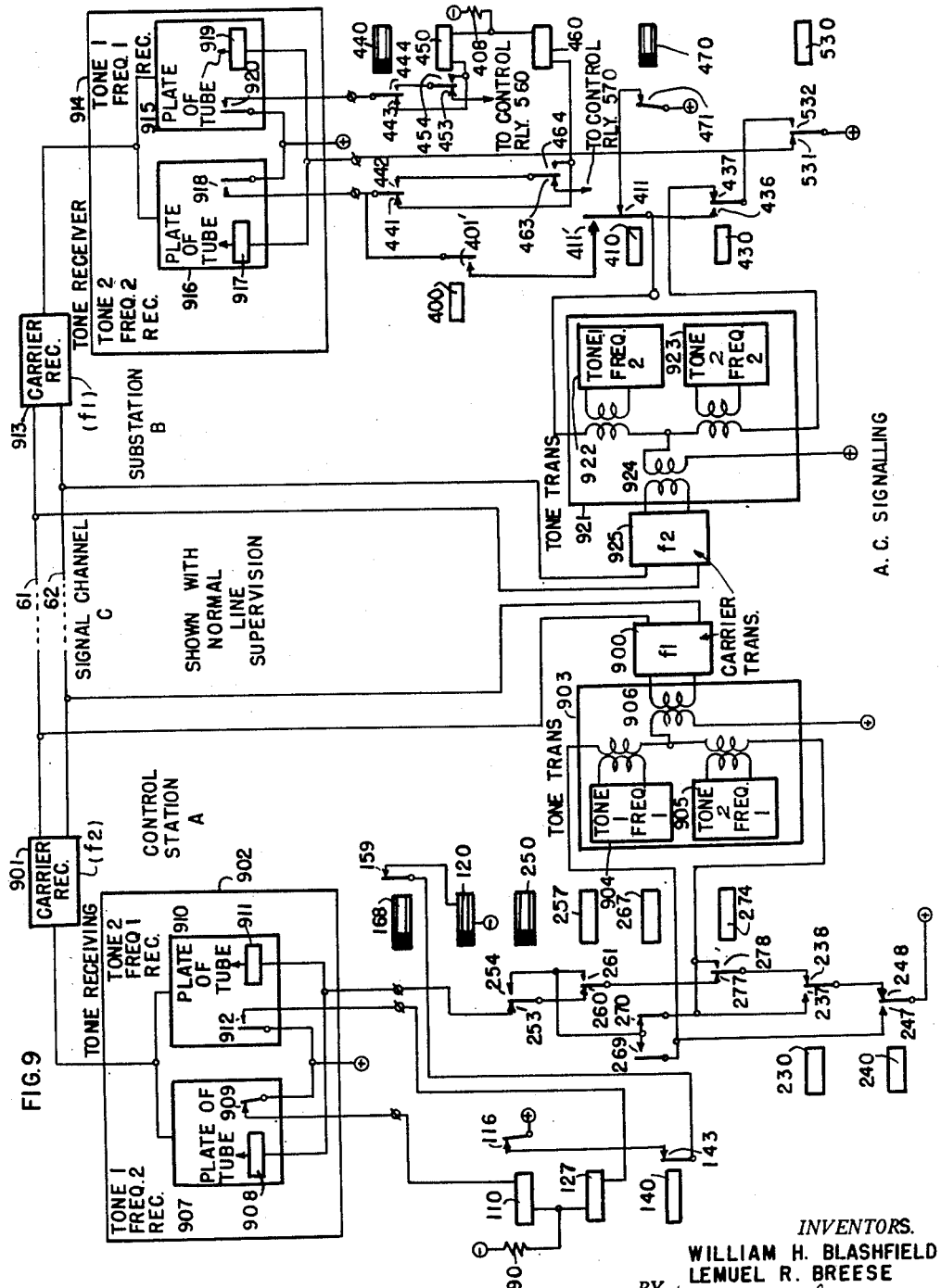

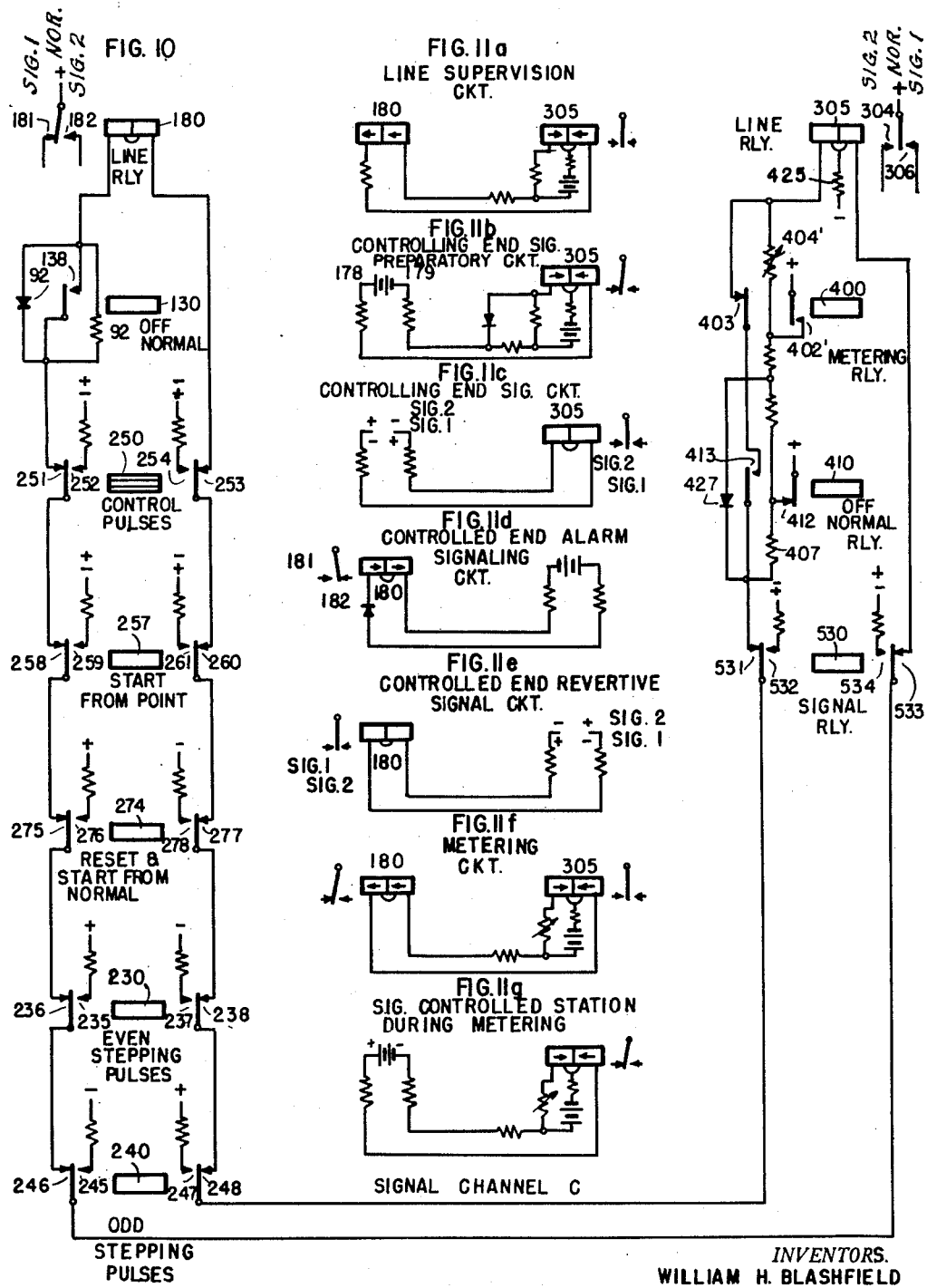

Patented May 25, 1954

2,679,637

UNITED STATES PATENT OFFICE 2,679,637

SYNCHRONOUS SUPERVISORY CONTROL SYSTEM

William H. Blashfield and Lemuel R. Breese, Galion, Ohio, assignors to The North Electric Manufacturing Company, Galion, Ohio, a corporation of Ohio Application June 6, 1950, Serial No. 166,390

54 Claims. (Cl. 340—163)

The present invention relates, in general, to an improved type of supervisory control system, and particularly, to a novel supervisory system of the synchronous control type.

The main purpose of a supervisory remote control system is to provide an arrangement in which a series of remotely disposed operating units, such as water valves, flood gates, circuit breakers, transformer switching units, etc., may be conveniently operated to various of predetermined positions by the simple expedient of operating individual push-button controls located at a centralized control station. Inasmuch as many controlled units, such as circuit breakers, are arranged to change positions automatically responsive to the occurrence of an unusual operating condition, practical supervisory control systems also desirably include supervisory means which are capable of keeping the control station informed of the condition of the controlled apparatus at all times. Other functions of a supervisory system may include telemetering of various forms of information to the control station which are necessary to the safe accomplishment of accurate control by the attendant at his remote position.

There are, generally speaking, two fundamental methods of accomplishing selective control of remotely located units, that is, the so-called direct selection method in which each of the control units has an individually assigned code number (such as the subscribers in a telephone exchange) and selection of a desired one of the units is effected by transmission of the assigned code to the distant point over an interconnecting signal channel. As the desired unit is selected, further codes are then transmitted to effect the desired operation, each operation having a particular assigned code. An improved system of this general type has been set forth in the application of Breese et al., Serial No. 153,962, now Patent No. 2,616,959, filed April 4, 1950, and assigned to the assignee of this invention. Such type of equipment is extremely fast and reliable in operation and lends itself especially well to most any type of field installation.

While the direct selection type of equipment is adapted for use in all types of field installations, the complexities involved in the provision of such type operating structure tends to raise the overall costs of the equipment. In smaller types of exchange in which only a comparatively few number of points are to be controlled, the inherent advantages of the direct selection type equipment, such as greater speed and flexibility, did not seem to justify the cost of the equipment which is required in the effecting of direct selection type control and accordingly, a more economical type of supervisory system has been developed which is known in the field as the "synchronous selection" or "step-by-step" system.

In a synchronous type system a series of points are located at the control station and the substation, the substation points controlling operation of the units to be controlled, and the control station points locating the control apparatus. The equipment at both stations is arranged to step over the points of the system together in a given sequence, revertive check signals being transmitted by the substation after each step has been taken to indicate to the control station that the step has been taken thereat and that the equipment is prepared for further stepping. Alternate ones of the stepping signals as transmitted by the control station are generally different in characteristic to prevent out-of-line stepping of the equipment at both of the stations.

In the movement of synchronous equipment to select one of the units at the distant substation for control purposes, the equipment is stepped from a normal rest condition by operation of an assigned selection key and then steps over each unit in turn until the point in the sequence assigned to the desired unit is reached. As the equipment is then brought to rest on such point, a desired control operation may be accomplished by the operation of a further control key to effect transmission of assigned codes over the interconnecting channel, each control operation having its own assigned code.

As the desired control operation is accomplished, the equipment is then released from the point and continues to step over the remaining points in synchronization at the control station and substation and thereafter assumes a normal rest condition.

The synchronous systems which have been developed heretofore have had several serious drawbacks which have become increasingly more apparent with the advance of the communication field in recent years. For example, with the development of the newer alternating current signalling methods, such as carrier and radio communication, and the more extensive uses thereof in supervisory control work, the synchronous systems which have been known heretofore did not readily lend themselves to adaptation for the alternating current type of signalling. Although the use of D. C. type signalling is far more prevalent in the field, certain areas are incompatible to such type signalling and the use of A. C. signalling in such areas is a definite requirement. It is a particular object of the invention, therefore, to provide a more flexible and reliable type supervisory control system which is readily adapted for use with either alternating current or direct current type signalling, and which effects improved supervisory control in its increased flexibility.

Other shortcomings of previously developed synchronous systems were inherent in the signalling circuit which were previously used, the accomplishment of both the supervision and the selective control having generally been effected over a group of so-called "series line circuits" which generally comprise the extension of four wires (a signalling wire, a control wire, a supervisory wire and a common return wire) between the substation and control station. The drawbacks of a four wire control system, as to maintenance and economy of operation and installation, are well known to those skilled in the art, and it is an ancillary object of the present invention to provide a synchronous supervisory system which is capable of providing both the supervisory and selective control of an improved type over a two-wire signalling channel.

A feature of the novel synchronous system disclosed herein is the novel signalling system which underlies the accomplishment of supervisory control over a two wire channel, and which actually accomplishes control in a more reliable, dependable and more expeditious manner than has been heretofore known. For example, the speed of stepping in the novel system as a result of the use of the novel signalling equipment in cooperation with new and novel control equipment has been increased to approximately ten steps per second, which compares favorably with the speed of operation accomplished in the direct selection type of equipment.

A further feature of the invention is the manner in which various control functions may be effected at the substation points. Certain points may be arranged solely for control purposes or alternatively for metering purposes while other points may be adapted to accomplish both control and metering functions. The accomplishment of these various control supervisory functions over a single two-wire interconnecting signal channel is a new development in the art, and is believed to be a definite progressive advancement in the field.

Many other improvements which are inherent in the new and novel supervisory remote control system will become apparent with reference to the following drawings and specification in which:

Figures 1 through 8, inclusive, show in detail when arranged in the manner shown in Figure 12 the novel supervisory control system of the invention.

Figure 9 illustrates in schematic form the manner of adapting the disclosed equipment in Figures 1 to 8 for use with an alternating current type signalling system, and Figures 10 and 11a to 11g illustrate in skeleton form the effective signalling circuits during various time periods in the signalling sequence.

*Table of contents*

General description
General operation
Relay functions
Normal standby condition of equipment
Line supervision—general description
Alarm circuit energization responsive to a line fault occurrence
Stepping of equipment off-normal
Preparing equipment for stepping responsive to receipt of alarm from substation
Release of the stepping alarm relay to initiate stepping
Transmission of start from normal signal (long negative)
Transmission of first stepping signal by control station (positive for odd steps)
Substation sends revertive signal to indicate completion of first step
Control station responds to revertive signal following first stepping impulse
Transmission of second stepping signal by control station (negative for even steps)
Substation steps to second point
Transmission of third stepping signal by control station
Substation response to receipt of third stepping signal
Transmission of fourth stepping signal
Substation response to fourth stepping signal
Transmission of fifth stepping signal
Substation reponsive to receipt of fifth stepping signal
Control station response to revertive signal on fifth step
Response at substation to receipt of final supervisory pulse
Recycling of equipment
Stepping responsive to occurrence of other condition
   (a) Operation of reset key
   (b) Temporary loss of battery at controlling station
   (c) Stepping of equipment responsive to operation of a selection key
Automatic trip of circuit breaker while stopped on a point
Automatic closure of circuit breaker while stopped on a point
Tripping breaker on even point
Closing breaker on even point
Closing breaker on odd point
Tripping breaker on odd point
Stopping on metering point
Stepping of equipment to a control and supervisory point having metering facilities
Automatic trip while on control and supervisory point having metering facilities
Controlling closure of breaker on control and supervisory point having metering facilities
Controlling trip of breaker on control and supervisory point having metering facilities
Releasing from a point by restoration of selection key
Releasing from a point by operation of reset key
Condition of stall
Alternative methods of signalling
  General description
  Operation of system
  Signal comparing chart
Conclusion
Claims

*General description*

With reference to Figures 1 to 8, inclusive, there is shown thereat a synchronous supervisory system comprising a control station A interconnected with a substation B by a two-wire signal channel C. In the present disclosure, the system is arranged to control five apparatus units which are located at the five points of the substation, it being understood that the number of points and the corresponding number of apparatus units to be controlled has been limited to five in the present disclosure for the purpose of brevity and conciseness, and that such disclosure is not to be considered as a limitation to the size of the control system.

The control station includes a control panel D, which is divided into a series of control and indicating panels, certain of which is individual to one of the points located at the substation and others of which are common to all of the points. That is, point 1 at the control station is arranged to control the circuit breaker at point one at the substation. Each of the individual panels may comprise an escutcheon plate which mounts an individual selection key, such as selection key 319 at point 1, a white selection lamp, such as 307, a red close indication lamp, such as 306, and a green trip indication lamp, such as 305. The red close indication lamp 306 is illuminated whenever the circuit breaker at substation point 1 is in the closed position, the green trip indication lamp 305 is illuminated whenever the circuit breaker at substation point 1 is in the tripped position, and the white selection lamp 307 is momentarily operated as the equipment steps over point one and is held operated whenever the equipment is brought to rest at such point.

Points 1, 2 and 3 of the system are shown as control supervisory points; that is, points which are effective to select and control the closing or tripping operations of the circuit breaker at the associated substation point and the provision of information at all times of the position of the breaker. Point 4 is illustrated as a metering point at which the metering of various predetermined load characteristics at the substation are automatically accomplished with movement of the equipment to that point by the operation of the associated selection key 377. Point 5 is illustrated as being a so-called "synchronizing" point, that is, a point at which both metering and selective control of a circuit breaker at point five may be accomplished. As the equipment is moved to such point responsive to operation of the selection key 844 which is individual thereto, automatic metering will be effected. Selective control may be accomplished as at the other points by moving the equipment to such point and operating the common control keys.

The indication lamps at each of the points in addition to indicating the position of the controlled apparatus units at the substation also arranged to indicate an automatic change of position of the associated device at the substation at the time of occurrence. For example, if a circuit breaker is tripped by a protective relay at the substation, the green lamp at the associated point of the control station is flashed and an alarm bell is sounded. If a circuit breaker which is equipped with an automatic closure should trip and reclose successfully, the green lamp on the escutcheon at the associated point at the control station is first momentarily flashed, and a brief period thereafter the red lamp is flashed.

The operating equipment at each control station point includes a point selection relay (such as selection relay 360 at point 1), a warning relay such as 330, and an indication relay such as 300. The selection relay for a point is operated whenever the equipment steps thereto, and prepares the equipment at the point for operation. The indication relay at each point is operated or restored at each point in accordance with the position of the associated circuit breaker at the substation. It is noted at this time that the indication relays are of the type which are operated by applying negative battery to the windings and released by applying positive battery to the windings. The lower winding has fewer turns than the upper winding so that the relay can lock up with the two windings in series even though they are opposing. When positive potential is applied the upper winding is shunted out and the opposing current flow through the lower winding is increased to cause the relay to quickly release.

The control station also includes five common control units including a close key, a trip key, a reset key, an alarm release key and a flash release key. The two control keys, the trip key 187 and close key 191 are arranged to transmit assigned impulse codes for effecting the selective change of position of the controlled apparatus unit device. For example, assuming the equipment has been brought to rest on point 3 by operation of the selection key which is individual thereto, operation of the close key would effect the transmission of a close code impulse set to effect the closure of the circuit breaker at substation point three and operation of the trip key 187 would effect transmission of a trip code impulse set to effect the opening of the circuit breaker thereat.

The third common key is designated as a reset key. Operation of this key causes the system to step over each of the points to verify the existing indications of the positions of the controlled devices and accordingly the key may also be considered as a master check key. As the equipment steps over each of the points, the position indicating lamps are checked at each step, and in the event of variance between the position of the equipment at the substation and the indication provided by the control panel, the equipment will automatically operate to bring the indicating panel into conformity with the position of the unit at the substation.

The fourth common key is operated to silence the audible alarm which is initiated when any supervised device changes position other than by operation of the supervisory control equipment.

The fifth common key is operated to cause any position indicating lamp or lamps which may be flashing as a result of the automatic change of position of its associated unit at the substation to be lighted continuously. Further operations of the equipment at the control station panel are brought out in more detail in the following disclosure.

The apparatus units at the substation are shown, for purposes of illustrations, as a series of conventional circuit breaker units, it being understood that other types of equipment, such as flood gates, transformer switch, water valves, etc., may be disposed for control at the points in a similar manner.

The opening and closing of a valve, or the starting or stopping of a motor, for instance, is comparable to the closing or tripping of the circuit breaker and would be accomplished in the very same manner. Increment regulation, such as is commonly used in the control of water valves, may likewise be effected without material change of the disclosed arrangement. In such arrangements, valves are opened or closed only a predetermined amount with each operation of the close or open key, and metering is normally included therewith to indicate to the control station the amount of change of position which is accomplished with each operation of the control key. Such equipment has not been shown herein for purposes of brevity and conciseness, it being understood that such equipment is well known in the art and readily adapted for use herein.

Circuit breakers are well known in the art, and, accordingly, the mechanism and power handling contacts have not been shown herein, the illustration being restricted to a showing of the circuit breaker operating mechanisms, such as the close coil 675 for the circuit breaker at point 1, the trip coil therefore, such as 670, and the auxiliary switch contacts, such as 676, which are operated to the close position with closing of the operated circuit breaker, and which are operated to the open position with tripping of the associated circuit breaker.

Each point has associated therewith a point selection relay, such as 600 at point 1, and a point indication relay, such as 640. As indicated by its title, the point indication relay 640 indicates the position of its associated breaker, being operated whenever the associated breaker is closed and being restored whenever the associated breaker is tripped. With movement of the system to point 1, the point selection relay 600 is operated to prepare the circuit breaker thereat for selective operation and to extend the indication of the position of the circuit breaker at point 1 (as provided by the point indication relay 640) to the substation signalling equipment for transmission to the control station. Points 4 and 5 being metering points include metering equipment of the conventional impulse type, it being understood that voltage or current magnitude types of telemetering may likewise be included without requiring any material changes in the disclosed arrangement.

General operation

The control of the apparatus units at the substation is basically effected by the intertransmission of code signals over an interconnecting signal channel C, the signals being alternatively of an alternating current or direct current type. In considering the operation of the equipment in its broader aspects at this time, reference is made to D. C. signals of positive and negative polarity, it being understood that comparative signals exist in the alternating current arrangement as will be brought out more fully hereinafter. Also only one substation has been shown in the present disclosure in the interests of brevity and conciseness, it being apparent that through the use of separate sets of identifying signals and separate selecting units, several substations may be controlled by a single controlling station.

The signalling is accomplished in the D. C. embodiment of the arrangement by the transmission of codes comprising signals of positive and/or negative polarity over an interconnecting signal channel, a positive signal (signal 1) being considered herein as the application of positive potential to signal conductor 61 and negative potential to signal conductor 62. A negative signal (signal 2) is considered to comprise the application of potentials in the reverse order, that is, a negative signal on conductor 61 and a positive signal on conductor 62.

A line relay is connected to each end of the channel (180 and 305 respectively) and are arranged to respond in the manner set forth in Figures 10, and 11a to 11g inclusive. The line relays are of the polarized type which effects operation of an associated armature to two alternative positions from a neutral midpoint rest position, such type relay in one commercial embodiment being manufactured by Western Electric as a 215D type line relay. Current requirements for causing the relay to assume either off-normal position include: 4 milliamperes through two windings in series, 8 milliamperes through one winding and 8 milliamperes' difference with the windings in opposition.

Thus with transmission of signal one by the substation, control station line relay moves its associated armature to the signal one position (Figure 10) etc.

The signalling channel is normally supervised through the transmission of a continuous signal over the channel by the substation, a supervisory relay at the control office being normally energized thereby. Thus, if the transmission path or the substation power supply should fail, or be unfavorably disturbed, the energized office relay will release and a cooperative alarm unit thereat will be sounded. The line supervision pulse is, of course, automatically removed whenever the equipment is operated by supervisory or control equipment, and it is of particular interest to note that the operation of the control station to signal the substation is not restricted by the presence of the supervisory signal on the channel, such feature being the result of the use of a novel duplex signalling system, which will be more fully described hereinafter.

Stepping of the equipment across each of the system points is started as a result of the operation of a point selection key or a reset key, the loss of battery at the control station, or responsive to receipt of an alarm signal from the substation indicating that an automatic change of position of the device thereat or the loss of battery had developed thereat. The purpose of a stepping operation at these times is, of course, to pick up any change of position of the control devices which may have occurred during or as a result of the occurrence of the aforementioned conditions.

Briefly, the operation of the equipment in stepping across the system points is brought out quite clearly by a condition of the system operation responsive to operation of the reset key to accomplish a master check. Operation of the reset key 185 will effect the transmittal of a "start-from-normal" signal (long-negative) to the substation whereupon both stations are prepared for a stepping operation. It is noted that a long negative pulse is used for the start-from-normal signal, and that the equipment is operative to condition for a stepping operation only responsive to a pulse of long duration. Faulty operation of the system equipment with the occurrence of line transient impulses (usually of short duration) is thus prevented.

A brief period after preparation as a result of the transmission of the step from normal signal, the first stepping pulse (short positive for odd steps—short negative for even steps) is transmitted by the control station to effect the movement of the equipment at both stations to the first point. All stepping pulses originate at the control station, a signal of one polarity being employed for the odd numbered steps and a signal of another polarity being transmitted for even numbered steps, whereby the same signal is never repeated for consecutive steps. In this manner, the possibility of effecting the operation of the substation and the control station out of step is practically eliminated.

As the substation successfully advances to the first step responsive to receipt of the stepping signal, it is effective to transmit a supervisory or revertive impulse to the control station, the revertive impulse being of one or two polarities and accomplishing two functions in its transmission. First, the transmission of the reverted signal indicates to the control station that the step has been made and that a further stepping impulse may be transmitted, and, secondly, the nature of the polarity of the return signal is arranged to indicate the position of the circuit breaker at the first point (short positive signal if closed, and short negative signal if open).

As the revertive signal is received, the information conveyed by such signal is compared with the position indicated by the equipment on the control board, and if at variance, a conforming operation of the indication equipment is effected prior to the transmission of the next stepping impulse by the control station. The indication lamp, which is illuminated at the control panel point 1, is continuously flashed to attract the attention of the attendant, and remains in such condition until point one is selected by operation of the selection key or until such time as the flash release key is operated.

The stepping continues across the points in this manner, the white selection lamp lighting at each point as the equipment steps thereacross, the substation sending revertive indicating pulses and the control station sending the successive stepping pulse with conformance of the local indicating equipment. As the final point is stepped across, the equipment restores to its normal stand-by condition and line supervision is once more restored.

In the event that the attendant at the control station desires to change the position of a unit at one of the control points, the equipment must be brought to rest on that point and the particular operation control key operated. The stepping of the equipment to the desired point is effected by the operation of the selection key associated with such point at the control panel, the equipment responding by moving across the points in sequence in the manner described until the selected point is reached. The equipment at both stations then operates to a so-called "stopped-on-a-point" condition and at the selected point is illuminated to indicate such fact to the attendant. Operation of the apparatus unit at the associated substation point may now be accomplished by the operation of the trip or close control key to transmit the assigned operating code.

Inasmuch as it is extremely important that improper operation of the controlled apparatus be prevented, four separate codes have been assigned for use in effecting the operations of the equipment at the points, that is, the close code on even points comprises the transmission of two short negative impulses and the close code on odd points comprises the transmission of a first negative impulse followed by a short positive impulse. Tripping of a breaker on an odd point comprises the transmission of a short negative followed by two short positive impulses whereas tripping on an even point comprises the transmission of three short negative impulses. The four different codes are selectively transmitted automatically with operation of the close and trip key, the keys being so operative in accordance with the nature of particular point (odd or even) upon which the system has been stopped. The operator need merely operate the close or trip key to effect the desired one of the control operations, and the proper one of the codes is transmitted.

After the trip or close operation has been accomplished at the substation, the equipment thereat is effective to transmit a close or trip indication (long positive for closure and long negative for trip) to conform the indicating equipment at the control station point to the actual position of the circuit breaker.

Should a circuit breaker on a point automatically change position while the equipment is at rest thereon, such change of position is immediately reported to the control station and the indicating equipment is operative to conform the equipment therewith. Should a circuit breaker on another point occur during such period, the incident is recorded and automatically picked up as the equipment is subsequently moved from the point.

If a metering point, such as point 4, is selected the equipment will advance to that point and effect automatic metering as the equipment is brought to rest thereon. In the movement of the equipment to a synchronizing point, such as point T, which includes both control and metering of the equipment thereat, the metering is automatically effected as the equipment is brought to rest on the point and the close or tripping of the circuit breaker at that point may be effected by operation of the close or trip key in the normal manner.

The equipment is released from any one of these points by restoring the operated selection key, the control station equipment being effective to transmit a so-called "start-from-point" signal (short negative followed by long positive) to the substation to condition such equipment for a further stepping operation. Immediately thereafter the control station effects the transmittal of the stepping pulses and the system advances across the reexamining points. Further the system is automatically recycled once again to pick up any change of circuit breaker positions which may have occurred while the equipment was at rest on the selected point. A novel recording arrangement for recording changes of position while the equipment is at rest on a point is described more thoroughly hereinafter and is considered to be a further feature of the invention.

The reset key may be operated in combination with the selection key to effect a given sequence in the stepping of the equipment across the points, such operation being especially advantageous whenever it is desired to move the system to a point which is prior in sequence to the particular point on which the equipment is presently resting. The operation of the equipment in such manner will be more fully described in the following disclosure.

Stepping of the system across the points will also be initiated responsive to the change of position of a unit of equipment at one of the points on the substation, the substation equipment being effective to transmit an alarm signal to the control station. The equipment at the control station responds to such alarm signal to cause the equipment to automatically step over the points to pick up the change of position, and to effect the recording of such change on the control panel, the attendant's attention being called to such change of position by the automatic operation of the alarm equipment which is effected responsive thereto.

Stepping of equipment may also be effected responsive to interruption of the energizing source for the controlling station (and the subsequent restoration thereof) the stepping at this time again being effected to determine the possible change of positions of the controlled apparatus units which may have occurred during the failure.

It is important to note at this time that protection against false operation by transient impulses has been inherently included by providing a code system having a particular characteristic of operation and equipment which is only responsive to such characteristics. Specifically, it is noted that the substation and control station are normally inoperative to step without the receipt of a "step-from-normal" or a "step-from-point" signal. It will be observed that each of these signals is different from each other to prevent the out-of-step operation of the respective stations, that is, if through some failure one end of the equipment should reset and the other did not, the two ends might possibly start out of step if the signals were the same. Even further, however, the "step-from-point" and the "start-from-normal" signal both include a comparatively long pulse of a given polarity, the use of the long pulses and long pulse responsive equipment for these particular signals preventing false stepping by transient pulses which are generally of a comparatively short duration. Further by using a long pulse of opposite polarity, the office is able to signal the substation even though line supervision and current magnitude metering may be continuously applied at the time by the substation.

Further operational characteristics of the novel supervisory control system will become apparent from the following disclosure of the detailed operation of the equipment.

*Relay functions*

The following outline is a brief digest of the relays and the manner in which they are employed in practising the present invention.

CONTROL STATION RELAYS—FIGURES 1 TO 3 INCLUSIVE

| Relay Number | Functions |
|---|---|
| 360, 370, 380, 390, 830, 330, 340, 350, 825 | Point selection relays. |
| | Warning relays—operate on a change of indication to apply flashing current to the lamps. |
| 300, 310, 320, 810 | Indication relays—light close lamp when operated, trip lamp when released. |
| 180 (LR) | Polarized line relay—operates to close contacts 181 with receipt of positive signal, operates to close contacts 182 with receipt of negative signal. |
| 110 | Close supervisory relay—operates from signal 1 contact (+ contact) of LR on receipt of close supervision of line supervision. |
| 120 | Trip supervision relay—operates from signal 2 contact (− contact) of LR on receipt of trip supervision or alarm signal. |
| 220 | Series point relay (odd)—operates in series with odd numbered point selection relays. Controls termination of stepping pulse, and release of preceding point relay. |
| 212 | Series point relay (even)—operates in series with even numbered point selection relays. Controls termination of stepping pulse, and release of preceding point relay. |
| 240 | Stepping relay (odd)—sends odd (positive) stepping pulses to sub and steps odd point relays at office. Operates after receiving supervision from preceding point at sub. |
| 230 | Stepping relay (even)—same as 240, except for even points. |

CONTROL STATION RELAYS—FIGURES 1 TO 3 INCLUSIVE—Continued

| Relay Number | Functions |
|---|---|
| 130 | Off-normal relay—operates on first step, remains up as long as circuit is off normal. |
| 140 | Off-normal and start relay—operates from any point selection key, causing system to start up; also operates from relay 130 when system is started without a selection key operated. |
| 127 | Disagreement relay—operates when the supervision signal from the sub does not agree with the position of the point relay at the office; operates the flashing and indication relays to change the lamps and start the flashing. |
| 267 | Polarity reversing relay—reverses the polarity of trip and close pulses after the first pulse on odd numbered points. Also switches from the short signal 2 to the long signal 1 on the start-from-point signal. |
| 284, 288, 295 | Control counting chain relays—count trip or close impulses. |
| 250, 180' | Control pusing relays—sends trip and close pulses. |
| 146 | Step alarm relay—normally operated slow relay. Releases upon receipt of alarm signal, or when point selection key or reset key is operated, preparing circuit to start stepping. Is operated while stepping, releases when stopped on a point or when stepping stops for any reason. |
| 150 | Step preparing relay—normally operated slow relay. Operations similar to 146. Gives additional delay to relay 146; also releases and sounds alarm under certain "stall" conditions which might not release relay 146. |
| 274 | Reset relay—sends reset signal to sub and releases various office relays when the reset key is operated, or when the system starts from normal. |
| 257 | Start-from-point relay—sends start-from-point signal to sub when starting after having stopped on a point. |
| 100 | Auxiliary start relay—operates from relay 274 or 257, prepares circuit to start stepping. |
| 207 | Stop-on-point relay—operates from selection key when desired point is reached. |
| 206 | Auxiliary stop-on-point relay. Operates from relay 21 when supervision is received from substation from point on which stopped. Rings bell and prevents control operations if supervision is not received on point on which stopped. |
| 170 | Line supervision relay—releases and gives line alarm if line supervision current fails. |
| 168 | Line alarm cut off—cuts off bell when it is ringing due to a line failure. |
| 165, 156 | Flashing relays—produce pulses to flash lamps on a change of indication. |
| 162 | Bell release relay—cuts off the bell when it is ringing from a flashing lamp or from a stall. |

SUBSTATION RELAYS—FIGURES 4 TO 7

| Relay Number | Functions |
|---|---|
| 600, 610, 620, 630, 710, 640, 650, 660, 720 | Point selection relays. |
| | Point indication relays—each relay is operated if its breaker is closed; released if breaker is tripped. If breaker recloses, relay does not reoperate until point has been stepped over. |
| 305 | Polarized line relay—operates to close contacts 304 responsive to receipt of negative signal and contacts 306 responsive to receipt of positive signal. |
| 450 | Positive supervisory relay—operates from signal 1 contact (+ contact) of LR when system is not stepping; handles start-from-point and control-count (trip or close pulse operations). |
| 460 | Negative supervisory relay—operates from signal 2 contact (− contact) of line relay 305 when system is not stepping. Controls reset, start-from-normal, and control-count operations. |
| 560 | Series point relay (odd)—operates in series with odd numbered point selection relays while stepping. Prepares circuits to send supervision pulses and to control relay 580. |
| 570 | Series point relay (odd)—same as 560 except for even numbered points. |
| 530 | Check transmitter relay—operates after each step, sends supervision pulse to office, and operates or releases relay 580 depending on position of 560 or 570. Also sends alarm signal while circuit is normal, and supervision pulse while standing on a point. |
| 430 | Check determining relay—determines polarity of supervision pulse sent by relay. Operates from point indication relay. |

SUBSTATION RELAYS—FIGURES 4 to 7—Cont.

| Relay Number | Functions |
| --- | --- |
| 550 | Off-normal relay. Operates on first step, remains operated as long as circuit is off normal. |
| 410 | Line supervision—operates to remove line supervision current when system moves off normal or when an alarm signal has been sent by sub. Remains operated as long as system is off normal. |
| 540 | Point supervisory relay—operates when circuit stops on a point, closes point supervision and metering circuits. Also operates when normal circuit sends an alarm signal, cutting off sending circuit. |
| 580 | Odd-even relay—operated on odd steps, released on even. Switches control count circuits to receive appropriate control codes on odd or even points. Controls release of preceding point relay while stepping. |
| 510, 513, 521 | Control counting chain—counts trip and close pulses. |
| 500 | Associate hold relay—delays deenergization of breaker after breaker auxiliary switch closes, to insure that breaker has time to close completely. |
| 503 | Operation hold relay—slow relay associated with control counting chain. Holds during receipt of trip or close pulses, releases when pulsing stops. |
| 440 | Point hold relay—slow relay which holds while stepping through points, releases when stepping stops. |
| 470 | Step preparing relay—normally operated slow relay, releases upon receipt of reset or start-from-point signal. Prepares circuit to receive stepping pulses. |
| 480 | Alarm sending relay—controls sending of alarm signal while circuit is normal, or supervision signal while standing on point. |
| 490 | Alarm recording relay—operates when breaker changes position. |
| 420 | End-of-round relay—operates when last point has been stepped over, restores circuit to normal. |
| 400 | Metering relay—operates from contacts of impulse type meters. |

*Normal standby condition of equipment*

A more thorough understanding of the apparatus of the invention will now be had with reference to the drawings and the following detailed description of the functions of the equipment shown at each of the stations. Each station is arranged to be energized by an alternating and direct current source, the negative and positive terminals of the direct current source being indicated by encircled negative and positive symbols and the alternating current source being indicated by suitable identifying word legends or frequency symbols. It is also noted that the individual elements of the apparatus have generally been assigned identification numbers which have a first digit which corresponds to the particular figure in which the element appears to thus simplify perusal of the disclosed arrangement.

Master switches (not shown) are arranged to control connection of the energizing sources to the equipment at the control and controlled station to thereby place the equipment in a so-called normal standby condition.

The indication lamp 305, 306, etc. on the control board at the control station will be illuminated in accordance with the particular portion of the equipment at the associated substation point, that is, with reference to point 1 as an example, if the circuit breaker unit at substation point one is in the tripped position, point indication relay 640 thereat will be in the restored position and indication relay 300 associated with point one at the control station will also be in the released condition. A circuit for the green indication lamp 305 for point one will be completed from the negative side of the alternating current source over the green indication lamp 305, contacts 301, and contacts 331 to the positive side of the alternating current source.

If the circuit breaker unit at substation point one were in the closed position, the point indication relay 640 thereat would be in the operated condition and indication relay 300 would also be energized. An operating circuit is then completed for the red indication lamp 306 at control station point one which extends from negative battery over resistance 378, red indication lamp 306 and contacts 302' and 331 to the positive side of the energizing source. The control board indication lamps at each of the other points are illuminated in a similar manner to indicate to the attendant thereat the true condition of the controlled station circuit breaker units. With the equipment in the standby condition, normal supervision relay 470 at the substation will be energized to effect the application of a continuous positive signal to the signal channel conductors 61 and 62 to effect operation of the following control station relays; relay 180 (in the positive direction), line supervision relay 170, and step alarm relays 146 and 150.

With the equipment thus energized, normal supervision of the interconnecting signal channel is effected. The circuit constants for various installations will vary, but in each case, the constants are so chosen as to effect a low current flow through the control station line relay 180. Thus with the occurrence of even low line leakage the energizing circuit for the control station line relay 180 will be interrupted to effect the release thereof and line supervisory relay 170 will responsively initiate the sounding of the alarm at the control station to indicate to the attendant thereat that a line fault exists.

Similarly with the occurrence of an open line condition, the energizing circuit for the control station line relay 180 is interrupted and the release thereof is effected to cause the line fault alarm to be sounded.

It is important to note that the line relay signalling circuit in its arrangement prevents operation of the substation line relay irregardless of the nature of the line fault. Such fault preventive means are extremely important, of course, in systems of this type in which the several stations are arranged to step across the points in synchronism for if the substation line relay were falsely operated the possibility of the system being moved to positions which are in variance would be most eminent.

Considering briefly now the equipment which is energized at both stations to effect such line supervision.

Normal supervision relay 470 is maintained normally energized over a circuit which extends from negative battery over the winding of relay 470, contacts 468, contacts 457, and contacts 446 to positive battery, and is effective at its normally closed contacts 471 to connect positive battery to signalling channel conductor 61 and negative battery to signal channel conductor 62 to thereby transmit continuously a positive signal to the control station. Line relay 180 at the control station is therefore normally positively energized and its associated armature is normally positioned to close positive contacts 181, the circuit for the line relay 180 being more clearly shown in Figure 10, and as the reillustrated, extending from positive battery to the substation over contacts 471, contacts 412, resistance 407, contacts 531, signal channel conductor 61 to the control station, contacts 248, contacts 238, contacts 277, 260, 253, the right-hand winding of line relay 180 and resistance 90 to negative battery.

As line relay 180 responds to move its armature toward the positive contacts 181 a supplementary energizing circuit is completed to provide a snap action of the armature and prevent burning of the associated contacts, the supplementary circuit extending from positive battery over contacts 181, resistance 97, line relay 180, and resistance 90 to negative battery.

An energizing circuit is also simultaneously completed for the close supervision relay 110, the circuit extending from positive battery over contacts 181, close supervision relay 110 and resistance 90 to negative battery. Close supervision relay 110 operates and at its contacts 116 completes an operating circuit for the line supervision relay 170, the circuit extending from negative battery over the winding of relay 170, contacts 159, contacts 143, and contacts 116 to positive battery. Line supervision relay 170 is therefore normally operated and at its contacts 172 interrupts the operating circuits for the line fault lamp 109 and alarm bell 177 which are used to indicate line trouble to the attendant at the control station.

Step alarm relays 146 and 150 are also normally operated at the control station, the operating circuit for the relay 146 extending from negative battery over the winding of relay 146, reset key contacts 184, contacts 141, contacts 149, and contacts 125 to positive battery. Step alarm relay 150 is energized over a circuit extending from negative battery over the winding of the relay 150, contacts 154, conductor 16, contacts 232, and contacts 149' to positive battery.

The equipment is automatically restored to this so-called normal position upon completion of each stepping operation, and line supervision is therefore continuously accomplished whenever the equipment is not in a stepping operation.

*Line supervision—general description*

Considering now in detail the operation of the equipment responsive to the occurrence of each of the various types of line faults. As previously pointed out normal line supervision will consist of the continuous transmission of a positive signal by the substation over an interconnecting channel to the control station. A line relay 180 at the control station is continuously operated responsive to the signal. The constants of the line supervision circuit being so chosen that a low value of signal current is used to energize the control station line relay 180. Thus even relatively low line leakage will reduce the strength of the supervisory signal sufficiently to release the line relay 180 and cause its armature to return to the neutral midpoint position to effect the propagation of the alarm at the control station.

Similarly, in the event of an open circuit condition the supervisory signal to the control station is interrupted and the line relay 180 is released to initiate transmission of the alarm.

A line relay 305 disposed at the substation is connected to the signal channel and the supervisory circuit so as to remain inoperative during the periods that the equipment is in the standby condition. Further, by reason of a novel circuit arrangement, the substation line relay 305 is maintained inoperative even though an open, slight short or dead short condition should occur on the signal channel.

Basically, the arrangement whereby the desired operation of the line relay 180 at the control station is effected responsive to a fault condition without disturbing the released condition of the interconnected line relay 305 at the substation is effected by the use of a pair of polarized relays, which may conveniently comprise a Western Electric 215d type polarized relay, in combination with a series of control relays for varying the constants of the signal circuit. Specifically, in the illustrated embodiment, each line relay is of the two-winding type, each winding having a value of 800 ohms. The windings of each relay are arranged to be energized in opposition or in series aid relation, the relay being operative to move an associated armature from its neutral mid-position whenever its windings are energized in series aid relation and to maintain the relay at the midpoint when energized in opposition. The armature in its movement from its neutral position is operative to close one of two sets of contacts (referred to as the positive and negative contacts hereinafter) in accordance with the direction and value of the current flow through the relay windings, current flow from left to right through both windings of a relay causing the armature to close the right hand contacts (182 or 306) and from right to left to close the left hand contacts (181 or 304). A current in the value of four milliamperes through both windings of the relay in series aid relation, the flow of eight milliamperes through one winding, or the difference of current values for both windings is required to effect the operation of the armatures in the directions indicated. With reference now to Figure 11a, the simple circuit illustration there shown is indicative of the line relay operation during the period in which the equipment is in the normal standby condition. With normal line supervision positive potential is applied to signal conductor 61 and the series aid current flow through the windings of line relay 180 at the control station is effected to cause the armature to close the left hand contacts 181. The circuit further extends over conductor 62, the right hand winding of line relay 305 at the substation and resistance 425 to negative battery. A local balancing circuit extending from positive battery over contacts 471, 412, resistance 406, contacts 403 and the left hand winding of line relay 305 and resistance 425 to negative battery energizes the left hand winding of relay 305 in opposition to the right hand winding and the relay is accordingly normally inoperative.

The values of the resistances are such that in the standby condition approximately 4 to 5 milliamperes flow in series aid relation through the windings of the control station line relays 180, and 4 to 5 milliamperes flow in opposition through the two windings of the substation relay. As a result, in the event of even low line leakage in one of the signal channel conductors 61 or 62, the current flow through each of the windings of control station line relay 180 will be diminished to release same and energize the alarm equipment. The line relay 305 at the substation, however, will remain inoperative, for the normal current flow through either winding is only in the nature of four milliamperes, and even though the current flow through the right hand winding of relay 305 is completely stopped as a result of a dead short, the current flow in the left hand winding being only 4 milliamperes is insufficient in itself to effect movement of the associated relay armature. Similarly, in the event of an open condition in one of the lines, the line relay 180 at the control station will release with corresponding diminishment of the current flow. Moreover, even though the current flow in the right hand winding of the substation line relay 305 is decreased to zero, the current flow through the left hand winding is only in the order of 4 milliamperes which is insufficient to effect operation of the associated armature.

*Alarm circuit energization responsive to a line fault occurrence*

It is apparent from the foregoing that with the occurrence of a ground, short or open condition, the restoration of the control station line relay 180 is effected. Auxiliary circuit means controlled by the restoring line relay provide an indication of the existence of a line fault to the attendant through the means of an indication lamp 109 and the energization of an alarm bell 177. Specifically, as line relay 180 restores responsive to the occurrence of the line fault, it is effective at its contacts 181 to restore its armature to the neutral position and to thereby interrupt the operating circuit for the close supervisory relay 110. As the close supervisory relay 110 releases it is effective at its contacts 116 to interrupt the energizing circuit for line supervision relay 170 which releases and at its contacts 171 completes an operating circuit for the alarm indication lamp 109, the circuit extending from positive battery over contacts 171, indication lamp 109, and resistance 93 to negative battery.

Line supervision relay 170 at its contacts 172 completes an operating circuit for the first flashing relay 165, the circuit extending from negative battery over the winding of relay 165, contacts 157, contacts 163, 167, 172, 145, 117 to positive battery. Flashing relay 165 operates and at its contacts 166 completes an obvious circuit for an auxiliary flashing relay 156. Flashing relay 156 operates and at its contacts 158 completes an energizing circuit for the alarm bell 177, the circuit therefor extending from negative battery over resistance 94, alarm bell 177, contacts 158, contacts 167, 172, 145, 117 to positive battery.

Auxiliary flashing relay 156 at its contacts 157 interrupts the energizing circuit for the first flashing relay 165 which being slow to release restores after a given time interval, and at its contacts 166 interrupts an operating circuit for the auxiliary relay 156. Relay 156 restores and at its contacts 158 opens the energizing circuit for the alarm bell 177 and at its contacts 157 re-establishes the energizing circuit for the flashing relay 165. As the flashing relay 165 operates it is effective at its contacts 166 to reoperate auxiliary flashing relay 156 to once more energize the alarm bell 177 and illuminate the line alarm lamp 109.

The relays cycle in sequence to effect intermittent energization of the lamp and bell to thereby attract the attention of the attendant and to indicate to him that a line fault has occurred.

The alarm signal is continued until a bell release key 176 is operated to effect silencing of the alarm bell. With operation of the key 176, alarm cut-off relay 168 is operated over a circuit extending from negative battery over the winding of relay 168, contacts 174, and contacts 171 to positive battery.

The alarm cut-off relay 168 operates and at its contacts 168' locks to positive battery over further contacts 172, 145, and 117 to positive battery, and at its contacts 167 interrupts the original energizing circuit for the combination operating flashing relays 165 and 156 to terminate the cycling thereof and the ultimate silencing of the alarm bell 177.

As the line fault is removed and line supervision is restored, line relay 180 and close supervision relay 110 will be re-operated over the supervisory circuit, and relay 110 at its contacts 117 will interrupt a holding circuit for the alarm cut-off relay 168, which responsively restores, to reclose at its contacts 159 and recomplete the energizing circuit for the line supervision relay 170.

Line supervision relay 170 operates and at its contacts 171 interrupts the energizing circuit for the line fault indication lamp 109 to once more restore the equipment to the normal standby condition.

It is seen from the foregoing description that dependable and reliable line supervision, which is operative responsive to the occurrence of any type line fault, is effected in the disclosed arrangement. Further, as will become more apparent with the further disclosure, such type line supervision is integrally tied into the equipment in such a manner as to be automatically restored upon completion of a control operation and without danger of disturbance of the operating condition of the equipment at each of the stations.

*Stepping of equipment off-normal*

As previously pointed out, the selection equipment of the invention is arranged to selectively control and supervise a series of circuit breaker units which are disposed at a distant substation. The selection equipment for connecting the control end to each of the distant points as desired being of the general type which causes the local and remote equipment to step in synchronism over each of the points in succession once the equipment has been moved from the off-normal position.

Movement of the equipment from the off-normal position may result with the occurrence of any one of numerous circuit conditions, and each condition will be briefly considered at this point. Stepping from normal by the equipment may occur, for example, when a signal is received from the substation indicating that a breaker on one of the points has automatically changed positions or that the energizing source for the substation has been interrupted. Similarly, the equipment will step over the points responsive to the loss of battery at the controlling station and the subsequent restoration thereof. Manual operation of a selection key to select a desired one of the points at the substation equipment or operation of the control station reset key will also initiate stepping of the equipment.

As the equipment steps over the points as a result of the occurrence of any one of the foregoing conditions, the substation sends an indication signal for each point which indicates the position of the circuit breaker thereat. The control station equipment in turn compares the received signal with the position indicated by the control panel equipment lamps for that point, and in the event that the indicated signal and received signal are at variance, effects the correction of the indication equipment at the control station. It is apparent therefrom that the purpose of the stepping responsive to occurrence of any fault in the equipment is to pick up any changes in circuit breaker conditions which may have occurred during the period of equipment disablement.

With the manual operation of a selection key, the system is moved off-normal to step over the points in succession, and to stop on the point associated with the particular selection key which has been operated, it being apparent that with the selection of a point the circuit breaker equipment at that point may be operated to any desired position.

The release of a stepping alarm 146 initiates stepping of the equipment in the desired manner, and it is the release of this relay that is ultimately effected with the occurrence of any one of these conditions.

The manner in which each condition effects the operation of relay 146 is different and accordingly each will be individually considered. However, the stepping operation which results is somewhat similar in nature for each operation and accordingly for purposes of a brief and concise disclosure is set forth only once. In order to further facilitate an understanding of the equipment the operation thereof responsive to the occurrence of one of these conditions (i. e., change of position of a circuit breaker) is carried through from beginning to end.

*Preparing equipment for stepping responsive to receipt of alarm from substation*

Stepping of the equipment over the points to pick up a change of position of a circuit breaker is necessarily effected whenever a circuit breaker is automatically or manually tripped or closed at the remote station or energizing potential is temporarily lost at the substation. Accordingly, the substation is arranged to transmit a signal, whenever such condition arises which is indicative of the fact that a change has occurred, such signal being operative to ultimately effect the release of the stepping alarm relay 146 and initiation of the stepping operation. Such equipment operation is now considered.

Figure 6:
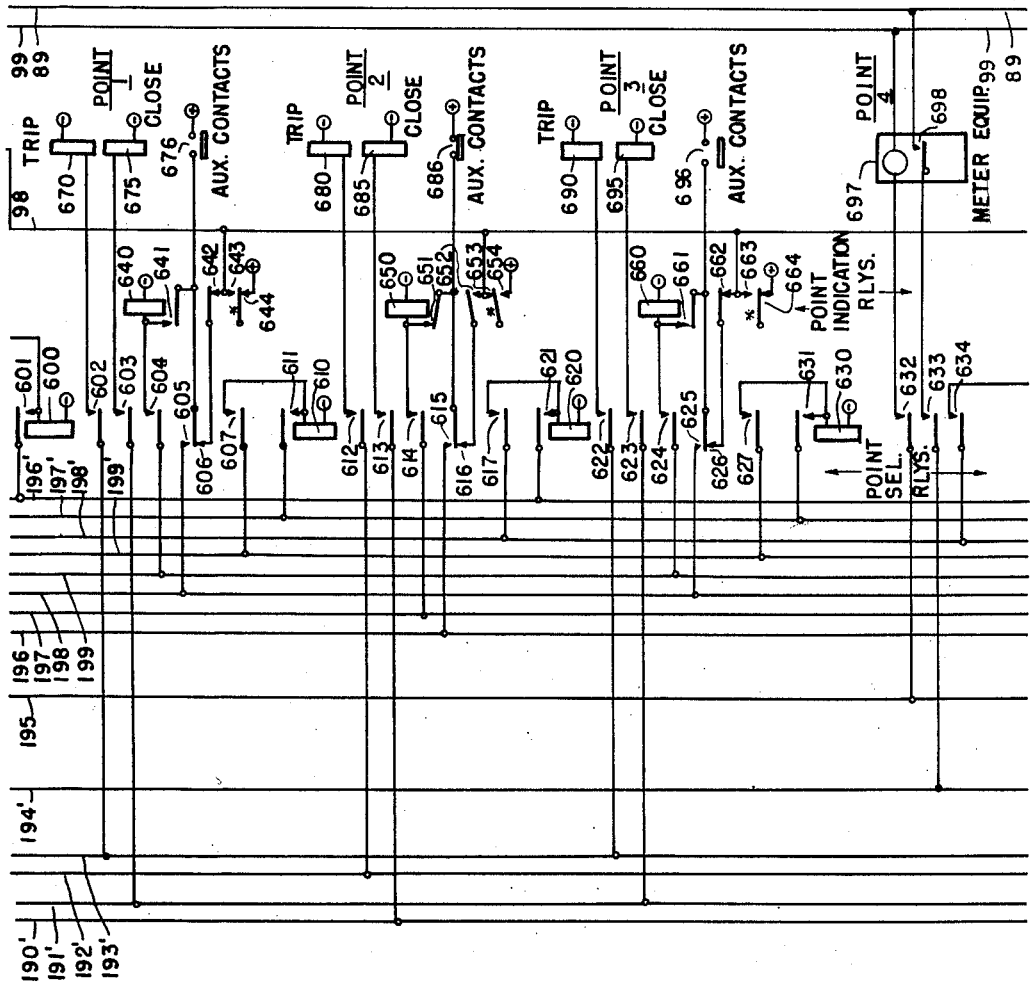

With reference to Figure 6 of the drawings, the auxiliary switch contacts 676 associated with circuit breaker at point one are shown in the open position to indicate the restored condition of the breaker at point one and the auxiliary switch contacts 686 associated with the circuit breaker at point 2 are shown in the closed position to indicate the operated condition of the circuit breaker at point two. Point indication relay 640 at point one will therefore be in the restored position and point indication relay 650 will be operated.

Assuming now that the closed circuit breaker at point 2 is automatically or manually restored and the auxiliary switch contacts 686 associated therewith are opened to interrupt the holding circuit for the associated point indication relay 650 to thereby effect the release thereof.

The means for effecting transmission of a signal with change of position of a circuit breaker basically comprise a normally charged condenser 417 (Figure 4) and an associate alarm recording relay 490. The condenser is normally charged over the circuit extending from positive battery over condenser 417, resistance 418, relay 490 to negative battery. Thus as an indication relay such as 650 restores responsive to tripping of a circuit breaker, make-before-break contacts, such as 654, momentarily close a circuit for discharging the charged condenser 417, such circuit extending, in the case of indication relay 640, from the lower plate of condenser 417 over resistance 418, C87, contacts 545, C98 and contacts 653, 654 to positive battery. Since contacts 653 and 654 are of the make-before-break type, the discharge circuit is only momentarily completed and as contacts 664 are opened to interrupt the discharge circuit, the condenser 417 instantly recharges over the described charging path which extends over the winding of alarm recording relay 490. Alarm recording relay 490 is energized responsive to initiation of current flow in the charging path and initiates energization of the signalling equipment.

It is apparent, of course, that operation of the alarm recording relay 490 is similarly effected in the event that an open circuit breaker, such as shown at point 1, is automatically closed, the operation of the alarm recording relay 490 in such instance being accomplished by the consequent closure of the auxiliary switch contacts 676 associated with the circuit breaker at that point. The operating circuit for the alarm recording relay 490 in such event extends from positive battery over contacts 676, contacts 688, contacts 642, C98, contacts 545, C87 and the winding of alarm recording relay 490 to negative battery. Connection of positive battery to the relay 490 and the lower plate of capacitor 417 effects the discharge thereof through the relay winding.

It is apparent that with each change of position of a circuit breaker (trip or close) the alarm recording relay 490 is operated to record such occurrence and to initiate transmission of an alarm signal to the control station to alternately operate stepping alarm relay 146 thereat.

Such operation of the substation alarm recording relay 490 is also effected whenever malfunctioning or interruption of the power supply for the substation equipment occurs, it being apparent that in such event the capacitor 417 will discharge through alarm recording relay 490 and as the power supply is subsequently restored, the capacitor 417 will immediately recharge over the aforedescribed energizing path to operate alarm recording relay 490. Thus it is seen that in the event of the occurrence of a power failure, an automatic circuit breaker trip, or an automatic circuit breaker closure, the capacitor 417 effects operation of alarm recording relay 490.

Alarm recording relay 490 in operating responsive to the occurrence of any of the foregoing conditions is in turn operative to effect the transmission of an alarm signal to the control station to ultimately operate the step initiating equipment thereat. In detail, alarm recording relay 490 on operating is effective at its contacts 492 to complete a self-holding circuit which extends from negative battery over the winding of relay 490, and contacts 492, and 483 to positive battery, and at its contacts 491 completes an operating circuit for the alarm sending relay 480, which extends from negative battery over the winding of relay 480, contacts 491, C67, contacts 502, C74, and contacts 415 to positive battery. The alarm sending relay 480 operates and at its contacts 483 interrupts the holding circuit for the alarm recording relay 490 to effect the restoration thereof, and at its contacts 482 completes an operating circuit for point supervisory relay 540, the circuit extending from negative battery over the winding of relay 540, C86, and contacts 482 to positive battery. Alarm sending relay 480 at its contacts 481 completes an operating circuit for check transmitter relay 530 which extends from negative battery over the winding of the relay 530, C83, contacts 481, and resistance 408 to positive battery.

The point supervisory relay 540 operates and at its contacts 546 completes a self-holding circuit which extends from negative battery over the winding of relay 540, C86, contacts 474, C88 and contacts 546 to positive battery. The point supervisory relay 540 at its contacts 546 also effects the operation of line supervisory relay 410, the circuit extending from negative battery over the winding of relay 410, contacts 423, C88, and contacts 546 to positive battery. Line supervisory relay 410 operates and at its contacts 412 disconnects positive battery from the positive conductor 61 of the signalling channel to interrupt the transmission of the supervisory signal to the control station and at its contacts 413 prepares a point in the circuit to the substation line relay 305 which is ineffective at the present time.

Check transmitter relay 530 operates and at its contacts 531 and 533 interrupts the transmission of the positive supervisory signal and at its contacts 532 and 534 applies a negative signal to the signal channel conductors 61 and 62, (Figure 11d) which comprises application of positive current to conductor 62 and negative current to conductor 61 whereby the current will flow through the windings of control station line relay 180 from left to right to cause the relay to move its armature to close the negative contacts 182. The line relay energizing circuit extends from positive battery at the substation over resistance 426, contacts 439, conductor 72, contacts 534, conductor 62, contacts 246, 236, 275, 258, 251, conductor 24, rectifier 92′ through the windings of line relay 180 from left to right, conductor 25, contacts 253, 260, 277, 238, 246, conductor 61, contacts 532 and 437 and resistance 425 to negative battery.

As was previously pointed out, as the operating circuit to the check transmitter relay 530 was completed to initiate transmission of the signal to the control station the holding circuit for alarm recording relay 490 was interrupted at contacts 483. The release of alarm recording relay 490 however is comparatively slow by reason of the fact that a 60 ohm resistor 418 and a charged four microfarad capacitor 417 are connected thereto. Even after the recording relay 490 does release to interrupt the circuit for the sending relay 480, a further time period is consumed for relay 480 is slugged and therefore slow to release. As the alarm sending relay 480 does release it is effective at its contacts 481 to open the energizing circuit for the check transmitter relay 530 to effect the restoration thereof and the opening of its contacts 532 and 534 to interrupt the transmission of the alarm signal to the control station. Normal supervisory relay 470, line supervisory relay 410 and point supervisory relay 540 are held operated preparatory to receipt of the stepping impulses.

Thus it is seen that the length of the alarm signal transmitted is determined by the release time of alarm recording relay 490, the release time of slow-to-release relay 480 and the release time of the check transmitter relay 530. Accordingly, the alarm signal is of a comparatively long duration, this being important to achievement of a positive acting arrangement in which short transient pulses of a similar nature are precluded from effecting false circuit operation.

Referring now to the control station equipment and the operation of the apparatus thereat responsive to receipt of the incoming alarm signal. As previously mentioned the alarm signal comprises the application of positive potential to conductor 62 and negative potential to conductor 61 whereby the current flows through the windings of line relay 180 from left to right to cause the relay to move the armature to close negative contacts 182. With the closure of contacts 182 an operating circuit for the trip supervision relay 120 is completed, the circuit extending from positive battery over contacts 182, the winding of relay 120, and resistance 90 to negative battery. Trip supervision relay 120 operates and at its contacts 125 interrupts a point in the holding circuit for the step alarm relay 146. The line relay 180 and trip supervision relay 120 are held operated for the duration of the impulse. As the impulse is terminated, line relay 180 moves its armature to its neutral position to open contacts 182 and interrupts the energizing circuit for trip supervision relay 120. Trip supervision relay 120 releases and at its contacts 125 reconnects positive battery to the normal holding circuit for the step alarm relay 146, but is ineffective to operate the now restored relay 146 in that the step alarm relay 146 in restoring opened contacts 149 to interrupt a further point in the energizing circuit. The step alarm relay 146 therefore remains in the restored condition.

As previously pointed out the operation of the step alarm relay 146 initiates the stepping of the equipment and it is with the operation of this relay responsive to the loss of battery at the substation or change of position of a circuit breaker thereat that the former description was concerned.

The manner in which stepping alarm relay 146 is ultimately operated responsive to the occurrence of others of the mentioned conditions will be described at a later point, it being noted the description immediately following which pertains to the manner in which the equipment steps as the stepping alarm relay 146 operates will be the same for each of these other conditions.

*Release of the stepping alarm relay to initiate stepping*

As stepping alarm relay 146 releases, responsive to receipt of the transmitted alarm signal, it is effective at its contacts 149′ to interrupt the holding circuit for an associated step preparing relay 150, which releases and at its contacts 153 completes an operating circuit for a reset relay 274, the circuit extending from negative battery over the winding of relay 274, conductor 34, contacts 153, 147′, 135, and 125 to positive battery.

The supervisory signal normally transmitted by the substation is maintained interrupted as a result of the transmission of the alarm signal, and the step alarm and step preparing relays 146 and 150 will therefore remain in the restored position to hold the reset relay 274 in the operated condition. However, under certain conditions, relays 146 and 150 are only momentarily restored to initiate stepping and provision is therefore made for effecting the lock up of reset relay 274 after energization to maintain same operated after the release of the step preparing and step alarm relays. Such holding circuit extends from negative battery over the winding of relay 274, contacts 283, conductor 40, and contacts 187 to positive battery.

Transmission of start from normal signal (long negative)

The control station having received an alarm signal now prepares the equipment for stepping by transmitting a "Start-from-normal" signal to the substation, such signal comprising the application of negative battery to conductor 61 and positive battery to conductor 62. The start-from-normal impulse is applied to the signal channel by reset relay 274 in its closure of contacts 276 and 278, the energizing circuit extending from positive battery at the control station over resistance 178, conductor 29, contacts 276, 236, 246, conductor 62 of the signalling channel to the substation, contacts 533, the windings of the line relay 305, contacts 403, rectifier 427, conductor 69, contacts 531, conductor 61 of the signal channel, contacts 248, 238, 278, conductor 35 and resistance 179 to negative battery at the control station. The current flow in the energizing circuit for line relay 305 obviously extends through the relay windings from right to left and accordingly the relay moves its armature to close the negative contacts 304 (signal 2 position).

It will be remembered that substation point supervision relay 540 and line supervisory relay 410 were operated as the alarm signal was transmitted to the control station. Accordingly contacts 412 on line supervisory relay 410 are opened and the application of positive battery to the left hand positive winding of line relay 305 in opposed relation to the energizing current flow therethrough is prevented.

However, in the event that the "start-from-normal" signal were transmitted by the control station, for example, responsive to operation of a point selection key, the substation line supervisory relay 410 would obviously not be operated as the "step-from-normal" signal is received. In such event three separate energizing circuits are completed for the substation line relay (Fig. 11b), the principal circuit being the circuit just described. A second circuit extends from positive battery over contacts 471 and 412, resistance 406, contacts 403, the left hand winding of line relay 305, resistance 425 and negative battery. The third circuit which is in opposition to the second circuit extends from positive battery at the control station over resistance 178, C29, contacts 276, 236, 246, C62 to the substation, contacts 533, the right hand winding of line relay 305, resistance 425, negative battery, positive battery, contacts 471 and 412, resistance 407, C69, contacts 531, C61 to the control station, contacts 248, 238, 278, C35 and resistance 179 to negative battery. In that the two minor energizing circuits are in opposition, the principal circuit will be effective to operate the line relay 305 in the manner described following transmission of the "start-from-normal" impulse as a result of receipt of an alarm signal from the substation.

In either event, as the line relay 305 operates, the associated armature is moved to close the associated negative contacts 304 and an operating circuit is completed for the negative supervisory relay 460, this being the relay which is arranged to respond with receipt of a negative signal (signal 2 position). The energizing circuit for the negative supervisory relay 460 extends from negative battery over resistance 408, the winding of relay 460, and contacts 441 and 304 to positive battery.

Negative supervisory relay 460 operates and at its contacts 468 interrupts the holding circuit for the normally operated supervisory relay 470, which releases, and at its contacts 475 completes a further holding circuit for the line supervision relay 410. It will be remembered that the line supervision relay 410 was operated when the alarm was transmitted by the substation. Moreover, it will be apparent that in the event that the "start-from-normal" impulse is being transmitted as a result of the operation of a selector key (for example), line supervision relay 410 would not be operated at this time. With the release of the normal supervisory relay 470 and the closure of contacts 475, a circuit will be completed for the line supervision relay 410. It is seen therefrom that the normal line supervision signal will overlap the "start-from-normal" impulse for a brief period pending operation of relay 410 and the opening of contacts 412 to terminate the signal transmission.

As the negative supervisory relay 460 operates it is also effective at its contacts 466 to complete an operating circuit for the point hold relay 440, which is arranged to be energized with the initiation of each stepping operation and to release only when the stepping operation is completed. The energizing circuit extends from negative battery over the winding of relay 440, and contacts 472, 466, and 414 to positive battery. After the point hold relay 440 operates, the negative supervisory relay 460 is maintained operated over a circuit extending from negative battery over resistance 408, the winding of relay 460, contact 464, contacts 442, and contacts 304 to positive battery. Thus as "start-from-normal" signal (signal 2) is transmitted by the control station to the substation, the negative supervisory relay 460, point hold relay 440, and line supervisory relay 410 are operated, and normal supervisory relay 470 is released to remove the normal supervisory signal from the signal channel and to prepare the equipment for a stepping operation.

The accomplishment of these substation preparations require a predetermined period of time and accordingly the "start-from-normal" impulse must be of a comparatively long duration. Additionally the equipment at the control station must also be prepared for a stepping operation and these operations are now considered.

As reset relay 274 is operated to initiate transmission of the "start-from-normal" signal, it is also effective at its contacts 275 and 277 to interrupt the energizing circuit for the control station line relay 180 (which is completed as a result of the transmission of the alarm signal by the substation) and to effect the restoration of the line relay 180 and the close supervisory relay 110. Reset relay 274 is also effective at its contacts 281 to initiate cycling of the counting chain to effect a "start-from-normal" pulse of the necessary length and at its contacts 281 is further effective to complete an operating circuit for the auxiliary start relay 100 to further prepare the control station for the stepping operation, the circuit extending from negative battery over resistance 90, the winding of auxiliary start relay 100, conductor 31, contacts 263, contacts 282, C34, and contacts 153, 147', 135, and 125 to positive battery. Auxiliary start relay 100 operates and at its contacts 104 completes an obvious energizing circuit for the step alarm relay 140 and at its contacts 103 prepares an energizing circuit for stepping relay 240 which extends from negative battery over resistance 90, the winding of relay 100, contacts 102, contacts 151, conductor 6, the winding of relay 240, contacts 221, conductor 7, contacts 103 to positive battery. Stepping relay 240 however is shunted inoperative at this time by the initial energizing circuit for the auxiliary start relay 100.

As step alarm relay 146 operates, it is effective at its contacts 149, to complete an operating circuit for step preparing relay 150, the circuit extending from negative battery over the winding of relay 150, contacts 105, contacts 155, conductor 16, contacts 242 and 232, conductor 15, and contacts 149' to positive battery.

The step preparing relay 150, as its name indicates, is arranged to prepare the driving circuits for stepping as the impulses are received and as the relay 150 operates it is effective at its make-before-break contacts 154 to complete a holding circuit which extends from negative battery over the winding of relay 150, contacts 154, conductor 16, contacts 242, 232, conductor 15 and contacts 149' to positive battery.

Step alarm relay 146 at its contacts 148 also effects the operation of the series point relay (even) 212, the circuit extending from negative battery over the winding of relay 212, resistance 219, conductor 9', contacts 132, 148, conductor 9, contacts 209, conductor 7, and contacts 103 to positive battery.

The foregoing relay operations, that is the release of the line raly 180 and the close supervision relay 110 as well as the operation of the auxiliary start relay 100, the step alarm relay 146, the step preparing relay 150, and the series point relay 212 have each been initiated responsive to the operation of the reset relay 274, to condition the control station equipment for the stepping operation which is to follow. The preparation of the control station and substation equipment occurs simultaneously of course, and as is the case with the preparation of the substation, the preparing operations require a comparatively long period of time. Such period of time is accomplished for both stations by the provision of a long "start-from-normal" impulse, the method of providing same being now considered.

As previously mentioned, as reset relay 274 operates to close its contacts 281, an operating circuit is completed for effecting the cycling of the control counting chain 280', such cycling being initiated by connecting operating potential to the first counting chain relay 284 over a circuit extending from negative battery over the winding of relay 284, contacts 189, conductor 28, contacts 183, C30, contacts 206', contacts 281, contacts 285, 289, 293, resistance 218, contacts 256', conductor 42, and contacts 119 and 117 to positive battery.

Control counting chain relay 284 operates to initiate the cycle and at its contacts 287 completes an operating circuit for the control pulsing relay 250, the circuit extending from negative battery over the winding of relay 250, C36, contacts 189, C41, contacts 287, conductor 42, and contacts 119 and 117 to positive battery. Control pulsing relay 250 is arranged to cooperate with an associate pulsing relay 180' to cycle the counting chain and as it now operates is effective at its contacts 255 to extend an energizing circuit to the associated pulsing relay 180', the circuit extending from negative battery over the winding of relay 180', contacts 255, contacts 287, C42, and contacts 119 and 117 to positive battery. Control pulsing relay 250 at its make-before-break contacts 255' and 256' completes a series energizing circuit for the second control counting chain relay 288 in series with the first counting chain relay 284, the circuit extending from negative battery over the winding of relay 284, the right hand winding of relay 288, contacts 286', 256', conductor 42, and contacts 119 and 117 to positive battery.

A pumping arrangement is now effected between the control pulsing relays 250 and 180', it being apparent that with the first operation of control pulsing relay 180' and the opening of its contacts 189, the energizing circuit for the operated control pulsing relay 250 is interrupted to effect the restoration thereof. As the control pulsing relay 250 restores it is effective at its contacts 255 to in turn effect the restoration of the associate control pulsing relay 180'. As control pulsing relay 180' restores it is effective to reclose its contacts 189 to reestablish the energizing circuit for the control relay 250. The pumping continues in this manner until the chain is cycled and the initial energizing circuit for the pumping relays 250 and 180' is interrupted.

Control pulsing relay 250, in its first release is effective at its make-break contacts 255' and 256' to interrupt the energizing circuit for the control counting chain relays 284 and 288 to effect the release of the first counting chain relay 284. However, before the energizing circuit is interrupted the make-before-break contacts 256' of the control relay 250 are closed to complete a holding circuit for the left hand winding of control relay 288 which extends from negative battery over the left hand winding of relay 288, contacts 289', 293, resistance 218, contacts 256', conductor 42, and contacts 119 and 117 to positive battery.

As associate control pulsing relay 180' releases for the first time, responsive to release of the control relay 250, it is effective at its contacts 189 to reestablish an operating circuit for the control pulsing relay 250, which now extends from negative battery over the winding of relay 250, C36, contacts 189, C41, contacts 291, contacts 287', conductor 42, and contacts 119 and 117 to positive battery.

As the control pulsing relay 250 now operates for the second time, it is effective at its contacts 255' to complete an operating circuit for the control pulsing relay 180' by extending the positive potential on conductor 41 over contacts 255 to the associate pulsing relay 180'. Control pulsing relay 250 at its contacts 255' also completes an operating circuit for the third control counting chain relay 295, the circuit being completed in series with the operated one of the control counting chain relays 288, and extending from negative battery over the left hand winding of the control relay 288, the right hand winding of the third control relay 295, contacts 290, contacts 286', contacts 255', conductor 42, and contacts 119 and 117 to positive battery.

As control pulsing relay 180' now operates for the second time, it is effective at its contacts 189 to once more interrupt the energizing circuit for control relay 250 to effect the restoration thereof. As control pulsing relay 250 releases for the second time, it is effective at its contacts 255 to interrupt the energizing circuit for the control pulsing relay 180' and at its contacts 256' interrupts the series energizing circuit for the second and third counting chain relays 288 and 295, and at its contacts 255' establishes a separate energizing circuit for the third control relay 295, such circuit extending from negative battery over the winding of relay 295, contacts 294, R218, contacts 255', conductor 42, and contacts 119 and 117 to positive battery.

As the control pulsing relay 180' now releases for the second time, it is effective at its contacts 189 to reestablish an operating circuit for control pulsing relay 250. Inasmuch as the third control counting chain relay 295 is now operated, the new operating circuit for the control pulsing relay 250 will extent over contacts 296 thereof, the circuit extending from negative battery over the winding of relay 250, contacts 189, conductor 41, contacts 296, contacts 292, contacts 287', conductor 42, and contacts 119 and 117 to positive battery.

As control pulsing relay 250 operates for the third time, it is effective at its contacts 255 to extend its own operating potential on conductor 41 to the control pulsing relay 180', and at its make-before-break contacts 255' and 256' interrupts the energizing circuit for the third counting chain relay 295 to effect the release thereof.

Control pulsing relay 180' energizes for the third time, and at its contacts 189 interrupts the energizing circuit for the control pulsing relay 250. Control pulsing relay 250 releases for the third time and at its contacts 255 interrupts the holding circuit for the associate control pulsing relay 180', which is however held up by the closed contacts 256' of the control pulsing relay 250. Specifically, the holding circuit for relay 180' extends from negative battery over the winding of relay 180', contacts 184, conductor 36, contacts 206, contacts 281, contacts 285, 289, 293, resistance 218, 256', conductor 42, and contacts 119 and 117 to positive battery.

It will be remembered that during the period of the counting chain cycle, reset relay 274 at its contacts 275 and 278 effected application of the "start-from-normal" impulse to the signal channel whereby each of the stations was provided with time period of sufficient duration to accomplish the necessary preparations for the circuit stepping operation. It will also be remembered that the stepping relay (odd) 240 has been shunted by the initial energizing circuit for the auxiliary start relay 100. Specifically, positive battery was fed to one of the relay winding conductors over a circuit extending from positive battery over contacts 103, conductor 7, contacts 221 to relay 240, and positive battery on C40 was also connected to the relay winding over contacts 283, 282, 263, C31, contacts 102, 151, C6 and relay 240. Positive battery is connected to C40 alternatively by contacts 187 and 188 of pulsing relay 180'. As the control pulsing relay 180' is in the restored condition for example, the contacts 187 connect positive battery directly to conductor 40 and with control pulsing relay 180' in the energized condition, positive battery is connected to conductor 40 over a circuit extending from positive battery over contacts 117 and 119, conductor 42, contacts 287' or 292 or 297 of the operated one of the control counting chain relays, conductor 41 and contacts 188 to conductor 40. With positive battery connected to both sides of relay 240, as long as one of the counting chain relays is operated, the stepping relay 240 is of course inoperative.

As the third control counting chain relay 295 now restores, contacts 207, 291 and 296 are all in the open condition and the shunting circuit for the stepping relay (odd) 240 is interrupted. Stepping relay (odd) 240 now operates in series with the auxiliary start relay 100, the circuit extending from negative battery over resistance 90, winding of auxiliary start relay 100, contacts 102, contacts 151, conductor 6, the winding of relay 240, contacts 221, conductor 7, and contacts 103 to positive battery.

*Transmission of first stepping signal by control station (positive for odd steps)*

Stepping relay (odd) 240 now operates to terminate transmission of the "start-from-normal" signal by opening its contacts 246 and 248, and at its contacts 245 and 247 applies the first stepping impulse (signal 1) to the channel conductors, such impulse being positive in nature and comprising the connection of positive battery to conductor 61 and control station negative battery to conductor 62. Substation line relay 395 responds to the change from the negative "start-from-normal" signal to the positive stepping signal to move its associated armature to open the negative contacts 304 and to close the positive contacts 306 (signal 1 position—Figures 10 and 11c). With the opening of contacts 304 the operating circuit for the negative supervisory relay 460 is interrupted to effect the restoration thereof. As the line relay 305 closes at its contacts 306 a series operating circuit is completed for the point selection relay 600 associated with the first point, and the series point relay (odd) 560, which is arranged to operate as the equipment steps on each of the odd points. The circuit energizing extends from negative battery over the winding of relay 600, conductor 195', contacts 554, contacts 573, the winding of relay 560, conductor 30, contacts 453, 444, and 306 to positive battery.

Point selection relay 600 operates and at its contacts 607 prepares an operating circuit for the second point selection relay 610. Series point relay (odd) 560 operates and at its contacts 565 extends its operating circuit to the check transmitter relay 530, which relay is presently held inoperative by the shunt extending over line relay contacts 306.

Thus, responsive to the transmission of the first stepping signal (positive signal 1) by the control station, the negative supervisory line relay 460 has been released, the line relay 395 has been operated to its signal 1 position (contacts 306 closed), and the point selection relay 600 is energized in series with the series point relay (odd) 560.

Returning now to the control station equipment, it will be remembered that the stepping relay (odd) 240 is the operative relay which is effecting the application of the first stepping signal to the signal channel. Additionally, stepping relay 240 in its operation is effective at its contacts 243 to prepare a series-operating circuit for the point selection relay 360 which, associated with the first point at the control station and the series point relay (odd) 220, is operated whenever the equipment steps to an odd point. The energizing circuit for relays 360 and 220 extends from negative battery over the winding of relay 220, conductor 51, the winding of relay 360, conductor 13, contacts 136, conductor 14, contacts 243, conductor 26, and contacts 182 to positive battery.

Point selection relay 360, at the first control station point, operates and at its contacts 366 prepares in chain-advancing fashion an operating circuit for the second point selection relay 370; at its contacts 361 establishes a series-holding circuit for the series point relay (odd) 220 and itself, the circuit extending over conductor 57, resistance 249', contacts 234, conductor 26, and contacts 182 to positive battery.

Point selection relay 360 in operating is also effective at its contacts 363 to extend an operating battery to the white selection lamp associated with point one to indicate to the attendant that the equipment has stepped to that point, the circuit extending from positive battery over contacts 363, the white indication lamp 307, contacts 308 of the selection key, conductor 47, and resistance 53 to negative battery. In certain installations, it may be desirable to have the selection lamps such as 307 illuminate only when the equipment is brought to rest on the associated point and not as the equipment passes over the points. Such arrangement is effected by eliminating the resistance 53 and negative battery connection.

The stepping of the equipment off normal is necessarily communicated to the attendant to provide an accurate picture of the condition of the equipment and such off-normal indication is accomplished by an off-normal relay 130. As the series point relay (odd) 220 operates in series with the point selection relay 360, it is effective at its contacts 223 to complete an operating circuit for the off-normal relay 130, the circuit extending from negative battery over the winding of relay 130, conductor 17, contacts 223, conductor 26, and contacts 182 to positive battery.

As the off-normal relay 130 responsively operates it is effective at its contacts 137 to complete a self-holding circuit which extends over contacts 137, conductor 18, contacts 215 and conductor 26 and contacts 182 to positive battery, whereby the holding circuit for the off-normal relay is transferred to the series point relay (odd) 220 and the series point relay (even) 212. Off-normal relay 130 at its contacts 131 completes an obvious operating circuit for off-normal start relay 140, and at its contacts 132 interrupts the energizing circuit for series point relay (even) 212 to effect the release thereof.

Off-normal start relay 140 operates and at its contacts 144 establishes a holding circuit for line supervision relay 170 which extends from negative battery over the winding of relay 170, and contacts 159, 144 and 173 to positive battery.

Off-normal start relay at its contacts 142 also extends operating potential to the off-normal lamp 178, the circuit therefor extending from negative battery over resistance 95, lamp 178, contacts 142, 144 and 173 to positive battery. Off-normal relay 130 at its contacts 133 also prepares a point in a line circuit for circumventing the rectifier unit 92' and bypassing the resistance 92 connected in the line circuit at that point.

Returning once more to the series point relay (odd) 220 (which effected operation of the off-normal relay 140 above), the series operating circuit for the reset relay 274, the auxiliary start relay 100, and the stepping relay (odd) 240 are interrupted by relay 220 with the opening of its contacts 221.

Reset relay 274 releases and at its contacts 281 interrupts the holding circuit for the control pulsing relay 180' to effect the release thereof.

As the stepping relay (odd) 240 releases, it is effective at its contacts 245 and 247 to interrupt the transmission of the first stepping signal. Since the required length of the stepping signals in various localities and installations will vary, means are provided for adjusting the impulse transmitting period. Such means comprise a resistance 222' which is connected in shunt of the stepping relay (even) 230 by contacts 214 of the series point relay (even) 212 to lengthen the release time of stepping relay (even) 230. Alternatively the resistance 222' is connected in shunt of stepping relay (odd) 240 by contacts 222 of the series point relay (odd) 220 to lengthen the release time of the stepping relay (odd) 240, the resistance shunt being effective in both cases to lengthen the release time of the stepping relay and to provide a longer stepping pulse. In the event that a shorter pulse is desired, the resistance may be eliminated completely. Pulses of different lengths may of course be effected by connecting resistances of various sizes shunt of the stepping relays.

*Substation sends revertive signal to indicate completion of first step*

It will be remembered that as the first stepping impulse was received, the point selection relay 600 (for the first point) and the series point relay (odd) 560 were operated in series. As the series point relay (odd) 560 operated it was effective at its contacts 565 to extend the series operating circuit to check transmitter relay 530, which is held inoperative by the shunt extending over the closed line relay contacts 306.

As the first stepping impulse is now terminated, responsive to release of the control station stepping relay (odd) 240, the substation line relay 305 will restore its armature to its mid position to open contacts 306.

As the shunt is now removed by the opening of the contacts 306, the check transmitter relay 530 energizes over the circuit extending from positive battery over the winding of relay 530, contacts 565, the winding of relay 560, contacts 573, contacts 554, conductor 195', and the winding of point selection relay 600 to negative battery.

Check transmitter relay 530 is arranged to execute signal transmission at the proper time periods and as it now operates is effective at its contacts 531 and 533 to apply a negative signal (signal 2) to the signal channel to indicate to the control station equipment that the substation equipment has stepped and that the circuit breaker is in the tripped condition (signal 2 indicating a tripped circuit breaker and signal 1 indicating a closed circuit breaker at the point to which the equipment has stepped).

Specifically, as contacts 532 and 534 are closed, negative potential is extended over resistance 425, contacts 437, C70, and contacts 532 to channel conductor 61, and positive potential is extended over resistance 426, contacts 439, C72, and contacts 534 to channel conductor 62. The manner in which check determining relay 430 cooperates with the check transmitter relay 530 will be more fully disclosed hereinafter.

The control station relay 180 responds to the negative signal (signal 2) to move its armature to close contacts 182 (Figs. 10 and 11e).

As the check transmitter relay 530 operates to transmit the revertive negative signal, it is also effective at its contacts 538 to complete an operating circuit for the odd-even relay 580, the circuit extending from negative battery over the winding of relay 580, contacts 563, contacts 538, conductor 81, and contacts 465 and 414 to positive battery.

Odd-even relay 580 is arranged to operate on odd steps and release in even steps to "steer" the control pulses to the proper control circuits. As the relay now operates it is effective at its contacts 583 to complete a holding circuit which extends from negative battery over the winding of odd-even relay 580, contacts 583, contacts 574, conductor 81, and contacts 465 and 414 to positive battery; and at its contacts 586 to complete an operating circuit for the substation off-normal relay 550, the circuit extending from negative battery over the winding of relay 550, contacts 536, conductor 81, and contacts 465 and 414 to positive battery.

Off-normal relay 550 operates and at its contacts 551 completes a self-holding circuit extending over contacts 551, conductor 81, and contacts 465, 414 to positive battery; and at its contacts 554 interrupts the series operating circuit for the series point relay (odd) 560 and the check transmitter relay 530.

As the check transmitter relay 530 restores, it is effective at its contacts 532 and 534 to interrupt the transmission of the negative signal to the control station.

The first point selection relay 600 and the odd-even relay 580 are maintained operated however, the holding circuit for the point selection relay 600 extending from negative battery over contacts 601 over the winding of the relay 600, contacts 601, contacts 585, resistance 587, conductor 81, and contacts 465 and 414 to positive battery; and the odd even relay 580 is maintained operated over a circuit extending over contacts 583, 574, conductor 81, and contacts 465, 414 to positive battery.

The control station line relay 180 responds to the revertive negative signal on channel conductors 61 and 62 by operating its armature to close its negative contacts 182, the circuit for the line relay extending from positive battery at the substation over resistance 426, contacts 439, conductor 72, contacts 534, conductor 62, contacts 246, 236, 275, 258, 251, contacts 138, the left hand winding and right hand windings of relay 180, conductor 25, contacts 253, 260, 277, 238, 248, conductor 61, contacts 532, conductor 70, contacts 437, resistance 425 to negative battery.

At this point, therefore, the equipment at the substation has stepped to point one and an indication in the form of a negative supervisory signal has been sent thereby to the control station to indicate that the circuit breaker at point one is in the tripped condition. The control station accepts such impulse and supplies the indicative impulse to comparison equipment to establish that the control board indicating equipment is operated to provide the correct position of the circuit breaker at point one.

*Control station responds to revertive signal following first stepping impulse*

As control station line relay 180 moves its armature to close negative contacts 182 responsive to receipt of the negative revertive signal, an operating circuit is completed for the trip supervisory relay 120 which extends from negative battery over resistance 90, the winding of trip supervisory relay 120, and contacts 182 to positive battery. Relay 120 operates and at its make-before-break contacts 122 prepares a series energizing circuit for the even stepping relay 230.

As the negative revertive signal is removed from the channel the line relay 180 restores its associated armature to the neutral position.

A comparison of the position indicated by the control board equipment and the position of the circuit breaker as indicated by the revertive signal is now made and assuming that the indications agree, a series operating circuit for stepping relay (even) 230 and trip supervisory relay 120 is completed. Specifically, as line relay 180 now releases, to open contacts 182, the original shunt circuit for the series circuit is removed and the stepping relay (even) 230 operates in series with the trip supervisory relay 120, the circuit extending from negative battery over resistance 90, winding of relay 120, contacts 122, conductor 22, contacts 217, conductor 59, contacts 362, contacts 302, conductor 2, contacts 111, 101, 151, conductor 6, the winding of stepping relay 230, contacts 213, contacts 209, conductor 9, contacts 148 and 133 to positive battery.

*Transmission of second stepping signal by control station (negative for even steps)*

Inasmuch as the revertive signal indicated the circuit breaker at point one is in the tripped position and the indication relay 304 is restored to illuminate the green trip lamp 305 at point one, the equipment now permits stepping relay (even) 230 to operate over the circuit described and at its contacts 235 and 237 the relay impresses a negative signal (signal 2) on the signal channel conductors 61 and 62, positive battery being applied to conductor 62 over resistance 178, conductor 29, contacts 235 and 246, and negative battery being applied to conductor 61 over resistance 179, C35 and contacts 237 and 248.

At the control station, the stepping relay (even) 230 in operating to initiate transmission of the second stepping impulse is also effective at its contacts 233 to complete a series circuit for point relay (even) 212 and the point selection relay 370, the circuit extending from negative battery over the winding of relay 212, conductor 52, winding of relay 370, contacts 366, conductor 54, contacts 233 and 279 to positive battery.

Point selection 370 at control station point two operates and at its contacts 373 completes an operating circuit for the white indication lamp 328 at point two on the control board to indicate to the attendant thereat that the equipment has been stepped thereto, the circuit extending from positive battery over contacts 373, white indication lamp 328, contacts 329 on selection key 339, conductor 47 and resistance 53 to negative battery.

Point selection relay 370 at its contacts 371 also completes a self-holding circuit which extends over conductor 56, resistance 249, contacts 244 and contacts 279 to positive battery, such holding circuit also being effective for the series point relay (even) 212.

Series point relay (even) 212 in operating is effective at its contacts 213 and 217 to interrupt the energizing circuit for the trip supervisory relay 120 and the stepping relay (even) 230 to effect the restoration thereof. The restoring time of stepping relay 230 (and the length of the impulse) is affected by the value of the resistance 222' which is connected in shunt of stepping relay 230 by the closed contacts 214. The delayed release of series point relay 220 is also important in the provision of a time interval which is sufficient to permit the release of trip supervisory relay 120 prior to the release of series relay 220. Failing such arrangement the operation of the trip supervision relay 120 in series with the stepping relay (odd) 240, might possibly occur at this time.

Series point relay (even) 212, at its contacts 216, interrupts the series holding circuit for the first point selection relay 360 and the series point relay (odd) 220, to effect the restoration thereof.

The release of the point selection relay 360 effects the opening of contacts 363 and the extinguishing of white selection lamp 307 at point one on the control panel to indicate to the attendant that the equipment has stepped off of that point.

As the stepping relay (even) 230 releases after the elapse of the predetermined delay period, it is effective at its contacts 235 and 237 to terminate the transmission of the second stepping signal.

*Substation steps to second point*

It is apparent therefore that the control station responds to the receipt of the revertive signal from the substation to compare the indicated and recorded positions for the circuit breaker at point one and, said point being an odd point, thereafter sends a negative signal to the substation for effecting the advancement of that equipment to the following point two (even).

Substation line relay 305 operates responsive to receipt of the second stepping (negative in nature) to move the armature to close the negative contacts 304 (Figs. 10 and 11c) and thereby initiates stepping of the substation to the second point. Specifically, as substation line relay 305 closes contacts 304, a series operating circuit for the point selection relay 610 (associated with point two) and the series point relay (even) 570 is completed, the circuit extending from negative battery over the winding of relay 610, contacts 607, conductor 199', winding of relay 570, conductor 79, and contacts 464, 442, and 304 to positive battery.

Point selection relay 610 operates and at its contacts 615 completes an operating circuit for the check determining relay 430, which circuit extends from negative battery over resistance 416, the winding of relay 430, C77, contacts 535, 771, C197, and contacts 614, 651 and 686 to positive battery. Check determining relay 430 is arranged to control the nature of the signal which is applied to the signal channel conductors 61 and 62 by the check transmitter relay 530. Specifically, whenever the equipment steps to a point at which the circuit breaker is in the tripped condition, the associated auxiliary contacts such as 686 will be open and the check determining relay 430 will be maintained inoperative whereby it is effective at its contacts to prepare a circuit for applying a negative revertive signal to the channel. However, when the circuit breaker on the point to which the equipment has stepped is in the closed position, the auxiliary switch contacts such as 686 will be closed, and a circuit will be completed to the check determining relay 430 in the manner just described. Relay 430 in its operating condition prepares a circuit for applying a positive revertive signal to the channel whereby the nature of the revertive signal clearly indicates to the control station the position of the circuit breaker at the selected point.

Series point relay (even) 570 operates and at its contacts 576 extends its own operating circuit to the check transmitter relay 530 which is held inoperative by the shunt extending over the closed contacts 304 of the line relay 305.

As the transmission of the stepping impulse signal by the control station is terminated, the substation line relay 305 responsively restores the armature to its neutral mid-point position to open the contacts 304, and to remove the shunt for the check transmitter relay 530, which immediately operates in series with the second point selection relay 610 and the series point relay (even) 570.

Check transmitter relay 530 operates and at its contacts 532 and 534 applies the prepared positive signal to the signal channel conductors 61 and 62 to indicate to the substation that the equipment has stepped to the next point and that the circuit breaker at that point is in the closed position. Specifically, positive potential is applied to conductor 61 over resistance 426, contacts 436, C70 and contacts 532; and negative potential is applied to conductor 62 over resistance 425, contacts 438, C72, and contacts 534. The positive signal is applied to the channel for the period that the check transmitter relay 530 is maintained operated. Check transmitter relay 530 at its make before break contacts 535, and 536 also completes a holding circuit for the operated check determining relay 430 which extends from negative battery over resistance 416, the winding of relay 430, contacts 536, 439' to positive battery; and at its contacts 537 interrupts the holding circuit for the odd-even relay 580 to effect the release thereof.

Odd-even relay 580 in restoring is effective at its contacts 585 to interrupt the holding circuit for the first point selection relay 600, and its contacts 584 completes a holding circuit for the second point selection relay 610 which extends from negative battery over the winding of relay 610, contacts 611, hold conductor 197', contacts 584, resistance 587, conductor 81, and contacts 465 and 414 to positive battery.

As the first point selection relay 600 releases to open its contacts 607, the energizing circuit for the series point (even) relay 570 and the check transmitter relay 530 are interrupted to effect the release thereof. Check transmitter relay 530 in releasing terminates the transmission of the positive revertive signal (signal 1) to the control station and at its contacts 535 interrupts the holding circuit for check determining relay 430 to effect restoration thereof.

The control station line relay 180 responds to the revertive positive signal to close its positive contacts 181 (Figs. 10 and 11e), and initiate the comparison of the information taught by the incoming signal with that recorded on the control station equipment. Specifically, with closure of positive contacts 181, an energizing circuit is completed for the close supervisory relay 110, which operates and prepares a series operating circuit for the stepping relay (odd) 240 which is presently shunted by contacts 181 at its make-before-break contacts 113.

As the transmission of the positive revertive impulse is terminated at the substation, the control station line relay 180 restores its armature to its neutral position and opens the energizing circuit for the close supervision relay 110.

With the restoration of the line relay 180 responsive to termination of the positive signal the shunt for the operating circuit for stepping relay (odd) 240 is removed, and the relay is operated over a circuit extending from negative battery over resistance 90, the winding of relay 110, contacts 113, conductor 22, contacts 225, conductor 58, contacts 372, contacts 314 (it being remembered that it has been assumed that the equipment at point two shows the circuit breaker to be in the closed condition and accordingly indication relay 310 is in the operated condition), conductor 3, contacts 121, contacts 101, contacts 151, conductor 6, the winding of stepping relay (odd) 240, contacts 221, contacts 209, conductor 9, and contacts 148 and 133 to positive battery.

*Transmission of third stepping signal to control station*

The recorded information at point two on the control board being in agreement with the information taught by the revertive impulse, the stepping relay (odd) 240 now operates (as it did to transmit the first impulse) to send out the third stepping impulse. Inasmuch as the third point is odd, a positive signal (signal 1) is transmitted by relay 240 at its contacts 245, 247, positive battery being connected to conductor 61, over resistance 178, C29 and contacts 247; and negative battery being connected to conductor 62 over resistance 179, C35 and contacts 245.

Stepping relay (odd) 240 also effects closure of its contacts 243 to complete a series operating circuit for the series point relay (odd) 220 and the point selection relay 380 for the third point, the circuit extending from negative battery over the winding of relay 220, conductor 51, the winding of relay 380, contacts 376, C55, and contacts 243 and 279 to positive battery.

Point selection relay 380 operates and at its contacts 386 prepares a circuit for point selection relay 390 and at its contacts 383 connects positive battery to the white indication lamp 348 to indicate to the attendant that the equipment has stepped to the third point.

The circuit for the indication lamp extends from positive battery over contacts 383, white indication lamp 348, contacts 349, conductor 47, and resistance 53 to negative battery.

The series point relay (odd) 220 operates and at its contacts 221 interrupts the series holding circuit for the close supervisory relay 110 and the stepping relay (odd) 240 to effect the release thereof. Relay 220 is also effective at its contacts 224 to interrupt the series energizing circuit for the series point relay (even) 212 and the second point selection relay 370 to effect the restoration thereof. As point selection relay 370 restores, it is effective at its contacts 373 to open the energizing circuit for the white selection lamp 328 associated with point two to effect the extinguishment thereof. At this time, therefore, the attendant is informed by the white indication lamp 348 that the equipment has stepped to the third point.

*Substation response to receipt of third stepping signal*

As the positive stepping signal is received at the substation, line relay 305 responds to the third stepping impulse to move its armature to close contacts 306 (Figures 10 and 11c) and to thus complete a series operating circuit for the series point relay (odd) 560 and the point selection relay 620 at the third point, the circuit extending from negative battery over the winding of relay 620, contacts 617, conductor 198', contacts 573, the winding of series point relay (odd) 560, conductor 89, and contacts 453, 444, and 306 to positive battery. Series point relay (odd) 560 operates and at its contacts 565 extends its operating source of positive potential to the check transmitter relay 530 which is held inoperative by the shunt circuit extending over line relay contacts 306.

It will be remembered that it has been assumed that it was the automatic trip of the circuit breaker at point three which initiated the stepping of the equipment and accordingly the auxiliary switch contacts 696 associated with that circuit breaker will be in the open position. It will also be remembered that in the event that the breaker trips to initiate the operation of the system and then recloses automatically, the system will run over the entire set of points once giving a trip indication on the first passage, and a close indication on the second passage thereover.

This being the first passage over the points responsive to the automatic trip of the circuit breaker at point three, the trip indication signal is transmitted to the control station at this time.

Specifically, as the line relay 305 releases responsive to termination of the third stepping impulse it is effective at its contacts 306 to interrupt the shunt circuit for the check transmitter relay 530 to permit the operation thereof in series with the series point relay (odd) 560 and the point selection relay 620 (associated with point three). Check transmitter relay 530 operates and at its contacts 532 and 534 connects a negative signal to the signal channel (the circuit breaker on point three having been tripped and the check determining relay 430 being therefore inoperative to prepare transmission of a negative signal), the positive potential being applied to conductor 62 over resistance 426, contacts 439, C72, and contacts 534, and the negative potential being applied to conductor 61 over resistance 425, contacts 432 and 532.

Check transmitter relay 530 at its contacts 538 completes an operating circuit to the odd-even relay 580 over a circuit extending from negative battery over the winding of odd-even relay 580, contacts 563, contacts 538, conductor 81, contacts 465 and 414 to positive battery.

Odd-even relay 580 operates and at its contacts 584 interrupts the holding circuit for the point selection relay 610, and at its contacts 585 completes a holding circuit for point selection relay 620, for the third point, by extending the positive potential on conductor 81 over contacts 585 and conductor 196' thereto.

As the point selection relay 610 for the second point releases, it is effective at its contacts 617 to interrupt the energizing circuit for the series point relay (odd) 560 and the check transmitter relay 530 and effect the restoration thereof. As the check transmitter relay 530 now restores to open contacts 532 and 534, it terminates the transmission of the revertive negative impulse to the control station.

Referring now to the control station it is apparent that as the revertive negative signal is impressed on the signalling channel, control station line relay 180 is operated to close negative contacts 182 (Figures 10 and 11e) and an operating circuit is completed for the trip supervisory relay 120 as it was when the previous negative signal was received (see the first revertive signal).

A series circuit is also prepared for trip supervisory relay 120 and the stepping relay (even) 230, but the series circuit is shunted by the line relay contacts 182 pending comparison of the information taught by the revertive signal relative to the position of the circuit breaker at point three and the position indicated on the control station panel at point three.

It will be remembered that the red indication lamp 347 is in the energized condition (as is the point selection relay 380) to indicate to the attendant thereat that the breaker is in the closed condition. However, as previously pointed out, it is the automatic trip of the circuit breaker at point three which initiated the operation of the equipment and accordingly there is disagreement between the indication provided by the received revertive signal and the indications existing on the control board at point three.

Specifically, the revertive signal is negative to indicate the tripped condition of the circuit breaker and the trip supervisory relay 120 is operative to establish the comparison of that signal with the indication at the control board. Since the control board is at variance with the signal, that is, indication relay 320 at point three is operated to indicate an operated breaker, and the operation of the trip relay 120 by the signal indicates the breaker is tripped, a conforming operation is required prior to continuation of the stepping. Such conforming operation is effected over the contacts 323 of the indication relay 320 and the contacts 121' of the trip supervisory relay 120 to the disagreement relay 127.

Digressing slightly, it is apparent that whenever the indication relay such as 320 at the control board is released to indicate trip and the incoming signal is negative to operate the trip relay 120 the contacts of the two relays steer the operating circuit to the next stepping relay. Likewise, if the indication relay at the point concerned is operated to indicate a closed circuit breaker and the incoming signal is positive to operate the close relay 110 the two relays at their contacts extend the operating circuit to the next stepping relay. However, if the position of the indication relay disagrees with the position indicated by the operated one of the trip and close relays 120 and 110, the operating circuit is steered to the disagreement relay 127. Thus in this instance, with the indication relay 320 operated to indicate a closed breaker and the trip supervisory relay 120 to indicate a tripped breaker, a circuit is completed for the disagreement relay 127 instead of the stepping relay 230 which would normally be operated at this point. Specifically, with the removal of the shunt responsive to release of the line relay 180 as the incoming negative revertive signal is terminated, a series energizing circuit is completed for the trip supervisory relay 120 and the disagreement relay 127 which extends from negative battery over resistance 90, the winding of relay 120, contacts 122, conductor 22, contacts 217, conductor 59, contacts 382, contacts 324, conductor 3, contacts 121', the left hand winding of the disagreement relay 127, contacts 148 and 133 to positive battery.

Disagreement relay 127 operates and at its contacts 128 completes a series operating circuit over its second winding to the warning relay 350, the circuit extending from negative battery over the winding of warning relay 350, contacts 352, contacts 385, conductor 19, contacts 128, the right hand winding of disagreement relay 127, conductor 7, contacts 209, conductor 9 and contacts 148 and 133 to positive battery.

The warning relay 350 operates and at its make-before-break contacts 353 locks to positive battery through the flash release key 192, and the selection key 357 associated with the third point. Disagreement relay 127 in operating also effects the release of the indication relay 320 associated with the third point by applying positive potential to the windings of the operated relay. It will be remembered that the indication relays are of the type which are operated through the application of the negative potential to both of the windings and released by the application of positive potential thereto. The lower winding is provided with fewer turns than the upper winding so that the relay may lock up with the two windings in series even though they are energized in opposition. As positive potential is applied the upper winding is shunted and with the increase of opposing current flow through the lower winding the release of the relay is quickly effected.

Accordingly, as the disagreement relay 127 operates to connect positive battery to the winding of the indication relay 320 over a circuit extending from positive battery over contacts 124, contacts 129, conductor 21 and contacts 384, the upper winding is shunted out and the current flow through the lower winding is increased in an opposite direction to effect the release of the relay 320.

As the indication relay 320 releases and the warning relay 350 operates, the operating and holding circuits for the disagreement relay 127 are opened to effect the release thereof. Specifically, indication relay 320 at its contacts 313 opens a point in the circuit for the left hand winding of disagreement relay 127 and flashing relay 350 at its contacts 352 opens a point in the energizing circuit for the right hand winding of relay 127. Indication relay 320 in releasing is also effective at its contacts 322 to interrupt the energizing circuit for the red close indication lamp 347 and at its contacts 321 completes an operating circuit for the green trip indication lamp 346.

Warning relay 350 is operative at its contacts 352' to connect the trip indication lamp 346 to a flashing circuit as an indication that an automatic trip has occurred. Specifically, the flashing of lamp 346 is initiated by the closure of warning relay contacts 351, an operating circuit being completed for the auxiliary flashing relays 156 and 165 which extends from negative battery over the winding of relay 165, contacts 157, conductor 49, and contacts 351 to positive battery. Auxiliary flashing relay 165 operates and at its contacts 166 completes an obvious operating circuit for a cooperating interrupter relay 156 which operates, and, in turn, at its contacts 157 opens the operating circuit to the first flashing relay 165.

Relay 165 releases and at its contacts 166 opens the operating circuit to the cooperating relay 156 to effect the release thereof, relay 156 in its subsequent release being effective at its contacts 157 to reclose the operating circuit to the first interrupter relay 165 to effect the reoperation thereof. Cycling of the two relays proceeds in this manner until the original energizing circuit therefor is interrupted.

The relays are of the slow-to-release type and accordingly each release of the relays requires a given predetermined length of time. With the alternate energization and deenergization of the interrupting relay 165 in this manner, contacts 161 are alternately opened and closed to intermittently connect alternating current to conductor 50 to thereby effect the intermittent energization of the green trip lamp 346 which is connected to conductor 50 over contacts 352' and contacts 321. The flashing of the green indication lamp is designed to visually inform the attendant that an automatic change of indication is occurring. The second interrupting relay 156 in its intermittent operation and release effects the repeated energization and deenergization of an alarm bell 177 to provide an audio signal for the attendant, the circuit extending from negative battery over resistance 94, the alarm bell 177, contacts 158, contacts 163, conductor 49, and contacts 351 to positive battery. The bell and the lamp are intermittently and alternately energized to attract the attention of the attendant until such time as the flash release key 192 is operated, whereby the energizing circuit for the warning relays 350 is interrupted to release same and effect interruption of the circuits for the flashing relays 165 and 156. Inasmuch as the control station indicating equipment is now in agreement with the substation equipment, the stepping may continue and as the indication relay 320 releases, it is effective at its contacts 322 to complete a series operating circuit for the stepping relay (even) 230 and the trip supervisory relay 120, the circuit extending from negative battery over resistance 90 and the winding of relay 120, contacts 122, conductor 22, contacts 217, conductor 59, contacts 382, contacts 323, conductor 2, contacts 111, contacts 101, contacts 151, conductor 6, the winding of relay 230, contacts 213, contacts 209, conductor 9, contacts 148 and 133 to positive battery.

*Transmission of fourth stepping signal*

As the stepping relay (even) 230 operates it is effective at its contacts 235 and 237 to impress a negative operating signal (signal 2) on the signal channel conductor 61 and 62 (Figures 10 and 11c), positive potential being applied to conductor 62 over resistance 178, C29, contacts 235 and 246 and negative potential being applied to conductor 61 over resistance 179, conductor 35, and contacts 237 and 248.

The stepping relay (even) 230 is also effective at its contacts 233 to complete a series operating circuit for the series point relay (even) 212 and the point selection relay 390, the circuit extending from negative battery over the winding of relay 212, conductor 52, the winding of relay 390, contacts 386, conductor 54, contacts 233 and 279 to positive battery.

Point selection relay 390 operates and at its contacts 391 completes a self-holding circuit extending from positive battery over the contacts 279, 244, resistance 249, C56, contacts 391, the winding of relay 390, conductor 52 and the winding of relay 212 to negative battery. Point selection relay 390 at its contacts 394 connects operating potential to the white selection lamp 357 for the fourth point to illuminate the lamp and indicate to the attendant that the equipment has stepped to this point, the circuit extending from positive battery over contacts 394, lamp 357, contact 367 of the selection key 377, conductor 47, and resistance 53 to negative ground.

Metering points, such as shown as point four, do not require indication relay equipment, such as shown at points one to three inclusive, the point selection relay 390 being arranged at its contacts 392 etc. to prepare an energizing circuit for the metering equipment.

The series point relay (even) 212 operates and at its contacts 213 and 217 interrupts the series-energizing circuit for the trip supervisory relay 120 and the stepping relay (even) 230; and at its contacts 216 interrupts the series operating circuit for the point selection relay 380 (associated with the third point) and the series point relay (odd) 220. Series point relay 212 holds up after the release of the series point relay (odd) 220 over a circuit extending from positive battery over contacts 279, contacts 224, resistance 249, conductor 56, contacts 391, the winding of relay 390, conductor 52 and the winding of relay 212 to negative battery.

The point selection relay 380, associated with the third point, releases and at its contacts 382 interrupts the energizing circuit for the white selection lamp 348 associated with the third point to indicate to the attendant that the equipment has left that point.

As stepping relay (even) 230 releases to open its contacts 235 and 237 the transmission of the fourth stepping pulse (negative) is terminated.

*Substation response to fourth stepping signal*

As the fourth stepping impulse (negative) was applied to the signal channel, the substation line relay 305 operated its negative contacts 304 to the closed position to complete a series operating circuit for the series point relay (even) 570 and the point selection relay 630 associated with the fourth point, the circuit extending from negative battery over the winding of the point selection relay 630, contacts 627, step conductor 199', the winding of relay 570, conductor 79, and contacts 463, 442, and 304 to positive battery.

The series point relay (even) 570 operates, and at its contacts 577 extends the operating round to the check transmitter relay 530 which is presently held inoperative by the shunt imposed over the closed contacts 304 of the operated substation line relay 305.

As the negative stepping signal is terminated, the line relay 305 releases and restores its armature to its neutral mid-point position to open the contacts 304 and remove the shunt from the check transmitter relay 530. The check transmitter relay 530 responsively operates in series with the series point relay (even) 570 and the point selection relay 630 for the fourth point, the circuit extending from positive battery over relay 530, contacts 576 and the windings of the relays 570 and 630 to negative battery.

It is to be remembered that point four has been designated as a metering point and, as previously mentioned, metering points are arranged to effect the transmission of a trip supervision signal to the control station whenever the point is reached in a stepping operation. That is the check determining relay 430 is held inoperative whenever the equipment steps on a metering point. Accordingly, as the check transmitter relay 530 now operates to close its contacts 532 and 534 to send a revertive signal which is indicative of the stepping of the equipment to metering point four, a negative signal (signal 2) is applied to the signal channel conductors 61 and 62, the signal application extending over the same circuits described when the signal for the first point was transmitted.

Check transmitter relay 530, at its contacts 537, interrupts the holding circuit for the odd-even relay 580 which releases and at its contacts 584 interrupts the holding circuit for the point selection relay 620 associated with the third point to effect the release thereof, and at its contacts 585 completes a holding circuit for the point selection relay 630 associated with the fourth point.

Point selection relay 620 releases and at its contacts 627 interrupts the operating circuit for the series point relay (even) 570 and the check transmitter relay 530 to effect the release thereof and to thus terminate the transmission of the negative signal to the control station.

It is apparent therefrom that a short negative revertive signal is transmitted to the control station whenever the equipment steps to a metering point.

*Transmission of fifth stepping signal*

Control station line relay 180 is operated to close negative contacts 182 responsive to receipt of the revertive negative signal from the substation and the trip supervision relay 120 is again operated by the closed contacts 182 in the manner heretofore described, the relay 120 being operated by the revertive signal which follows stepping of the equipment to a metering point or a point having an open circuit breaker condition. As relay 120 operates it prepares an operating circuit for the stepping relay 240 which is shunted temporarily by the operated line relay 180 at its contacts 187.

Inasmuch as the equipment is cycling to pick up a change of position of a circuit breaker, metering will not be effected at this time and the equipment steps over this point. Specifically, as the line relay 180 deenergizes responsive to termination of the incoming impulse, contacts 182 are opened and the existing shunt is removed from the stepping relay (odd) 240 to effect the operation thereof in series with the trip supervisory relay 120, the series operating circuit extending from negative battery over resistance 90, the winding of relay 120, contacts 122, conductor 22, contacts 225, conductor 58, contacts 395, conductor 1, contacts 101, contacts 151, conductor 6, winding of relay 240, contacts 221, 209, conductor 9, and contacts 147, and 133 to positive battery.

Stepping relay (odd) 240 operates and at its contacts 245 and 247 connects a positive signal (the fifth point being an odd step) to the signalling channel conductors 61 and 62 to effect stepping of the equipment to the fifth step. Stepping relay (odd) 240 at its contacts 243 also completes an operating circuit for the series point relay (odd) 220 in series with the point selection relay 830 for the fifth point, the circuit extending from positive battery over contacts 279, contacts 243, conductor 55, contacts 396, the winding of relay 830, conductor 51 and the winding of relay 220 to negative battery.

Series point relay (odd) 220 operates and at its contacts 225 interrupts the series operating circuit for the trip supervisory relay 120 and the stepping relay (odd) 240 to effect the restoration thereof, and at its contacts 224 interrupts the holding circuit for the point selection relay 390 (for the fourth point) and the series point relay (odd) 220.

The point selection relay 830 for the fifth point operates over the described circuit and the attendant is thus informed that the equipment has stepped to the fifth point.

The point selection relay 390 restores almost simultaneously and at its contacts 394 interrupts the energizing circuit for the white selection lamp 359 on point four to extinguish same. As the stepping relay (odd) 240 now restores it is effective to open its contacts 245 and 247 to terminate transmission of the fifth stepping impulse.

*Substation response to receipt of fifth stepping signal*

Substation line relay 305 responds to the application of the stepping impulse (positive) to the signal channel to operate its armature to close the positive contacts 306 and to complete a series operating circuit for the point selection relay 710 associated with the fifth substation point, and the series point relay (odd) 560, the circuit extending from negative battery over the winding of relay 710, contacts 634, conductor 198', contacts 573, winding of relay 560, conductor 80, contacts 453 and 444 and 306 to positive battery.

Assuming the circuit breaker at point five is in the operated condition, the auxiliary contacts 751 thereon will be in the closed position and an operating circuit for the check determining relay 430 will be completed, the circuit extending from negative battery over resistance 416, the winding of relay 430, conductor 77, contacts 535, contacts 562, conductor 199, contacts 714, 721 and 751 to positive battery.

Check determining relay 430 operates and at its contacts 436 and 438 prepares the circuit for applying a negative operating signal to the channel conductors 61 and 62.

The series point relay (odd) 560 is also effective at its contacts 565 to extend its operating circuit to the check transmitter relay 530 to prepare such relay for the transmission of the negative signal. Check transmitter relay 530 is presently held inoperative, however, by the shunt imposed on that circuit by the closed line relay contacts 306.

As the incoming fifth stepping impulse is now terminated the substation line relay 305 will release and at its contacts 306 removes the shunt from the check transmitter relay 530 which immediately operates and at its contacts 531 and 534 applies the negative signal prepared by the check determining relay 430 to the signal channel conductor 61 and 62 to indicate to the control station that the circuit breaker at the fifth point is in the closed position.

Check transmitter relay 530 at its contacts 538 completes an operating circuit for the odd-even relay 580 in the same manner that such circuit was completed responsive to receipt of the first and third stepping impulses. As the odd-even relay 580 operates it is effective at its contacts 584 to interrupt the holding circuit for the point indication relay 630 associated with the fourth point, which in restoring is, in turn, effective at its contacts 634 to interrupt the holding circuit for the series point relay (odd) 560 and the check transmitter relay 530 to effect the restoration thereof.

The check transmitter relay at its contacts 535 interrupts the holding circuit for the check determining relay 430 to effect the release thereof and at its contacts 532 and 534 interrupts the transmission of the revertive negative signal over the signal channel conductors.

*Control station response to revertive signal on fifth step*

Control station line relay 180 is operated responsive to the application of the negative signal to the signal channel to effect the closure of the negative contacts 182 and to thereby complete the operating circuit for the trip supervisory relay 120. As the trip supervisory relay 120 operates it is effective at its contacts 122 to prepare a comparing circuit for the fifth point to determine the agreement of the indicated and recorded position of the circuit breaker at substation point five, such circuit being temporarily shunted by the line relay contacts 182.

Assuming the equipment at point five indicates the circuit breaker to be in the tripped condition, the indication relay 810 will be released and the circuit for the green trip lamp 841 completed. With the termination of the incoming revertive signal the line relay 180 will restore to open its contacts 182 and, the recorded and indicated positions being in agreement, effects the energization of the stepping relay 230 to initiate transmission of the finishing supervisory pulse to the substation.

The last point in the disclosed equipment being an odd point (point 5), the finishing supervisory pulse will necessarily be that effected for an even point (a negative signal). Accordingly, as the shunt circuit is removed by opening of contacts 182, the stepping relay (even) 230 is operated in series with the trip supervisory relay 120 and is effective at its contacts 235 and 237 to apply a negative signal to the signal channel conductors 61 and 62.

It is apparent that if the last point in the equipment were an even point, a positive supervisory impulse would be transmitted by the stepping relay 240 after the equipment has moved to the last point.

As the stepping relay (even) 230 now operates to apply the negative signal to the signal channel, it is also effective at its contacts 233 to complete operating circuit for the series point relay (even) 212, the circuit extending from negative battery over the winding of relay 212, conductor 52, contacts 839, conductor 54, contacts 233 and 279 to positive battery.

Series point relay (even) 212 operates and at its contacts 217 interrupts the series energizing circuit for the trip supervisory relay 120 and the stepping relay (odd) 240 to effect the release thereof, and is effective at its contacts 216 to interrupt the series holding circuit for the point selection relay 830 (associated with the fifth point) and the series point relay (odd) 220, to effect the release thereof.

The point selection relay 830 restores and at its contacts 833 interrupts the energizing circuit for the white selection lamp 843 to effect the release thereof and to indicate to the attendant that the equipment has stepped from point five. The point selection relay 830 at its contacts 839 interrupts a point in the operating circuit for the series point relay (even) 212 to effect the restoration thereof.

It is noted at this time that both of the series point relays 212 and 220 are in the inoperative condition and accordingly contacts 215 and 223 are now both opened to interrupt the holding circuit for the off-normal relay 130. During stepping alternative ones of these contacts are closed to hold the off-normal relay operated. As the off-normal relay 130 restores, it is effective at its contacts 131 to interrupt the holding circuit for the off-normal start relay 140, which in its restoration is effective at its contacts 142 and 144 to interrupt the energizing circuit for the off-normal lamp 178 to effect the extinguishment thereof to indicate to the attendant that the equipment is preparing to restore. Off-normal start relay 140 is effective at its contacts 141 to complete a holding circuit for the step alarm relay 146.

*Response at substation to receipt of final supervisory pulse*

Substation line relay 305 responds to the incoming supervisory impulse which follows the last stepping impulse to prepare the equipment for restoration by closing its negative contacts 304 and completing a series operating circuit for the series point relay (even) 570 and the "end of round" relay 420, the circuit extending from negative battery over winding of relay 420, conductor 63, the contacts of the selection relay at the final point (in this instance contacts 719) conductor 199', the winding of series point relay (even) 570, conductor 79, contacts 463, 442 and 304 to positive battery.

End of round relay 420 operates and at its contacts 421 locks to ground over a circuit extending from negative battery over the winding of relay 420, contacts 421, resistance 409, and contacts 445 to positive battery. End of round relay 420 at its contacts 422 and 423 transfers the holding circuit of the line supervisory relay 410 to the contacts of series point relay (even) 570, the holding circuit now extending from negative battery over the winding of relay 410, contacts 422, contacts 575, conductor 81, and contacts 465 and 414 to positive battery. Series point relay (even) 570 operates and at its contacts 576 prepares a circuit to the check transmitter relay 530 which is presently shunted by the line relay contacts 304.

As transmission of the final supervisory impulse is terminated by the control station, the substation line relay 305 restores its armature to its mid-position to open contacts 304 to remove the shunt from check transmitter relay 530 to permit the operation thereof in series with series point relay (even) 570 and the "end of round" relay 420, the original energizing circuit for the series point relay (even) 560 extending over contacts 566 to the winding of the check transmitter relay 539 to positive battery.

As the check transmitter relay 530 operates it is effective at its contacts 532 and 534 to effect transmission of a negative impulse which performs no useful function at this time, and at its contacts 537 interrupts the operating circuit for the odd-even relay 580 to effect the release thereof. Odd-even relay 580 releases and at its contacts 585 interrupts the holding circuit for the fifth point selection relay 710 to effect the restoration thereof.

As point selection relay 710 restores it is effective at its contacts 719 to interrupt the energizing circuit for the series point relay (even) 570, the check transmitter relay 530, and the "end of round" relay 420. The series point relay (even) 570 in releasing is effective at its contacts 575 to interrupt the holding circuit for the line supervisory relay 410 and the point hold relay 440. "End of round" relay 420 holds over the holding circuit described heretofore.

It will be remembered that the stepping of the equipment in this example has been initiated as a result of an automatic change of position of a circuit breaker at the substation and that the circuit breaker has subsequently automatically returned to its original position. Accordingly, a second recycling of the points is effected.

Assuming first, for purposes of clarity and briefness, that the stepping of the equipment was initiated by the operation of the reset key or the loss of battery at a station or the change of position of a circuit breaker without returning to its first position, or any other similar circuit operation in which the equipment steps over the points only once.

As the line supervisory relay 410 restores it is effective at its contacts 414 to interrupt the holding circuit for the odd-even relay 580 and the off-normal relay 550 to effect the restoration thereof. As the point hold relay 440 subsequently releases, it is effective at its contacts 445 to interrupt the holding circuit for the "end of round" relay 420 to effect the release thereof and is effected at its contacts 446 to reapply operating ground to the normal supervisory relay 470. The supervisory relay 470 operates over a circuit extending from negative battery over the winding of relay 470, contacts 467, 457, 446 to positive battery and is effective at its contacts 471 to once more impress the normal supervisory signal (signal 1) on the signal channel conductors 61 and 62. The control station equipment responds to the supervisory signal and control station line relay 180 operates positive contacts 181 to the closed position. Thus the equipment at each of the stations is in its normal standby condition and normal supervision is once more established over the line channel.

It should be noted at this time that the negative signal which was applied to the line signal channel conductors 61 and 62 to effect closure of negative contacts 182 at the control station during the restoration of the substation equipment accomplished no purpose other than to momentarily energize the trip supervisory relay 129. The relay is not maintained energized following release of the line relay 180 as during stepping for the holding ground which was extended for the trip and close relays 110 and 120 during stepping has been interrupted by restoration of all of the control station point selection relays. Accordingly, the control station equipment is unaffected by this extra signal.

*Recycling of equipment*

As pointed out heretofore, a recycling of the equipment is immediately launched following a first stepping of the equipment if one of the following conditions prevails:

1. If a breaker trips and then closes automatically, the system runs through the points once to give a trip indication for the affected point on the first round and a close indication on the second round.

2. If a breaker closes automatically the system runs through the points once giving a trip indication for the affected point on the first round and a close indication on the second round.

3. If the breaker closes and then trips automatically, the system runs over the points twice to give a normal trip indication only on both rounds.

The reason for a second cycling of the equipment responsive to the occurrence of any one of these conditions is now briefly set forth. With reference to Figure 6 it will be remembered that the point indication relays 640, 650, 660 etc. are automatically restored whenever the contacts 676, 686, 696 etc. are opened by a tripping of a circuit breaker such as occurs in each of the above conditions. Further, even though the circuit breaker should close and the auxiliary contacts 676, 686, 696 etc. also reclose, the operating circuit for the point indication relay is interrupted and the relay will remain inoperative. As the first run over the points is made after the occurrence of the trip, the point indication relay, being in the restored condition, will effect transmission of a trip signal. However, the first pass or run over the points also effects the completion of the circuit to the point indication relay and will operate the relay to a position which properly indicates the line position of the circuit breaker, and as the second run is subsequently made the true indication of the circuit breaker condition is transmitted to the control office.

Considering, for example, the operation of the equipment in the event that the circuit breaker on point 3 was automatically reclosed while the equipment was stepping as a result of the automatic trip described but before the point was stepped over. As previously pointed out, a trip indication was transmitted for the third point during the first cycling of the points and according to the invention the equipment will now recycle once more to pick up the automatic closing of the circuit breaker at point three.

Referring now to the previous explanation of the operation of the equipment in its stepping over the third point, as the check transmitter relay 530 and series point (odd) 560 were restored to terminate the transmission of the revertive negative impulse by the substation to the control station to indicate a tripped circuit breaker at that point, corrective measures are immediately taken to provide the proper indication of the circuit breaker by the indication relay. Specifically, although the point indication relay 660 at the third point is still in the open position, the circuit breaker and the auxiliary switch contacts 696 are in the closed position. Thus as the series point relay (odd) 560 releases it will be effective at its contacts 561 to complete an operating circuit for the point indication relay 660, circuit extending from negative battery over the winding of relays 660, contacts 624, conductor 199, contacts 561, conductor 198, contacts 625, 696 to positive battery. Accordingly, the point indication relay 660 operates to correctly indicate the position of the associated circuit breaker.

Since the transmission of the revertive trip signal has been transmitted and a trip indication has been accomplished at the control office, steps must be taken to amend the existing discrepancy.

Point indication relay 660 operates and locks itself up over its contacts 661 in an obvious manner, and at its make-before-break contacts 663 momentarily applies positive potential over conductor 98, and contacts 545 to the alarm recording relay 490 which operates in the manner heretofore described and at its contacts 491 prepares an operating circuit for the alarm sending relay 480 in addition to locking to positive potential over its own contacts 492 and those of the alarm sending relay 480. No further operations for this purpose are effected at this time. The stepping continues in the manner heretofore described and following the completion of the first round of stepping over the points the finishing stepping and supervisory pulses are transmitted by the control and substation respectively. As previously pointed out, as the line supervision relay 410 normally restores following the transmission of this last pulse, the stepping equipment at the substation is restored. However, as a result of the circuit preparations accomplished as the equipment stepped over point three responsive to the discrepancy of the actual and indicated position of the circuit breaker thereat, the line supervisory relay 410 is effective at its contacts 415 to complete the prepared circuit for the alarm sending relay 480, the circuit extending from negative battery over the winding of the alarm sending relay 480, contacts 491, conductor 67, contacts 502, conductor 74, and contacts 415 to positive battery.

The point hold relay 440, which is normally restored with the line supervisory relay 410 following the stepping over the points, is of the slow-to-release type whereby ample time is provided for the line supervision relay 410 to restore and to complete the operation of the alarm sending relay 480 prior to restoration of the point hold relay 440 and interruption of the step controlling relays.

It will be remembered that it was the operation of the alarm sending relay 480 as a result of the automatic trip of the circuit breaker on point three that initiated the cycling of the equipment in the previous example and it is apparent that the operation of the equipment at this time will be substantially the same as set forth thereat.

A slight variation will occur, however, as the equipment steps to point three, in that an indication of the closed condition is to be transmitted at this time instead of the trip indication which was transmitted during the first cycle.

Thus as the third stepping pulse is received, and the equipment steps to the third point to operate the point selection relay 620 and the series point relay (odd) 560 in series, the auxiliary contacts 696 being in the closed position and the indication relay 660 energized at this time (it being remembered that the operation thereof followed transmission of the third revertive signal during the first cycle), a circuit will be completed by the series point relay (odd) 560 for the check determining relay 416, the circuit extending from negative battery over resistance 416, the winding of relay 430, conductor 77, contacts 535, contacts 562, conductor 199, and contacts 624, contacts 661, and the closed auxiliary switch contacts 696 to positive battery. With the operation of the check determining relay 430, of course, the transmission of a positive signal to indicate the closed condition of the circuit breaker is effected as the check transmitter relay 530 operates to send the customary revertive signal.

The equipment at the control station will be operated responsive to receipt of the positive signal to energize the close indication lamp 347 for the third point and to extinguish the trip indication lamp 346 thereat.

Specifically, line relay 180 is energized to close its positive contacts 181 with receipt of the revertive signal and to thereby energize the close supervision relay 110.

As the substation line relay 180 is restored with termination of the incoming signal, line relay contacts 181 are opened and an operating circuit for disagreement relay 127 is rendered effective, the shunt being removed from a prepared series circuit for the disagreement relay 127 and the close supervisory relay 110. The series operating circuit extends from negative battery over resistance 90, the winding of relay 110, contacts 114, conductor 22, contacts 217, conductor 59, contacts 382, contacts 323, indication relay 320 being in the restored condition to incorrectly indicate a trip as a result of the first cycle, conductor 2, contacts 112, the left hand winding of disagreement relay 127, and contacts 148, and 132 to positive battery.

Disagreement relay 127 operates and at its contacts 129 connects negative battery to the winding of the indication relay 320 to effect the operation thereof in the manner heretofore described, and at its contacts 128 completes an operating circuit for warning relay 350. Indication relay 320 operates and at its contacts 321 interrupts the energizing circuit for the green trip lamp 346, at its contacts 322 connects positive potential to the red close lamp 347 to energize same; and at its contacts 324 effects the operation of the stepping relay (even) 230 in the same manner that the closed contacts 323 effected the operation of that relay in the first cycling. The stepping relay (even) 230 operates to transmit the fourth stepping pulse and the equipment continues to step across the points.

It is noted at this time that as the alarm sending relay 480 operated to initiate the second cycling, it was effective at its contacts 483 to control restoration of the alarm recording relay 490. Accordingly, as the equipment proceeds to step over the last point the alarm recording relay 480 is inoperative and the restoration of the equipment to the normal standby condition is effected.

The warning relay 350 in operating as a result of the disagreement discovered at point three is effective at its contacts 352' to connect the red close lamp to a flashing circuit to effect the intermittent flashing thereof and to initiate the sounding of the alarm bell 177 in the manner heretofore described. The attendant, on observance of the visual and audio signals, may silence the alarm bell 177 and terminate the flashing of the red lamp 327 (it being then continuously energized) by pressing the respective release keys 175 and 192.

It will be remembered that the change of position of the circuit breaker at point three was assumed to have occurred while the equipment was at rest. Similar operation of the equipment would be effected if a circuit breaker should change position during stepping and prior to the time the point associated with the changing circuit breaker was stepped over. That is, as the point is passed over the point indication relay associated with the changed point effects operation of the alarm recording relay 490, which holds energized until the first cycle is completed to insure the initiation of a second cycle.

In the event the change of position occurs after the point is stepped over, the alarm recording relay 490 will be operated by the opening or closing of the auxiliary switch contacts in the manner heretofore described. Thus any change of position of a circuit breaker will be positively registered and reported at the control station in an efficient and reliable manner.

*Stepping responsive to occurrence of other conditions*

As was previously pointed out, each stepping operation of the equipment responsive to the occurrence of the various conditions is basically initiated by effecting the release of the control station step alarm relay 146. Thus, in the example set forth heretofore, it was the transmission of a signal by the substation as a circuit breaker on substation point three automatically changed position that resulted in the release of control station step alarm 146 and the automatic stepping of the equipment. The manner in which the release of this relay is otherwise accomplished manually and automatically will now be considered.

(a) OPERATION OF RESET KEY

It will be remembered that the stepping alarm relay 146 is normally energized over a circuit extending from negative battery over the winding of relay 146, contacts 184 of the reset key, contacts 141, and contacts 149, 135, and 125 to positive battery. Therefore, it is apparent that with the operation of the reset key by the attendant, the energizing circuit for the step alarm relay is interrupted to effect the restoration thereof and the stepping of the equipment over the points in the manner described hereinbefore, as will be brought out more fully hereinafter, the reset key is utilized for the purpose of releasing the equipment should a stall occur with the possible breakdown of a relay contact etc., or in the event that the equipment has been brought to rest on a point and it is desired to move the equipment to a point previous to it in sequence without re-running the cycle several times.

(b) TEMPORARY LOSS OF BATTERY AT CONTROLLING STATION

In the event that the source of potential is temporarily interrupted at the control station, the equipment is desirably operated to step over the points to determine any change in condition which may have been effected during the period that the potential supply was disrupted. As before, such stepping operation is automatically effected by effecting operation of the step alarm relay 146 at the control station.

Briefly, it is apparent that if the potential supply is interrupted at the control station, the energizing circuit for all the equipment (including the stepping alarm relay 146) will be interrupted and the restoration thereof will be effected. Stepping alarm relay 146 in releasing opens its contacts 149 and as the potential supply is subsequently restored, the energizing circuit for the stepping alarm relay 146 will be interrupted by the open contacts 149 to prevent reoperation of the step alarm relay. The stepping of the equipment over the points is thereupon effected in the manner previously set forth.

(c) STEPPING OF EQUIPMENT RESPONSIVE TO OPERATION OF A SELECTION KEY

One of the main objects of the invention is, of course, to provide a novel system in which various units, such as circuit breakers, disposed at the various points of a substation may be remotely and selectively controlled to assume various ones of desired positions in an improved manner. It is with the operation of the equipment to accomplish the control functions of the individual units that the following description is concerned.

In the selection of any particular point by the operation of an assigned selection key, the equipment is operative to step in synchronism from a starting point over each of the points until the desired point has been reached. The equipment then automatically stops its stepping operation and comes to rest on the chosen point, such condition being conveniently termed the "stopped on a point" condition. While the equipment is in such condition, control of the circuit breaker at the selected point to change position may be accomplished by operation of the appropriate one of the two operation keys comprising the trip key 187 or the close key 191. If the point is a metering point, metering is automatically effected as the equipment comes to rest on the point.

After the desired operation has been completed "releasing from a point" is effected by the restoration of the selection key which has been operated, or alternatively by the operation of the reset key. The equipment is responsively operative to release from the point on which it has been stopped and to continue its stepping over the points until the stepping operation has been completely accomplished.

The control of the units at the various points as they have been selected, will now be considered.

Considering first the stepping of the equipment to an even one of the points, and the stopping of the equipment thereon responsive to the operation of the selection key associated therewith and as an example the stepping of the equipment to point 2.

As the selection key 339 associated with point two is operated, an energizing circuit for off-normal start relay 140 is completed, which extends from negative battery over the winding of relay 140, conductor 5, contacts 192', conductor 45, contacts 337, conductor 44, contacts 193 to positive battery.

Off-normal start relay 140 operates and at its contacts 141 interrupts the holding circuit for the stepping alarm relay 146 to initiate stepping of the equipment over the points in the manner heretofore described. The equipment moves off-normal and steps to the second point, the control station sending the second stepping signal and the substation returning a revertive signal which is indicative of the position of the circuit breaker at the second point.

Assuming the circuit breaker at that point is in the tripped condition, a negative revertive signal will be transmitted by the substation and the control station line relay contacts 182 will be closed to complete a series operating circuit for the trip supervisory relay 120 and associate stop on point relay 206 to terminate the stepping operation and bring the equipment to rest on point two.

Specifically, in operating to transmit the second stepping pulse, stepping relay (even) 230 operates to effect the transmission of a negative signal to the substation and the control station point selection relay 370 and the series point relay (even) 212 are operated in series as aforedescribed to effect in turn the release of trip supervisory relay 120, the stepping relay (even) 230, the point selection relay 360 (associated with the first point), the extinguishment of the white selection lamp 307 at point one and the release of the series point relay (odd) 220, all in the manner set forth in the description pertaining to the first cycling of the equipment.

Point selection relay 370 also effects the energization of the "stop on point" relay 207 over a circuit which has been prepared as a result of the operation of the selection key 339 associated with the second point. Specifically, the circuit extends from negative battery over the winding of the "stop on point" relay 207, conductor 46, the closed contacts 336 of selection key 339, the white selection lamp 328 and contacts 373 to positive battery. The "stop on point" relay 207 operates and at its contacts 209 and 210 transfers the stepping circuit to the control of an auxiliary relay 206 and at its contacts 211 prepares the associate relay 206 for operation.

Stepping relay 230 in releasing is effective at its contacts 231 to interrupt the holding circuit for the stepping alarm relay 146 to effect the restoration thereof which in turn releases to open its contacts 149' to interrupt the holding circuit for the step preparing relay 150 and to effect the release thereof. Both of these relays (step alarm relay 146 and the step preparing relay 150) are slow to release and a predetermined time elapses prior to their restoration. As such period elapses and the relays restore, the equipment is prepared for the transmission of the particular control code which is to be sent to the substation to effect the desired operation of the circuit breaker at the selected point.

Referring now to the substation and the operation of the equipment thereat responsive to the receipt of the second stepping signal which was impressed upon the signal channel conductors as the control station equipment was being brought to rest; the substation line relay 305 is operated to close contacts 304 as the signal is received to operate point selection relay 610 and the series point relay (even) 570. As the signal is terminated the contacts 304 open to effect the operation of the check transmitter relay 530, the release of the odd-even relay 580, release of the point selection relay 600 associated with the first point, release of the series point relay (even) 570 and release of the check transmitter relay 530.

It will be remembered that the circuit breaker on point two was assumed to be in the closed condition and accordingly the check determining relay 430 is in the operated condition. As the equipment steps to point two and the check transmitting relay operates to send the revertive pulse, the pulse will be of a positive nature.

In the event that the circuit breaker on that point were restored, the check determining relay 430 would not have been operated and a negative signal would have been transmitted by the check transmitting relay 530 in its operation.

As the revertive positive signal is received by the control station, line relay 180 thereat operates its armature to close positive contacts 181, and it is at this point that the circuit operation differs from that set forth in the previously described cycling of the equipment.

Specifically, in the previous description, as the line relay 180 restored with termination of the impulse, the stepping relay (odd) 240 was energized to effect the stepping of the equipment from point two to point three. However, it will be remembered that the present stepping operation was initiated as a result of the operation of the selection key 339 associated with point two and that the "stop on point" relay 207 was energized as the second stepping impulse was transmitted by the control station. Accordingly, the energizing circuit for the stepping relay (odd) 240 is now interrupted by the open contacts 209 of the "stop on point" relay 207 and further operation of the stepping relays 230 and 240 is prevented. Instead, as the line relay 180 restores, an operating circuit is completed for the auxiliary "stop on point" relay 206, the line relay 180 removing the shunt from a series circuit for the close supervisory relay 110 and the prepared "stop on point" auxiliary relay 206, the series circuit extending from negative battery over resistor 90, the winding of relay 110, contacts 113, conductor 22, contacts 225, conductor 58, contacts 372 and 314, conductor 3, contacts 121, conductor 1, contacts 204, the winding of relay 206, contacts 210, conductor 9, contacts 148 and 133 to positive battery.

The auxiliary "stop on point" relay 206 operates and at its contacts 204 opens the energizing circuit to effect the release of the close supervisory relay 110 and at its contacts 203 completes a self-holding circuit extending from negative battery over resistance 53, conductor 47, contacts 203, the winding of relay 206, contacts 210, conductor 9 and contacts 148 and 133 to positive battery.

Summarily, then, it is apparent from the foregoing that with the operation of any one of the selection keys the operation of "stop on point" relays 207 and 206 is effected as the equipment steps to the selected one of the points. The "stop on point" relays 206 and 207 in turn operate to terminate the further transmission of stepping signals by the control station stepping relay (odd) 240 or stepping relay (even) 230.

It is, of course, apparent that if the circuit breaker at the substation on the stopping point selected were in the tripped condition, the trip supervisory relay 120 (instead of the close supervisory relay 110) would have been operated in series with the "stop on point" relay 206 and the same result would be accomplished.

Referring now to the substation equipment, it will be remembered that during the receipt of the incoming impulses, one of the purposes of the series point relay (odd) 560 and the series point relay (even) 570 was to alternatively maintain a point completed in the operating circuit to the point hold relay 440, the odd relay 560 being so operative for the odd points and the even relay 570 on the even points. As the equipment steps to point two the series point relay (odd) 560 is accordingly inoperative and its contacts 564 are in the open condition. As the series point relay (even) 570 falls back, following receipt of the second stepping impulse and the termination of the transmission of the second revertive impulse to the control station, it is effective at its contacts 575 to interrupt the effective one of the points in the energizing circuit for the point hold relay 440. Point hold relay 440 being of the slow to release type restores after a brief interval and at its contacts 446 recompletes the operating circuit for the normal supervisory relay 470, the circuit extending from ground over the winding of relay 470, and contacts 468, 457, and 446 to positive battery.

Normal supervision relay 470 in operating is effective at its contacts 474 to complete an operating circuit for the point supervisory relay 540, the circuit extending from negative battery over winding of relay 540, conductor 86, contacts 474, and the closed contacts 555 of the off-normal relay 550 to positive battery. The point supervisory relay 540 operates and at its contacts 546 completes a self-holding circuit (in parallel with the presently closed contacts 555), and at its contacts 542 completes an operating circuit for the check determining relay 430 which extends from negative battery over resistance 416, the winding of check determining relay 430, contacts 535, contacts 542, conductor 196 and contacts 615, and 636 to positive battery.

The check determining relay 430 operates, and at its make-before-break contacts 433, completes a momentary operating circuit for the alarm recording relay 490, the circuit extending from negative battery over the winding of relay 490, contacts 544, conductor 68, and contacts 433 to positive battery. Momentary closure of the circuit and the reoperation of the alarm recording relay 490 controls the equipment to transmit a positive pulse (signal 2) to the control station, this closed supervisory pulse being incidental at this time and no circuit operations being effected thereby.

Briefly, alarm recording relay 490 in operating effects energization of the alarm sending relay 480 which, in turn, operates check transmitter relay 530 and effects the release of the alarm recording relay 490. The alarm recording relay 490 in releasing restores the alarm sending relay 480 which in turn restores the check transmitter relay 530 to terminate the transmission of the positive pulse.

The control station line relay 180 responds to the positive impulse by closing positive contacts 181 and operating the close supervisory relay 110. As the impulse is terminated both relays restore without accomplishing any operational function in that the circuits to the stepping relays are interrupted by the contacts on the "stop on point" relays 206 and 207.

It is, of course, apparent that if the breaker on the selected substation were in the tripped position instead of in the closed position, the check determining relay 430 would not have been operated and the incidental pulse would not have been transmitted as the stepping equipment restored.

Summarily, as the equipment stops on an even point, series point relay (even) 212, the point selection relay such as 378 associated with the selected point, the off-normal relay 130, off-normal start relay 140, stop-on-point relays 200 and 207, and line supervisory relay 170 will be operated at the control station.

At the substation, off normal relay 550, line supervisory relay 410, point supervisory relay 540, normal supervisory relay 470, and the point selection relay, such as 610, for the selected point are energized.

*Automatic trip of circuit breaker while stopped on a point*

In the event that a closed circuit breaker, at a point which has been selected in the manner described, should automatically trip while the equipment is stopped thereon, the change of position of that circuit breaker will be immediately reported by the equipment. For example, should the circuit breaker at point two trip while the equipment is at rest on such point, the auxiliary switch contacts 686 associated with the circuit breaker at point two would be opened to effect the release of the point indication relay 650 and also the release of the check determining relay 430 (this relay being in the operated condition whenever the circuit breaker at point two is closed).

As the check determining relay 430 restores, it is effective at its contacts 433 to momentarily connect positive battery over conductor 68 and contacts 544 to the condenser 417 (which is normally charged through relay 490) to effect the discharge thereof. After the momentary closure of this circuit and the reopening of the discharge circuit, condenser 417 immediately charges over alarm recording relay 490 to effect the operation thereof.

The alarm recording relay 490 now operates to prepare the equipment for transmission of a long negative trip supervisory signal to the control station. Specifically, alarm recording relay 490 effects operation of alarm sending relay 480 over a circuit extending from negative battery over the winding of relay 480, contacts 491, conductor 67, contacts 502, conductor 74, contacts 461 and 451, conductor 73, and contacts 541 to positive battery. Alarm sending relay 480 in turn operates check transmitter relay 530 to initiate transmission of the negative signal and interrupts the holding circuit for the alarm recording relay 490 to effect the restoration thereof. Recording relay 490, in turn, effects restoration of the alarm sending relay 480. As the alarm sending relay 480 restores it effects release of the check transmitter relay 530 to terminate the transmission of the long negative impulse to the control station.

The control station line relay 180 will respond to the long negative impulse to close its negative contacts 182 and to effect the operation of the trip supervisory relay 120. As the incoming signal is completed, the line relay 180 restores its armature to its neutral position to remove a shunt for the series operating circuit for the disagreement relay 127 and the trip supervisory relay 120. Operation of the disagreement relay at this time is, of course, to effect a change of the indication presently provided for the equipment at point two; and is accomplished by reason of the fact that indication relay 310 for point two is operated to indicate a closed circuit breaker whereas the incoming signal has operated the trip supervisory relay 120 to indicate that the circuit breaker is in the tripped condition. The series operating circuit is therefore completed which extends from negative battery over resistance 90, trip supervision relay 120, contacts 122, conductor 22, contacts 225, conductor 58, contacts 314, conductor 3, contacts 121' of the trip supervisory relay, the winding of the disagreement relay 127, conductor 9, contacts 213, contacts 211, contacts 202, 147, 133 to positive battery.

Disagreement relay 127 operates and at its contacts 129 connects positive potential to the indication relay 310 to effect the release thereof, the circuit extending from positive battery over contacts 124, conductor 20, contacts 374 and the winding of the point indication relay 310 to negative battery. As the point indication 310 releases, it is effective at its contacts 312 to extinguish the red close indication lamp 327 at its contacts 311 is effective to complete the operating circuit for the green open indication lamp 326, and at its contacts 314 interrupts the series energizing circuit for the disagreement relay 127 and the trip supervisory relay 120 to effect the restoration thereof. The equipment is now once more restored to its "stopped on a point" condition.

It is apparent from the foregoing that the change of a circuit breaker from a closed position to the trip position while the equipment is stopped on the point associated with the circuit breaker will be automatically indicated at the control station.

*Automatic closure of circuit breaker while stopped on a point*

In a similar manner, in the event that the circuit breaker at a point should automatically close while the equipment is stopped on that point, the automatic change from the tripped position to the closed position will likewise be reported. In the event of automatic closure of an open circuit breaker at point two, for example, as the equipment is stopped thereat, the auxiliary switch contacts 686 on the circuit breaker will close with the closure of the circuit breaker to effect the operation of the associated point indication relay 650 as well as the operation of the check determining relay 430.

The operating circuit for the point indication relay 650 will extend from negative battery over the winding of relay 650, contacts 614, conductor 197, contacts 571, and contacts 616 and 686 to positive battery. The check determining relay 430 will operate over circuit extending from negative battery over resistance 416; the winding of relay 430, conductor 77, contacts 535, contacts 542, C196, and contacts 615 and 686 to positive battery.

As check determining relay 430 operates, a discharge circuit for condenser 417 is momentarily completed. As the discharge circuit is reopened, the condenser 417 will immediately recharge over the alarm recording relay 490 to effect the operation thereof. The alarm recording relay 490 operates and at its contacts 491 effects the operation of the alarm sending relay 480 and at its contacts 492 locks up over contacts 483 of the alarm sending relay. As the alarm sending relay 480 operates it is effective at its contacts 481 to complete an operating circuit for the check transmitter relay 530 and to release the alarm recording relay 490, and at its contacts 483 to release the alarm recording relay 490.

Check determining relay 430 being in the operated condition, the check transmitter relay 530 will upon operation apply a long positive close supervisory signal to the signal channel over contacts 532 and 534.

As the alarm recording relay 490 restores, it is effective at its contacts 491 to open the circuit for alarm sending relay 480 to effect the restoration thereof, such relay, in turn opening its contacts 481 to effect the restoration of the check transmitter relay 530 to terminate transmission of the positive signal pulse.

At the control station, the line relay 180 operates responsive to receipt of the positive pulse to close its positive contacts 181 and thereby complete an energizing circuit for the close supervisory relay 110.

It is to be remembered that it has been assumed that the circuit breaker at point two was in the tripped condition and that an automatic close has occurred while the equipment was stopped at this particular point. Accordingly, the indication relay 310 associated with point two will still be in the restored position and the green indication lamp 326 will be illuminated.

Inasmuch as the indication relay 310 is operated to indicate that the circuit breaker is in the tripped condition and the incoming signal indicates that the circuit breaker is in the closed condition (close supervisory relay 110 is operated by such signal) there is a discrepancy between the recorded and signalled positions. Accordingly, an energizing circuit is prepared for the disagreement relay 127 by indication relay 310, the disagreement relay 127 being maintained temporarily inoperative, however, as a result of the shunt imposed by the positive contacts 181 of the operated line relay 180.

As the incoming signal is terminated, the line relay 180 restores its armature to its neutral position and the shunt circuit for the disagreement relay 127 is removed to effect the operation of that relay in series with closed supervisory relay 110, the circuit specifically extending from negative battery over resistance 90, relay 110, contacts 113, conductor 22, contacts 225, conductor 58, contacts 372, contacts 313, conductor 2, contacts 112, the left hand winding of disagreement relay 127, conductor 9, contacts 210, 211, 202, conductor 8, and contacts 147 and 132 to positive battery.

Disagreement relay 127 operates and at its contacts 129 connects negative battery over resistance 91, contacts 129, conductor 20, and contacts 374 to indication relay 310 and positive battery to effect the energization thereof and a change of indication on the control panel for the circuit breaker at point two. As indication relay 310 operates responsive thereto it is effective at its contacts 311 to interrupt the energizing circuit for the green trip indication lamp 326 to extinguish same; and at its contacts 312 is effective to close an energizing circuit for the red closed indication lamp 327 to effect the illumination thereof. Indication relay 310 at its contacts 313 is also effective to interrupt the series energizing circuit for the disagreement relay 127 and the closed supervisory relay 110 to effect the release thereof. The equipment is now once more restored to the normal "stopped on a point" condition.

It is seen from the foregoing description that the automatic closure or the automatic tripping of the circuit breaker at a point on which the equipment has come to rest will be automatically indicated on the control board in an extremely expeditious manner whereby an effective and reliable signalling system is effected.

*Tripping breaker on even point*

The equipment having been stopped at point two by the operation of the selection key 339 associated with the second point, operation of the circuit breaker associated with that point may now be accomplished by the attendant. Assuming now that the circuit breaker at point two is in the closed position, and that the attendant desires to operate the breaker to the tripped position, such operation is initiated by closing the common trip key 187 on the control board whereupon three negative trip code impulses are transmitted to the substation. The substation equipment responds to the trip code impulses to effect the automatic tripping of the breaker at point two and the reporting to the control station of the changed position of the circuit breaker as it is accomplished.

Specifically, as the trip key 187 is operated it is effective at its contacts 186 to complete an operating circuit for the first control counting chain relay 284, the circuit extending from negative battery over the winding of relay 284, contacts 189, C28, contacts 183, conductor 30, contacts 205, conductor 11, contacts 152, C10, contacts 185, contacts 235, contacts 289, contacts 293, resistance 213, contacts 256', conductor 42 and contacts 119 and 117 to positive battery.

The counting chain relays 284, 288 and 295 advance in the manner set forth in the description pertaining to the stepping of the equipment off normal.

In brief résumé, as the first counting chain relay 284 operates it is effective to complete an operating circuit for the first control pulsing relay 250 which operates to initiate transmission of the first trip code impulse to the substation in the manner heretofore described. Control pulsing relay 250 also effects the operation of relay 180' and the second control counting chain relay 288.

As the associate control pulsing relay 180' operates it is effective to restore the first control pulsing relay 250 and thus terminate the transmission of the first trip code to the substation. Control pulsing relay 250 in restoring interrupts the circuit for the second control counting chain relay 288 and the circuit for the control pulsing relay 180'. After a predetermined time period has elapsed, the pulsing relay 180' releases to reestablish the operating circuit for the first control relay 250.

As control pulsing relay 250 operates, it effects application of the second negative trip code signal to the signal channel as well as the re-operation of the control pulsing relay 180' and the operation of the third counting chain relay 295. The control pulsing relay 180' operates to effect the restoration of the control pulsing relay 250 and to thus terminate the transmission of the second negative trip code impulse to the substation. As the control pulsing relay 250 restores, it also effects the restoration of the second counting chain relay 288 and the restoration of the control pulsing relay 180'. After a predetermined period has elapsed control relay 180' releases and the first control pulsing relay 250 operates to effect transmission of the third impulse as well as release of the third counting chain relay 295 and reoperation of control relay 180'.

As control relay 180' operates it is effective to release the first control relay 250 to effect the restoration thereof and terminate transmission of the third impulse. As control relay 250 restores, the circuit for the second control relay 180' is opened and the release thereof is effected in that all of the counting chain relays are restored.

In the event that the trip key is still operated, a circuit will be completed from negative battery over the winding of relay 180', contacts 194, conductor 30, contacts 285, conductor 11, contacts 152, contacts 186 of the closed trip key, contacts 285, 289, 293, resistance 218, contacts 255', conductor 42, contacts 119, 117 to positive battery to thereby maintain the control pulsing relay 180' operated to prevent the re-operation of the counting chain first control counting chain 284 and the recycling of the chain. As the trip key 187 is subsequently opened, the control pulsing relay 180' will release and the equipment will be restored to its normal "stopped on a point" condition.

Referring now to the equipment at the substation and the operation thereof responsive to receipt of the three successive negative impulses:

As the first impulse is received, the substation line relay 305 operates its armature to close negative contacts 304 to complete an operating circuit for the negative supervisory relay 460, the circuit extending from negative battery over resistance 408, the winding of relay 460, contacts 441 and 304 to positive battery. Negative supervisory relay 460 operates and at its make-before-break contacts 468 transfers the holding circuit for the off-normal relay 550 from its contacts 465 to its contacts 466. Negative supervisory relay 415 in operating is also effective at its contacts 462 to complete an operating circuit for the operation hold relay 503, the circuit extending from negative battery over the winding of relay 503, contacts 552, conductor 84, and contacts 462, 457, and 446 to positive battery.

Operation hold relay 503 operates and at its contacts 505 completes an obvious energizing circuit for the associate control relay 500; and at its contacts 507 effects the operation of the alarm recording relay 490, the circuit extending from negative battery over the winding of relay 490, conductor 87, contacts 544, and contacts 507 to positive battery.

Alarm recording relay 490 operates and at its contacts 492 locks itself over the contacts of the alarm sending relay 480 to positive battery.

As the first impulse is terminated, the substation line relay 305 responds by restoring its armature to open the negative contacts 304 and to thereby effect the release of the negative supervisory relay 460. As the negative supervisory relay 460 releases to open its make-before-break contacts 461 an energizing circuit is completed for the first substation control counting chain relay 510, the circuit extending from negative battery over the winding of relay 510, contacts 514, 522, resistance 590, contacts 501, conductor 74, contacts 461, 451, conductor 73, and contacts 541 to positive battery.

With receipt of the second of the incoming negative signals, line relay 305 moves its armature to close the negative contacts 304 to again complete an operating circuit for the negative supervisory relay 460, which once more operates and at its contacts 462 completes a series circuit for the first and second control counting chain relays 510 and 513, the circuit extending from negative battery over the winding of relay 510, the right hand winding of relay 513, contacts 511, 506, 581, conductor 75, contacts 462, 451, conductor 73, contacts 541 to positive battery.

As the second signal is terminated the substation line relay 305 releases and at its contacts 304 interrupts the energizing circuit for the negative supervisory relay 460 to effect the restoration thereof. Supervisory relay 460 restores and is effective at its make-before-break contacts 462 to interrupt the energizing circuit for the first and second counting chain relays 510 and 513, and is effective at its make-before-break contacts 461 to complete a holding circuit for the second counting chain relay 513, the circuit extending from negative battery over the left hand winding of the second counting chain relay 513, contacts 515, contacts 522, resistance 590, contacts 501, conductor 74, contacts 461, 451, conductor 73 and contacts 541 to positive battery.

Negative supervisory relay 460 in releasing is also effective at its contacts 467 to interrupt the holding circuit for the operation hold relay 503, the operation hold relay remaining operated for a given period of time however because of its slow to release characteristics.

As the third incoming impulse is received, the substation line relay 305 energizes over the circuit heretofore described to close its negative contacts 304 which are effective to once more complete the operating circuit for the negative supervisory relay 460.

As negative supervisory relay 460 operates for the third time responsive to this series of impulses, it is effective at its contacts 462 to complete an operating circuit for the third counting chain relay 521 in series with the second counting chain relay 513, the circuit extending from negative battery over the left hand winding of relay 513, the right hand winding of relay 521, contacts 516, 512, 506, contacts 581, conductor 75, contacts 462, 451, conductor 73, and contacts 541 to positive battery. Negative supervisory relay 460 at its contacts 467 recompletes the holding ground for the operation hold relay 503. As the incoming signal is terminated, the substation line relay 305 releases and at its negative contacts 304 interrupts the energizing circuit for the negative supervisory relay 460 to effect the restoration thereof. Negative supervisory relay 460 in releasing is effective at its contacts 462 to interrupt the series energizing circuit for the second and third counting chain relays 513 and 521 and is effective at its make-before-break contacts 461 to complete a holding circuit for the third counting chain relay 521, the circuit extending from negative battery over the left hand winding of relay 521, contacts 523, resistance 590, contacts 501, conductor 74, contacts 461, 451, conductor 73 and contacts 541 to positive battery.

In that the substation line relay 305 and the negative supervisory relay 460 are now maintained in the restored condition as a result of the termination of the incoming impulses, the energizing circuit for the operation hold relay 503 is interrupted by open contacts 467. The operation hold relay 503 restores, after a brief time interval, and at its contacts 504 transfers the energizing cicuit for the associated hold relay 500 to the holding circuit for the third counting chain relay 521, the circuit extending from negative battery over the winding of relay 500, contacts 504, contacts 432, conductor 64, contacts 523, and the holding ground for the third counting chain relay 521 set forth heretofore.

Operation hold relay 503 in restoring is operative to effect the trip of the circuit breaker at point two. Such operation is specifically accomplished as the result of closure of contacts 503 and the completion thereby of an operating circuit for the trip coil 680 associated with the circuit breaker at the second point, such circuit extending from negative battery over the winding of the coil 680, contacts 612, conductor 192', and contacts 524, 518, and 508 to positive battery.

The trip coil 680 energizes to effect the trip of the circuit breaker in a conventional manner, as the breaker restores auxiliary switch contacts 686 are opened and a change of indication of circuit breaker position is transmitted to the control station by the substation equipment.

Specifically, the energizing circuits for the check determining relay 430 and the point indication relay 560 at point two are interrupted by the opening of the auxiliary contacts 686, and the relays are restored to initiate transmission of a signal to the control station to indicate that the circuit breaker associated with that point is now in the tripped position.

In detail, as the check determining relay 430 releases, it is effective at its contacts 432 to interrupt the holding circuit for the associated hold relay 500 which releases and, in turn, at its contacts 501, interrupts the holding circuit for the third counting chain relay 521 to effect the restoration thereof; and at its contacts 502 completes an operating circuit for the alarm sending relay 480.

The third counting chain relay 521 restores and at its contacts 524 interrupts the energizing circuit for the trip coil associated with the circuit breaker at the second point to terminate the energization of the trip coil. The circuit breaker is held in the tripped condition by conventional mechanical means (not shown).

The alarm sending relay 480 operates to complete an energizing circuit for the check transmitter relay 530 extending from positive battery over the winding of the relay 530, contacts 481, resistance 408 to negative battery.

Check transmitter relay 530 operates to apply a negative signal to the signalling channel conductors 61 and 62 to effect the operation of the control station line relay 180 in the negative direction.

Alarm sending relay 480 at its contacts 483 interrupts the holding circuit for the alarm recording relay 490 to effect the release thereof, which relay in releasing opens contacts 491 to restore the alarm sending relay 489 to, in turn, release the alarm sending relay 480. As alarm sending relay 480 restores it is effective at its contacts 481 to interrupt the energizing circuit for the check transmitter relay 530 which restores and at its contacts 532 and 534 interrupts the transmission of the negative signal over the signal channel.

The control station line relay 180 operates responsive to the receipt of the negative signal and at its contacts 182 completes the heretofore described operating circuit for the trip supervisory relay 120 (the negative signal received being indicative of the trip condition of the circuit breaker at the selected point). As the incoming negative signal is terminated the control station line relay 180 restores its armature to the neutral position and the control station equipment having checked the incoming trip signal against the closed indication provided by the equipment at the control station point two determines that a change of circuit breaker position has taken place and accordingly the disagreement relay 127 is now operated. Specifically, as the line relay contacts 182 are opened, the holding shunt is removed from the circuit for disagreement relay 127, and the relay operates over a circuit extending from negative battery over resistance 90, the winding of trip supervisory relay 120, contacts 122, conductor 22, contacts 225, conductor 58, contacts 372, contacts 314, conductor 3, contacts 121', the left hand winding of relay 127, and contacts 148, 133 to positive battery.

As disagreement relay 127 operates it is effective at its contacts 129 to connect positive potential to the indication relay 310 at point two to shunt out the upper winding and effect the restoration thereof to provide the proper indication at point two, such potential application being effected over a circuit extending over contacts 124, contacts 129, conductor 20, contacts 374, and the lower winding of the point indication relay 310 to negative battery.

Indication relay 310 releases and at its contacts 314 interrupts the series energizing circuit for the trip supervisory relay 120 and disagreement relay 127 to effect the release thereof; and at its contacts 312 opens the energizing circuit for the red indication lamp 327 to extinguish same; and at its contacts 311 transfers the energizing circuit to the green indication lamp 326 to indicate to the attendant that the circuit breaker at that point is now in the tripped position.

It is apparent from the foregoing description that in the event of an automatic circuit breaker trip while the equipment is stopped on the point with which the circuit breaker is associated, a positive indication of the change of position of the circuit breaker will be immediately transmitted to the control board and the attendant thereat.

Further, the equipment having effected the indication of the change of position has automatically reverted to the normal "stopped on a point" condition which existed prior to the initiation of the automatic change.

*Closing breaker on even point*

In the illustration just presented, it was assumed that circuit breaker at the second point was in the closed position as the equipment came to rest thereon and that the operation of that circuit breaker to the tripped condition was effected by the closure of the trip key 185.

Assuming now that the circuit breaker at point two is in the tripped position as the equipment is brought to rest thereon and that the closure thereof is desired. The attendant now operates and the common close key 191 on the control board to effect the transmission of two negative close code pulses to the circuit breaker at substation point two. Specifically, closure of the close key 191 effects the operation of the second relay 288 of the counting chain (this being in contrast to the operation of the first counting chain relay 284 which was effected when the trip key 187 was operated), the operating circuit for the second counting chain relay 288 extending from positive battery over contacts 117, 119, conductor 42, contacts 256', resistance 218, contacts 293, 289, 285, contacts 188 to the now operated close key 191, conductor 10, contacts 152, conductor 11, contacts 205, conductor 30, contacts 181, conductor 28, contacts 190, and the left hand winding of the second counting relay chain 288 to negative battery.

The second counting relay chain 288 operates and at its contacts 291 completes an operating circuit for the first control pulsing relay 250 to initiate the transmission of the first close code pulse to the substation, the operating circuit for the pulsing relay 250 extending from the negative battery over the winding of relay 250, conductor 16, contacts 189, conductor 41, contacts 291, contacts 287', conductor 42, contacts 119, and 117 to positive battery.

Control pulsing relay 250 at its contacts 255 completes an operating circuit for the associated control pulsing relay 180' by extending its operating ground on conductor 41 thereto; and at its contacts 255' completes an operating circuit for the third counting chain relay 295 which extends in series with the second counting chain relay 288, such circuit extending from negative battery over the left hand winding of relay 288, the right hand winding of relay 295, contacts 290, 286', 255', conductor 42, and contacts 119, 117 to positive battery.

As the first control pulsing relay 250 is operated, it is also effective at its contacts 252 and 254 to initiate the transmission of the first negative impulse to the substation, the signal being applied to the signalling channel in the same manner as when the trip signal was transmitted to the substation. The counting chain relays 288 and 295 are cycled by the control pulsing relays 250 and 180 in the manner heretofore described to effect the transmission of two negative close code impulses to the substation.

Specifically, control pulsing relay 180' in operating is effective at its contacts 189 to interrupt the operating circuit for control pulsing relay 250 to effect the restoration thereof which in turn effects restoration of the associate control pulsing relay 180' and the second counting chain relay 288. As the control pulsing relay 250 restores it also interrupts the transmission of the first negative signal and an intermediate open break period is transmitted pending the slow release of the associate relay 180'.

As the associate relay 180' completes its release, it is effective at its contacts 189 to reestablish the operating circuit for the control pulsing relay 250, which operates to initiate transmission of the second close code impulse. Pulsing relay 250, at its contacts 255, once more operates the associate control pulsing relay 180' and effects the release of the third counting chain relay 295.

As the control pulsing relay 180' operates it once more effects the release of the control pulsing relay 250, which in releasing interrupts the transmission of the second close code pulse, control relay 250 at its contacts 255 interrupts the energizing circuit for the associate control pulsing relay 180' to effect the release thereof and termination of the chain cycling.

If the closed key is still in the operated position, the control pulsing relay 180' will be maintained operated to prevent the further cycling of the counting chain, the circuit extending from negative battery over the winding of relay 180, contacts 184, conductor 30, contacts 204, conductor 11, contacts 152, conductor 10, contacts 188, contacts 285, 289, 293, resistance 218, contacts 255', conductor 42, and contacts 119, 117 to positive battery. The control pulsing relay 180' is maintained thus operated until the closed key 191 is restored.

Referring now to the operation of the substation responsive to receipt of the two closed code pulses which have been transmitted by the control station over the interconnecting signal channel conductors 61 and 62. As previously pointed out, the close code control operation comprises the application of two successive negative signals to the channel. The substation line relay 305 operates to close the negative contacts 304 with the receipt of each of the close control pulses. The substation counting chain advances to the second relay and an operating circuit is completed to the close coil of the circuit breaker at the selected point as the signals are terminated. Since the operation of the equipment is generally similar to that set forth in regard to the tripping of the circuit breaker at point two, only a brief résumé of the equipment operation will be given at this time.

As line relay 305 operates responsive to the first negative signal, it is effective at its contacts 304 to control the energization of the negative supervisory relay 460 which in turn controls energization of the operation hold relay 503. Associate hold relay 500 and the alarm recording relay 490 are operated in sequence responsive to operation of the operation hold relay 503. As the first incoming impulse is terminated, line relay 305 restores its armature to the mid-position, and the negative supervisory relay 460 responsively restores to effect the operation of the first control counting chain relay 510.

With receipt of the second incoming impulse the substation line relay 305 operates its armature to close the negative contacts 304 and reoperation of negative supervisory relay 460 is effected. The second counting chain relay 513 has been prepared for operation and accordingly operation thereof follows the operation of the negative supervisory relay 460. As the second impulse is terminated, line relay 305 restores its armature to the mid-position and the first control counting chain relay 510 is released along with the negative supervisory relay 460.

The holding operation for the hold relay 503 is interrupted at contacts 467, but the hold relay being of the slow to release type will remain operated for a further predetermined period of time.

As the hold relay 503 subsequently releases as a result of the termination of the incoming close code and the elapse of the predetermined time period, the second of the control counting chain relays will be in the operated condition. (Compare the trip operation in which the third counting chain relay was energized following the receipt of the trip code.) The operation hold relay 503 in restoring is effective at its contacts 504 to transfer the holding circuit for the associate hold relay 500 to the holding ground for the second control counting chain relay 513, the circuit extending from negative battery over relay 500, contacts 504, conductor 66, contacts 431, conductor 65 and contacts 515 to the holding ground for the second counting chain relay 513.

The operation hold relay 503 in restoring is effective at its contacts 508 to complete an operating circuit for the close coil of the circuit breaker on the selected second point, the circuit extending from negative battery over the winding of the closed coil 695, contacts 613, conductor 196; and contacts 517 and 508 to positive battery. The circuit breaker associated with point two is accordingly operated to the closed condition by the energized closed coil, and in its movement effects the closure of the auxiliary switch contacts 686.

It is important that the attendant be notified of the change of condition of the circuit breaker at point two which resulted from the operation of the close key at the control station, and accordingly, the equipment is so operative at this time. Specifically, the reporting operation is initiated immediately after the circuit breaker operation as the auxiliary switch contacts 686 associated with the breaker are closed to operate the check determining relay 430 and the point indication relay 650 associated with point two. The circuit for energizing these relays extends from positive battery over closed contacts 686, contacts 615, conductor 196, contacts 542, 535, conductor 77, and the winding of relay 430 to negative battery. The point indication relay 650 operates over a circuit extending from negative battery over the winding of relay 650, contacts 614, conductor 197, contacts 571, 542, conductor 199, contacts 650 and contacts 686 to positive battery.

Point indication relay 650 locks over its contacts 651 and the closed auxiliary switch contacts 686 to thereby indicate that the circuit breaker at that point is in the closed position.

Check determining relay 430, in operating, is effective at its contacts 431 to open a holding circuit for the associated hold relay 500 to effect the release thereof. Associate hold relay 500 restores and at its contacts 501 interrupts the holding circuit for the second control counting chain relay 513 which in restoring interrupts the energizing circuit for the circuit breaker close coil 685. The coil deenergizes and the circuit breaker is held in its closed position by mechanical means of the conventional type. Associate hold relay 500 at its contacts 502 completes an energizing circuit for the alarm sending relay 480 whereby preparations for the transmission of an informing signal to the substation are initiated.

Alarm sending relay 480 energizes over a circuit extending from negative battery over the winding of relay 480, contacts 491, contacts 502, conductor 74, contacts 461, contacts 451, conductor 73, and contacts 541 to positive battery and is effective at its contacts 481 to complete an energizing circuit for the check transmitter relay 530. As the check transmitter relay 530 operates to close its contacts 532 and 534, a long positive pulse which is indicative of the closed position of the circuit breaker at the selected point, is applied to the signalling channel, the positive nature of the signal being effected by the check determining relay 430 in its energized condition.

Alarm sending relay 480 at its contacts 483 is effective to interrupt the holding circuit for the alarm recording relay 490 to effect the restoration thereof, which, in turn, at its contacts 491 opens the circuit for the alarm sending relay 480. Alarm sending relay 480 restores and at its contacts 481 interrupts the energizing circuit for the check transmitter relay 530 which releases to open contacts 532 and 534 to terminate the transmission of the pulse over the signalling channel.

Referring now to the operation of the equipment at the control station responsive to receipt of the long positive impulse transmitted by the substation equipment. Line relay 180 energizes to close the positive contacts 181 and to effect the energization of the close supervisory relay 110 in the manner heretofore described, and prepares a signal comparing circuit for determining the agreement of the indicated and reported condition of the circuit breaker at point two.

Following termination of the incoming impulse, the line relay 180 restores its armature to its neutral position to interrupt the energizing circuit for close supervisory relay 110 and to remove the shunt on the signal comparing circuit. The control station equipment will of course still be operated to indicate a tripped circuit breaker at point two. Since the incoming impulse indicates a closed circuit breaker, it is apparent that the reported and indicated positions are at variance and accordingly, the disagreement relay 127 is operated over the signal comparing circuit which extends from negative battery over resistance 90, the winding of relay 110, contacts 113, conductor 22, contacts 225, conductor 58, contacts 372, contacts 313, conductor 2, contacts 112, the left hand winding of disagreement relay 127, conductor 9, contacts 210, contacts 211, contacts 202, conductor 8, and contacts 147 and 133 to positive battery.

Disagreement relay 127 operates and at its contacts 129 connects negative battery to the indication relay 310 associated with the second point to effect the energization thereof, and to thereby change the circuit breaker indication at point two to agree with the incoming signal. The circuit extends from negative battery over resistance 91, contacts 129, conductor 20, contacts 374, and the upper winding of the indication relay 310 to positive battery.

Point indication relay 310 operates and its contacts 313 interrupt the series energizing circuit for the close supervisory relay 110 and the disagreement relay 127 to effect the release thereof; at its contacts 311 interrupts the energizing circuit for the green indication lamp 326; and at its contacts 312 closes an energizing circuit for the red close indication lamp 327. The equipment at control station point two now correctly indicates a closed circuit breaker at substation point two. The equipment at both stations is now in its normal "stopped on a point" condition.

The foregoing examples have been exemplary of the manner in which the equipment may be stepped to an even point and the manner in which the trip or close of a circuit breaker associated with that point may be accomplished in a reliable and dependable manner. The stepping of the equipment to an odd point and the control of the circuit breaker at that point is generally the same as that set forth heretofore in regard to control of equipment at an even point, and accordingly frequent reference is made thereto in the following description of control of a breaker at an odd point.

*Closing breaker on odd point*

Assuming now that the equipment is in its normal restored condition and that the stepping thereof to the third point is effected by the operation of the selection key 357 at the third point on the control board: The equipment steps to the third point in the manner heretofore described and is brought to its normal "stopped on a point" condition, the off normal lamp 178 being lit to indicate the stepped condition of the equipment. The white lamp 348 at the third point on the control board will also be illuminated to indicate to the attendant that the equipment has stepped to that point. The green lamp 346 is of course illuminated to indicate the tripped condition of the circuit breaker thereat. Assuming now that the circuit breaker at point three is to be operated to the closed position, the attendant operates the common close key 191 on the control board. (The second counting chain relay 288 responsively operates to closing of the key in the manner described.) Relative to the closing of a breaker on an even point, two close code impulses are transmitted to the substation, the first being a negative impulse and the second being a positive impulse. Briefly, operation of the control pulsing relay 250 is effected by the counting chain relay 288 which in turn operates to complete an energizing circuit for the associate pulsing relay 180' and the third counting chain relay 295 to connect a negative signal to the signalling channel over its contacts 252 and 254.

As the control pulsing relay 180' operates it is effective to interrupt the energizing circuit for the control pulsing relay 250 to effect the release thereof and to terminate the transmission of the negative signal to the substation. Reference is now made to the previous stepping operation in which it was noted that the series point relay (220) is operated in series with only the odd numbered point selection relays and is accordingly in the operated condition whenever the equipment has stopped on an odd point. Thus, as the control pulsing relay 250 now releases to terminate the first pulse, it is effective at its contacts 256 to complete a series energizing circuit for associate control pulsing relay 180' and the polarity reversing relay 267, such circuit extending from negative battery over the winding of relay 180' and the polarity reversing relay 267, such circuit extending from negative battery over the winding of relay 180', contacts 256, contacts 185, contacts 226 (of the now closed series point relay (odd) 220), contacts 273, the winding of the polarity reversing relay 267, contacts 291, contacts 287', conductor 42, and contacts 119, 117 to positive battery.

Polarity reversing relay 267 operates and at its contacts 272 locks to ground over the control station ground on conductor 42 and at its contacts 273 interrupts the energizing circuit for the associate control pulsing relay 180' to effect the release thereof. Control pulsing relay 250 in releasing is effective at its contacts 255' to interrupt the holding circuit for the second control counting chain relay 288 to effect the release thereof.

Associate control pulsing relay 180' releases after the elapse of a brief period of time and restores to close its contacts 189 and effects the recompletion of the operating circuit to the control pulsing relay 250.

It will be remembered that the polarity reversing relay 267 is now held in the operated condition, and at its contacts 269 and 271 effects the reversal of the polarity connections to the conductors extending to the signal channel. Therefore, as the control pulsing relay 250 now operates, a positive signal (signal 1) is applied to the signal channel, positive battery being applied to conductor 661 over a circuit extending from positive battery over resistor 178, conductor 29, contacts 269, contacts 254, contacts 260, 277, 238 and 248 to conductor 61; and negative battery being applied to the second channel conductor 62 over a circuit extending from negative battery over resistance 179, conductor 35, contacts 271, contacts 252, contacts 258, contacts 275, 236, 246 and conductor 62.

Control pulsing relay 250 in operating is also effective at its contacts 255 to once more energize the associate control pulsing relay 180' and at its contacts 256' to interrupt the holding circuit for the third counting chain relay 295 to effect the release thereof. Signal 1 to the associate pulsing relay 180' operates to effect restoration of the control pulsing relay 250, which in releasing at its contacts 252 and 254 terminates the transmission of the impulse to the substation. Control pulsing relay 250 once more interrupts the energizing circuit for the associate control pulsing relay 180' to effect the restoration thereof. If the close key 191 is still in the operated position, however, a holding circuit is completed over the close key in the manner heretofore described relative to closing of a breaker on an even point. Reoperation of the counting chain is thus prevented at this time.

Referring now to the equipment at the substation and the operation thereof responsive to receipt of a negative signal 2 (followed by receipt of a positive signal 1) to effect the closure of a circuit breaker which is associated with a selected one of the odd points.

Substation line relay 305 responds to the first incoming pulse (negative) to move its associated armature to close negative contact 304 and to effect the energization of the negative supervisory relay 460 which operates and sequentially results in the operation of the hold relay 503, the associate hold relay 500, and the alarm recording relay 490 (these relay operations having been described in detail at several points heretofore). As the impulse is terminated, the line relay 305 and negative supervisory relay 460 restore to energize the first counting chain relay 510.

As the second close impulse (positive) is received, line relay 305 responds to the positive impulse to move its armature to close positive contacts 306 to thereby complete an operating circuit for the positive supervisory relay 450, the circuit extending from the negative battery over the resistance 408, the winding of relay 450 and contacts 443, and 306 to positive battery. Positive supervisory relay 450 operates and at its contacts 452 completes an operating circuit for the second control counting chain relay 513 in series with the first counting chain relay 510, the circuit extending from negative battery over the winding of relay 510, the right hand winding of relay 513, contacts 511, 506, 582 (the odd relay 580 being in the operated condition whenever the equipment is stopped on an odd point), conductor 76, contacts 452, conductor 73, and contacts 541 to positive battery.

As the incoming positive pulse (signal 1) is terminated, line relay 305 restores its armature to its neutral position to open contacts 306 and the restoration of the positive supervisory relay 450 is effected. Positive supervisory relay 450 restores and is effective at its contacts 452 to interrupt the energizing circuit for the first counting chain relay 510, and at its contacts 456 is effective to interrupt the energizing circuit for the operation hold relay 503.

After the elapse of a brief time period, the operation hold relay 503 releases and at its contacts 502 completes an operating circuit for the close coil 695 associated with the circuit breaker at the third point, the energizing circuit extending from negative battery over the winding of the close coil 695, contacts 623, conductor 191′, and contacts 519 and 508 to positive battery. As the close coil 695 energizes, it is effective to close the circuit breaker associated with point three in the conventional manner.

A report of the change of circuit breaker position is now transmitted to the control station as the circuit breaker closes the auxiliary switch contacts 696 associated therewith. Specifically, as the contacts 696 are closed, an operating circuit is completed for the check determining relay 430, which extends from negative battery over resistor 416, the winding of relay 430, contacts 535, contacts 543, conductor 199, and contacts 625 and 696 to positive battery. An operating circuit is also completed for the indication relay 660 associated with the third point, the circuit extending from negative battery over the winding of relay 660, contacts 624, conductor 199, contacts 562 (the series point relay (odd) 560 being operated whenever the equipment is stopped on an odd point), contacts 562, contacts 543, conductor 199, and contacts 625 and 696 to positive battery.

Check determining relay 430 operates and at its contacts 431 interrupts the holding circuit for the associate hold relay 500 to effect the release thereof, and the initiation of the signal transmission is now accomplished in the same manner as when the reporting of the closed breaker on the even point was effected. Briefly, the associated hold relay 500 restores and at its contacts 501 interrupts the holding circuit for the second counting chain relay 513, which in turn restores and at its contacts 517 and 519 interrupts the energizing circuit for the close coil 699 associated with the circuit breaker at the third point. The circuit breaker is maintained in the closed position by conventional mechanical means.

Associate hold relay 500 at its contacts 502 completes an energizing circuit for the alarm sending relay 480 which in closing its contacts 481 effects operation of the check transmitter relay 530 and the application of a positive signal (signal 1) to the signal channel. The alarm sending relay 480 at its contacts 483 interrupts the holding circuit for the alarm recording relay 490 to effect the release thereof which in turn releases the alarm sending relay 480 and consequently restores to effect the release of check transmitter 530 and the termination of the transmission of the positive impulse to the substation.

The control station equipment receives the positive impulse as an indication of the now closed condition of the circuit breaker at point three and tenders such received signal to the signal comparing circuits thereat.

Specifically, with receipt of the positive signal, the control station line relay 180 operates its armature to close positive contacts 181 and to operate the close supervisory relay 110 and thus prepare the comparing circuits. With the termination of the signal, line relay 180 restores its armature to its neutral position and a comparison of the received signal with the indication provided by the equipment at point three is now effected.

It will be remembered that the circuit breaker was previously in the tripped position and that the circuit breaker closed responsive to transmission of the close operating impulse by the attendant. Accordingly, the control station equipment at point three still indicates a tripped circuit breaker at point three and since this indication is at variance with the received revertive signal the operation of the disagreement relay 127 will be effected as the incoming signal is terminated. The circuit for effecting the operation of the disagreement relay 127 specifically extends from negative battery over resistance 90, the winding of close supervisory relay 110, contacts 114, conductor 22, contacts 217, conductor 59, contacts 382, contacts 323, conductor 2, contacts 112, the left hand winding of relay 127, conductor 9, contacts 210, contacts 211, contacts 292, conductor 8, and contacts 147 and 133 to positive battery.

Disagreement relay 127 operates and at its contacts 129′ connects negative battery to the indication point relay 325 which is associated with point three, the circuit specifically extending from negative battery over resistance 91, contacts 115, contacts 129′, conductor 21, contacts 384, and the upper winding of indication relay 320 to positive battery. Indication relay 320 operates as heretofore described responsive to the application of the negative battery, and is effective at its contacts 324 to interrupt the energizing circuit for the close supervisory relay 110 and the disagreement relay 127 to effect the release thereof; at its contacts 321 interrupts the energizing circuit for the green trip indication lamp 346 at point three, and at its contacts 322 completes an energizing circuit for the red close indication lamp 347 at point three. The equipment now correctly indicates the position of the circuit breaker at substation point three and is presently restored to its normal "stopped on a point" condition.

Thus, with the stepping of the equipment to an odd point and the operation of the close key 191, a close code comprising a successive positive and negative pulse are transmitted to the substation to close a tripped circuit breaker at the selected odd point. After the accomplishment of the close, the equipment is operative to transmit a revertive signal to place the control board in agreement with the substation units.

*Tripping breaker on odd point*

Assuming now that the equipment has been stepped to point three and is presently in the "stopped on a point" condition, the circuit breaker at point three being in the closed position. Operation of the circuit breaker to the open position may now be accomplished by operation of the common trip key 187 on the control board, such operation effecting the transmission by the control station of a negative pulse (signal 2) follower by two positive pulses (signal 1) to the substation to effect tripping of the circuit breaker at that point. An automatic indication of the circuit breaker trip is thereafter revertively transmitted by the substation to the control station.

Assuming for example that the trip key 187 is operated with the equipment stopped at point three, the first counting chain relay 284 will be responsively operated in the same manner as set forth in the description which relates to the tripping of a breaker on an even point, and the cycling of the counting chain relay is thereby initiated to transmit three code pulses. Specifically, control pulsing relay 250 is operated by the first counting chain relay to in turn control operation of the associate pulsing relay 180′ and the second counting chain relay 288. As the first control pulsing relay 250 is operated, it is effective at its contacts 252 and 254 to apply a negative signal (signal 2) to the signal channel conductors 61 and 62 as heretofore described. Control pulsing relay 180' operates to effect the release of the control pulsing relay 250 and the termination of the transmission of the first signal pulse.

It will be remembered that series point relay (220) is operated whenever the equipment is stopped on an odd point and accordingly as the control pulsing relay 250 now restores it completes an energizing circuit for the polarity reversing relay 267 in series with the control pulsing relay 180', the circuit extending from negative battery over the winding of relay 180', contacts 256, contacts 185, C39, contacts 226, 273, the winding of relay 267, contacts 291, contacts 287', conductor 42, and contacts 119 and 117 to positive battery. Control pulsing relay 250 at its contacts 255' also interrupts the holding circuit for the first control counting chain relay 284 to effect the restoration thereof.

The polarity reversing relay 267 operates and at contacts 269 and 271 prepares for the application of a positive signal to the signal channel conductors; at its contacts 272 locks up to the control station ground on conductor 42; and at its contacts 273 interrupts a point in the holding circuit for the control pulsing relay 180'.

After the elapse of a brief period of time, pulsing relay 180' restores, and at its contacts 189 recompletes the operating circuit for the first control pulsing relay 250 to effect the energization thereof. As the pulsing relay 250 operates it is effective at its contacts 252 and 254 to complete the application of the positive signal to the signalling channels 61 and 62, positive battery being applied to conductor 61 over a circuit extending from positive battery over resistance 178, conductor 29, contacts 269, contacts 254, contacts 260, 277, 238, and 248 to the signal channel conductor 61; and negative battery being applied over resistance 179, conductor 35, contacts 271, contacts 252, 258, 275, 236 and 246 to the signal channel conductor 62. Control pulsing relay 250 in its second operation also completes an operating circuit for the third counting chain relay 295 over contacts 255' in the manner heretofore described.

Control pulsing relay 250 at its contacts 255 also completes an operating circuit to the control pulsing relay 180' for a second time in the cycle. As the pulsing relay 180' reoperates once more it is effective at its contacts 189 to interrupt the energizing circuit for the first pulsing relay 250 to effect the release thereof and the termination of the transmission of the positive signal. The restoring of the first control pulsing relay 250 at its contacts 255' effects the release of the second counting chain relay 288 and at its contacts 256 interrupts the energizing circuit for the associate control pulsing relay 180'.

As the associate pulsing relay 180' releases after the elapse of a predetermined interval of time, it is effective at its contacts 189 to recomplete the operating circuit for control pulsing relay 250. As the control pulsing relay 250 responds to close its contacts 252 and 254, a second positive signal is applied to the line conductors in the manner set forth above; at its contacts 255 an operating circuit is recompleted for the associate pulsing relay 180' for the third time; and at its contacts 256' the holding circuit for the third counting chain relay 295 is interrupted to effect the restoration thereof.

Control pulsing relay 180' operates and at its contacts 189 interrupts the energizing circuit for the control pulsing relay 250 to effect the restoration thereof and the termination of the application of the second positive signal to the control channel.

Control pulsing relay 250 also opens the energizing circuit for relay 180', which restores after a brief interval. Further operation of the control pulsing relay 250 is prevented in that the control counting chain has run its gamut and each of the contacts extending to the control equipment ground is opened to interrupt the pulsing circuit of the chain (287, 291 and 296). In the event that the tripped key 187 is still in the operated condition; the control pulsing relay 180' will lock up to prevent the recycling of the control counting chain, the locking circuit extending from negative battery over the winding of relay 180', contacts 184, conductor 30, contacts 205, contacts 152, contacts 186, contacts 285, 289, and 293, resistance 218, contacts 256', conductor 42, and contacts 119 and 117 to positive battery. The control pulsing relay will remain operated until the trip key 187 is restored.

Referring now to the substation and the operation of the equipment thereat responsive to receipt of the close signal comprising a negative impulse (signal 2) followed by two positive impulses (signal 1). As the first two pulses are received, the substation equipment will respond in the manner set forth in the description pertaining to the closing of a breaker on an odd point. In brief résumé, the following relay operations are effected as the negative signal is received; line relay 305 operates to control operation of the negative supervisory relay 460 which in turn effects energization of operation hold relay 503. Operation hold relay 503, in operating, effects energization of the associated hold relay 500 and the alarm recording relay 490. As the first negative impulse is terminated, line relay 305 restores and the release of the negative supervisory relay 460 is followed by the operation of the first control counting chain relay 510.

The substation line relay 305 operates in response to the receipt of the positive impulse to effect energization of the positive supervisory relay 450 followed by energization of the counting chain relay 513. As the incoming positive impulse is terminated, substation line relay 305 restores to effect the restoration of the positive supervisory relay 450 and the first counting chain relay 510.

As the second positive impulse (the third impulse of the series) is now received, substation relay 305 is operative to move its armature to close positive contacts 306 to thus complete an operating circuit for the positive supervisory relay 450 in the manner heretofore described. Positive supervisory relay 450 operates and at its contacts 452 completes an operating circuit for the third counting chain relay 521 in series with the second counting chain relay 513, the circuit extending from negative battery over the left hand winding of relay 513, the winding of relay 521, contacts 516, 512, 506, 582, conductor 76, contacts 452, conductor 73, and contacts 541 to positive battery.

As the incoming impulse is terminated, the line relay 305 restores its armature to its neutral position and the release of the positive supervisory relay 450 is effected, which relay 450 in its opening of its contacts 452 interrupts the energizing circuit for the second counting chain relay 513. The third counting chain relay is held over the self holding circuit by a circuit extending over its left hand winding, contacts 523, resistance 590, contacts 501, conductor 74, contacts 461, 451, conductor 73 and contacts 541 to positive battery.

Positive supervisory relay 450 in releasing is also effective at its contacts 456 to interrupt the energizing circuit for the operation hold relay 503 which being of the slow to release type remains energized for a shirt period thereafter. Inasmuch as the incoming impulses are now terminated further energization of the operation hold relay by either the positive supervisory relay 450 or the negative supervisory relay 460 is terminated and after the predetermined time interval has elapsed, the operation hold relay 503 restores to complete at its contacts 508 an operating circuit for the trip coil associated with the circuit breaker at the selected third point. The energizing circuits for the trip coil specifically extend from negative battery over the trip coil 690, contacts 622, conductor 193', contacts 525, 520 and 508 to positive battery. The trip coil on being energized effects the automatic tripping of the circuit breaker at point three, and the desired control operation of such breaker has now been accomplished.

As a result of the change of position of the circuit breaker at point three it is imperative that an indication of such change in position be transmitted to the control station so that a corresponding change of indictaion at such point on the control board may be effected.

Such change of indication is accomplished responsive to the movement of the circuit breaker to the trip position and the corresponding opening of the associated auxiliary switch contacts 696, the substation equipment being effective to send a negative impulse (signal 2) to the control station (such signal being indicative of a tripped circuit breaker). The equipment operates in a manner which is substantially similar to its operation in effecting the transmission of the negative revertive signal as the trip of a breaker on an even point is reported, and only brief résumé is believed necessary at this point.

As the auxiliary switch contacts 696 are opened with the trip of the circuit breaker, the operating circuit for the check determining relay 430 is interrupted to restore same (such relay having been energized as the equipment stepped on point three); and to simultaneously interrupt the holding circuit for the point indication relay 660.

Check determining relay 430 in restoring is effective at its contacts 432 to interrupt the holding circuit for the associate hold relay 590 which in turn releases and at its contacts 501 effects the restoration of the third counting chain relay 521, and at its contacts 502 completes an operating circuit for the alarm sending relay 480. As the third counting chain relay 521 restores, it is effective at its contacts 525 to interrupt the energizing circuit for the trip coil 690 to effect the restoration thereof.

As alarm sending relay 480 operates, it is effective at its contacts 481 to complete an operating circuit for the check transmitter relay 530, which in its operation, closes contacts 532 and 534 to apply a trip indication negative signal to the signal channel conductors 61 and 62.

Alarm sending relay 480 at its contacts 483 also interrupts the holding circuit for the alarm recording relay 490 to effect the restoration thereof, such relay being operative in its restoration to open contacts 491 to effect the restoration of the alarm sending relay 480. As alarm sending relay 480 restores, it once more opens the energizing circuit for the check transmitter relay 530 to effect the release thereof and to thus terminate the transmission of the negative signal to the control station.

The equipment at the control station responds to receipt of the negative impulse to move its armature to close the negative contacts 180 to effect the operation of the trip supervisory relay 120 and to prepare the signal comparing circuits.

As the signal is terminated the line relay 180 restores and the equipment compares the received negative signal (which is indicative of the tripped condition of the circuit breaker at point three) with the condition indicated by the lamps on the control panel associated with point three. Inasmuch as the circuit breaker has just been tripped, the incoming indicating signal will be at variance with the circuit breaker position indicated on the board, and an operating circuit will therefore be completed to effect the operation of the disagreement relay 127, such circuit specifically extends from negative battery over the winding of relay 120, contacts 122, conductor 22, contacts 217, conductor 59, contacts 382, and 324, conductor 3, contacts 121', the left hand winding of disagreement relay 127, conductor 9, contacts 219, 211, and 202, conductor 7, and contacts 147 and 133 to positive battery.

Disagreement relay 127 operates and at its contacts 129 connects negative battery to the indication relay 320 to effect a restoration thereof, as contacts 129' connect positive battery to the indication relay 320, the circuit specifically extending from positive battery over contacts 124, 129', conductor 21, contacts 384, and the winding of relay 320.

Point indication relay 320 restores, and at its contacts 324 interrupts the energizing circuit for the trip supervisory relay 120 and the disagreement relay 127 to restore same, and at its contacts 322 interrupts the energizing circuit for the red closed indication lamp 347. The indication relay 320 at its contacts 321 also completes an obvious energizing circuit for the green trip indication lamp 346 whereby the control panel indication lamps now correctly indicate the true position of the circuit breaker at the substation. The equipment at both stations is now in the normal "stopped on a point" condition.

It is seen from the foregoing description that the automatic tripping or the automatic closing of a circuit breaker may be accomplished by the operation of a selection key to step the equipment to the desired circuit breaker point, and by thereafter operating the common close or trip key at the control station. It is further seen that the operation is accomplished in each instance through the transmission of indicative and individual code signals, whereby a reliable and dependable control arrangement is effected. Additionally, any change of circuit breaker positions are immediately transmitted to the control station to thereby provide the attendant with a complete and accurate picture of the condition of the substation equipment at all times.

*Stopping on metering point*

In a further illustrative embodiment of the features and advantages of the disclosed arrangement, point four has been illustrated in the drawings as being equipped with metering apparatus and according to the invention the metering of any desired characteristic at any given point in the substation may be automatically effected through the use of such arrangement.

The equipment which is illustrated as being associated with point four is of the impulse metering type, it being understood that any of the other types of conventional telemetering equipment may be conveniently employed therewith.

Assuming that the metering of a given load condition at the substation is desired, the attendant operates the selection key at the control board associated with the metering point (in this case key 377 at point four), whereupon the equipment steps over the first three points and comes to rest on the fourth point. That is, referring to the previous description of the stepping operation and particularly the point at which the equipment at the control station is preparing to transmit the fourth stepping impulse.

The stepping relay (even) 230 operates and at its contacts 235 and 237 applies the fourth stepping pulse to the signalling channel conductors 61 and 62. The stepping relay 230 at its contacts 233 completes a series operating circuit in the manner heretofore described for the point selection relay 390 and the series point relay (even) 212.

The point selection relay 390 in operating is effective at its contacts 394 to complete a series operating circuit for the white selection lamp 357 to indicate to the attendant that the equipment has arrived at the fourth point and the stop-on-point relay 207, it being remembered that the selection key 377 for the fourth point was operated to step the equipment to that point. The circuit for the stop-on-point relay 207 extends from negative battery over the winding of relay 207, conductor 46, contacts 368, the white selection lamp 359, and contacts 394 to positive battery.

The stop-on-point relay 207 operates to prevent the further stepping of the equipment by opening its contacts 213 to interrupt the energizing circuit for the stepping relays 230 and 240, closing its contacts 210 to prepare an operating circuit for the associate stop-on-point relay 206; and closing its contacts 208 to connect a 110 volt alternating current source to the meter to prepare same for metering purposes. The energizing circuit for the metering equipment extends from one side of the 110 volt A. C. source over contacts 208, conductor 60, contacts 392, the motor control unit 358, and conductor 48 to the other side of the 110 volt source.

Series point relay (even) 212, which operates in series with point selection relay 390, is effective at its contacts 212 and 217 to interrupt the series energizing circuit for the trip supervisory relay 120 and the stepping relay (even) 230 to effect the release thereof, and is effective at its contacts 216 to interrupt the series energizing circuit for the series point relay (odd) 220 and the point selection relay 380 to effect the release thereof. As the point selection relay 380 associated with the third point restores it is effective at its contacts 383 to interrupt the circuit to the white selection lamp 348 to indicate to the attendant that the equipment has stepped over the third point.

As the stepping relay (even) 230 is restored it is effective at its contacts 235 and 237 to interrupt the application of the fourth stepping signal to the signal conductors 61 and 62. Stepping relay 230 is further effective at its contacts 231 to interrupt the holding circuit for the stepping alarm relay 146, which being slow to release, restores only after the elapse of a predetermined time period. With the subsequent restoration of the step alarm relay 146, the contacts 149' are opened to effect the release of the step preparing relay 150 and the de-energization of the stepping circuit has now been accomplished.

Referring now to the operation of the equipment at the substation responsive to receipt of the fourth stepping impulse. Substation line relay 305 responds to such signal to move its armature to close the negative contacts 304 and to thus complete a series operating circuit for the point indication relay 630 and the series point relay (even) 570, it being remembered that substation relays 620 and 440 are in the operated condition at this time. The operating circuit for the point selection relay 630 extends from negative battery over the winding of relay 630, contacts 627, conductor 199', the winding of the series point relay (even) 570, conductor 79, contacts 463, 442 and 304 to positive battery.

As the fourth stepping impulse (signal 2) is terminated the substation line relay 305 restores and is effective at its contacts 304 to remove the shunt for the check transmitter relay 530 to effect the operation thereof in series with the series point relay (even) 570 and the point selection relay 630. Metering points are arranged to be identified by a trip supervisory impulse (negative signal 2) and accordingly the check determining relay 430 is not operated at this time.

Check transmitter relay 530 in operating is effective at its contacts 532 and 534 to effect application of a negative signal to the signal channel, and at its contacts 537 interrupts the holding circuit for the odd-even relay 580 to effect the release thereof. Odd-even relay 580 in restoring is effective at its contacts 584 to interrupt the holding circuit for the third point selection relay 620 which in turn restores and effects cascade restoration of the series point relay (even) 570 and the check transmitter relay 530.

Check transmitter relay 530 in restoring is effective at its contacts 532 and 534 to terminate the application of the negative meter point identifying signal to the signal channel.

The equipment at the control station responds to the received meter point supervisory impulse (negative signal 2) and the control station line relay 180 operates its armature to close the negative contacts 182 to thereby complete an operating circuit to the trip supervisory relay 120 and prepare an operating circuit for the associate stop-on-point relay 206.

As the incoming impulse is subsequently terminated, the line relay 180 restores its armature to the neutral position whereby the shunt circuit for the associate stop-on-point relay 206 is removed to operate the relay in series with the trip supervisory relay 120, the circuit extending from negative battery over resistance 90, the winding of relay 120, contacts 122, conductor 22, contacts 225, conductor 58, contacts 395, conductor 1, contacts 204, the winding of relay 206, contacts 210, conductor 9, contacts 148 and 133 to positive battery.

As the stop-on-point relay 206 operates, it is effective at its contacts 204 to interrupt the series energizing circuit and to effect the release of the trip supervisory relay 120. Relay 206 is effective at its contacts 203 to lock-up to negative battery over conductor 47 and resistance 53.

It will be recalled that the stepping relay 230 released as the fourth stepping pulse was transmitted and that thereafter further operating of the stepping relays was prevented. Accordingly, the holding circuit for the step alarm relay 146 is interrupted and after a predetermined time the step alarm relay 146 releases to interrupt the circuit for the step preparing relay 150 and thus effect the release thereof. Further stepping is now precluded.

Referring now once more to the substation equipment, it will be recalled that as the series point relay (even) 570 was restored with the check transmitting relay 530 following the transmission of the meter point supervisory impulse to the control station, contacts 575 were opened to interrupt the energizing circuit for the point hold relay 440. The hold relay being slow to release holds for a predetermined time interval thereafter and as the predetermined time interval elapses, will restore to close its contacts 446 and recomplete the operating circuit for the normal supervisory relay 470.

Supervisory relay 470 operates and at its contacts 474 completes an operating circuit to the point supervisory relay 540 which is in turn responsively operated to close its contacts 546 and lock itself to positive battery under the control of the supervisory relay 470. The point supervisory relay 540 at its contacts 547 connects 110 volt A. C. source to the meter transmitting equipment 697, the circuit extending from one side of the alternating source and over conductor 99, the meter transmitter 697, contacts 632, conductor 195, and contacts 547 to the other side of the alternating current source.

As the meter transmitter 697 is operated it is effective at its contacts 698 to initiate the transmission of the first metering impulse, the motor contacts 698 completing an energizing circuit for the meter relay 400 which extends from negative battery over contacts 495, the winding of meter relay 400, conductor 89, contacts 698, contacts 673, conductor 194', contacts 509, conductor 86, contacts 474, conductor 88 and contacts 546 to positive battery.

As the metering relay 400 operates it is effective at its contacts 402 to effect transmission of a metering impulse to the control station, such impulse transmission comprising the application of positive battery over a 1500 ohm resistance to conductor 61 and of negative battery over the right hand winding of the substation relay 305 and a 500 ohm resistor to conductor 62 (Fig. 11f). The metering impulse is positive in nature and effects operation of the control station line relay 180 in the positive direction (signal 1), the circuit specifically extending from positive battery over contacts 402, resistance 405, contacts 413, C69, contacts 531, conductor 61, contacts 248, 239, 277, 260 and 253, C25, the right hand winding of line relay 180, the left hand winding of relay 180, contacts 138, conductor 24, contacts 251, 258, 275, 236, 246, the signal channel conductor 62, substation contacts 532, conductor 71, the right hand winding of line relay 305 and resistance 425 to negative battery.

The control station line relay 180 responds by moving its armature to close the positive contacts 181 and thereby complete an operating circuit for the close supervisory relay 110, the circuit extending from positive battery over contacts 181, the winding of relay 110 and resistor 90 to negative battery.

As the close supervisory relay 110 operates, it is effective at its contacts 116 to apply positive battery to the control station meter control circuit, the signal application extending from positive battery over contacts 116, conductor 23, contacts 393, and the meter control circuit 358 to negative battery. A corresponding registration of a metering impulse is responsively made thereat.

At the substation, the meter motor contacts 698 are opened by the meter motor 697 after a normal impulse period has been effected, whereupon the substation meter relay 400 restores, to remove the metering impulse from the signal channel. Control station line relay 180 responsively restores to effect the release of the close supervisory relay 110 and the reopening of the metering control circuit.

A series of such impulses are transmitted in this manner by the contacts on the meter motor and the meter relay 400, the meter motor contacts being operated by the motor in a close-open ratio or at a certain speed which is proportional to the value of the particular characteristic which is to be read at the metered circuit. Synchronized operation of the meter control contacts 698 with the characteristics to be read thus effects the synchronized operation of the meter relay 400 and the transmission of a series of indicative signals over the connecting channel to the control station to enable the meter circuit at the controlling end to supply a correct reading of the metered load.

The substation motor meter contacts 698 continue to open and close intermittently to effect the repeated energization and de-energization of the meter relay 400 and the continued metering of the point for the period that the equipment is stopped on the selected metering point.

*Stepping of equipment to a control and supervisory point having metering facilities*

In the equipment arrangement illustrated at point four telemetering facilities alone were provided, in certain embodiments however it may be desirable to provide an arrangement in which a circuit breaker and metering equipment are included at a single point. The circuit breaker (or any other type of known controlled units conventionally used in the field) will desirably be controllable from the control station as the equipment is stepped to that point.

Additionally, for purposes of supervision it may be desirable to have telemetering facilities to indicate certain characteristics which exist at the substation. An embodiment of this type in which metering and control of a unit is accomplished at a single point has been set forth in the equipment shown at point five and the operation of such equipment will not be described.

Assuming that the selection key 844 associated with control station point five is operated to cause the equipment to step over the first four points in the manner herein described and to come to rest on point five of the equipment.

As the revertive impulse is received from the substation to indicate to the control station that the equipment has stepped to the fourth point, the control station line relay 180 responds to the incoming revertive signal to close its negative contacts 182 and to effect energization of the trip supervisory relay 120. As the incoming impulse is terminated the line relay 180 is operated to restore its armature to its neutral mid-position and to effect the series operation of the trip supervisory relay 120 and the stepping relay (odd) 240 in the manner heretofore described.

The stepping relay (odd) 240 operates and at its contacts 245 and 247 effects the application of a positive signal to the signal channel conductors 61 and 62, and at its contacts 243 completes a series operating circuit for the point selection relay 830 associated with the fifth point and the point relay (odd) 220.

Inasmuch as the selection key 844 is operated at this time, the stop on point relay 207 will be energized over a circuit extending from negative battery over the winding of relay 207, conductor 46, closed contacts 846, the white selection lamp 843, and contacts 833 to positive battery. The white selection lamp 843 energizes in series with the stop-on-point relay 207 and the continued illumination of the white selection lamp 843 indicates to the attendant at the control station that the equipment has stopped on point five.

The stop-on-point relay 207 in operating is effective at its contacts 210 to interrupt the energizing circuits for the equipment stepping relays 230 and 240, and at its contacts 208 prepares connection of the 110 volt A. C. source to the meter motor unit 840 associated with point five.

As such operations occur responsive to the operation of the point selection relay 830, the series point relay (odd) 220 which operate in series with the point selection relay 830 is effective at its contacts 224 to interrupt the holding circuit for the point selection relay 390 associated with the fourth point and the series relay (even) 212. The white selection lamp 359 associated with the fourth point is also extinguished thereby to indicate to the attendant that the equipment has stepped from the fourth point. Series point relay (odd) 220 in restoring is also effective at its contacts 225 to open the energizing circuit for the code supervisory relay 110 and the stepping relay (odd) 240 to effect the release thereof.

Stepping relay (odd) 240 in restoring is effective at its contacts 242 to interrupt the presently effective point in the energizing circuit for step alarm relay 146, which after a brief period of time restores and at its contacts 149' interrupts the holding circuit for the step preparing relay 150 which responsively releases. The control station equipment is now completely brought to rest on point five and is prepared for receipt of the control codes from the substation.

Referring now to the equipment at the substation, and the operation thereof responsive to receipt of the fifth stepping impulse (positive) from the control station. Substation line relay 305 operates and at its contacts 306 completes a series operating circuit for the point selection relay 710 associated with the fifth point and the series point relay (odd) 560 in the manner heretofore described. Assuming that the circuit breaker at the fifth point is in the closed position, the auxiliary switch contacts 751 will accordingly be in the closed position and as the point selection relay 710 operates it is effective to complete an operating circuit for the check determining relay 430 in the manner heretofore described.

As the incoming pulse is terminated the substation line relay 305 releases and restores its armature to its neutral mid-position whereby the shunt circuit for the check transmitter relay 530 is interrupted and the operation thereof in series with the series point relay 560 and the point selection relay 710 is effected. Check transmitter relay 530 at its contacts 532 and 534 applies a close supervision signal (positive) to the signal channel conductors 61 and 62 (signal 2) and at its contacts 538 completes an operating circuit for the odd-even relay 580. The transmitted positive signal indicates to the control station, as before, that the circuit breaker at the effective point is in the closed condition.

The odd-even relay 580 operates and at its contacts 584 interrupts a holding circuit for the point selection relay 630 (associated with the fourth point), which in turn effects the release of the series point relay (odd) 560 and the check transmitter relay 530.

The check transmitter relay 530 in its restoration is effective to interrupt the transmission of the positive impulse to the substation and at its contacts 536 interrupts the holding circuit for the check determining relay 430 to effect the release thereof.

A predetermined period of time after the release of the series point relay (odd) 560 and the opening of the contacts 564, the point hold relay 440 restores and at its contacts 446 recompletes an operating circuit for the normal supervisory relay 470, which in turn operates and at its contacts 474 completes an operating circuit for point supervisory relay 540.

Point supervisory relay 540 at its contacts 547 connects 110 volt source to the meter motor 760 to effect the energization thereof; the circuit extending from one side of the alternating current source over conductor 99, the meter control circuit 760, contacts 717, conductor 195, contacts 547 to the second side of the alternating current source. The point supervisory relay 540 at its contacts 542 also connects the auxiliary switch contacts 751, which are associated with the circuit breaker on the fifth point, to the check determining relay 430 for a purpose to be more clearly brought out hereinafter.

Referring briefly now to the equipment at the control station and the response thereof to the positive signal (signal 2) which was transmitted thereto, the control station line relay 180 responds to operate its armature to close positive contacts 181 to complete an operating circuit for the close supervisory relay 110 and prepare a circuit for the associate stop-on-point relay 206 which is presently shunted by the closed line relay contacts 181.

As the impulse is terminated the line relay 180 restores its armature to its neutral position and at its contacts 181 interrupts the shunt circuit for the stop-on-point relay 206, the energizing circuit now extending from negative battery over resistance 90, the winding of relay 110, contacts 113, conductor 22, contacts 217, conductor 59, contact 247', conductor 62', contacts 832 and 814 (the equipment being operated to indicate a closed breaker), conductor 3, contacts 121, conductor 1, contacts 204, the winding of relay 206, contacts 210, conductor 9, contacts 148 and 133 to positive battery.

The associate stop-on-point relay 206 operates and at its contacts 204 interrupts its series energizing circuit with the close supervisory relay 110 to effect the restoration of the close supervisory relay, and at its contacts 203 locks up to negative battery over resistor 53. Stop-on-point relay 206 is also effective at its contacts 201' to complete an operating circuit for the meter point relay 245', the circuit extending from negative battery over the winding of relay 245', contacts 150', conductor 2' and contacts 201' to positive battery. Meter point relay 245' operates and at its contacts 246 and 249' inclusive transfers the equipment at point five from the supervisory to the metering condition.

Referring now once more to the substation and the initiation of the metering of the fifth point thereat by the substation equipment. It will be apparent that with the energization of the meter control circuit motor 768, contacts 761 will be closed and an energizing circuit for the meter relay 400 is completed, the circuit extending from negative battery over the winding of meter relay 400, contacts 495, conductor 89, contacts 761 and 718, conductor 194', contacts 509, conductor 86, contacts 474, conductor 88, and contacts 546 to positive battery.

The meter motor contacts 761 are repeatedly and intermittently operated by the motor 768 to effect the intermittent transmission of metering pulses to the control station. That is, metering relay 400 in its intermittent operation is effective at its contacts 402 to intermittently apply a positive pulse to the signal channel conductors 61 and 62 to effect the corresponding operation of the line relay 180 at the control station much in the manner set forth in the description relating to the metering of point four. As the first incoming metering pulse is received, the line relay 180 responds to move its armature to close the positive contacts 181 to complete an operating circuit for the close supervisory relay 110 which operates and at its contacts 116 closes the meter control circuit, such circuit extending from negative battery over motor control unit 840, contacts 836, conductor 63', contacts 248', conductor 23, and contacts 116 to positive battery.

With the termination of the first metering impulse (positive), the line relay 180 restores its armature to the neutral mid-position to open the circuit for the close supervisory relay 110 to effect the release thereof. The close supervisory relay 110 in restoring terminates the first metering impulse to the metering equipment at point five.

As previously pointed out the meter motor contacts are operated at given close-open ratio, or a certain speed, which is proportional to the value of the characteristic to be metered. The operation of the control station equipment and the motor control unit 840 is therefore continuously effected as the metering impulses are repeatedly transmitted by the substation equipment for the period that the equipment is stopped on that metering point, or alternatively until a set of control operating impulses is transmitted by the control station to the substation.

*Automatic trip while on control and supervisory point having metering facilities*

With the equipment stopped on point five and the described metering in effect, it is of course important that a change of circuit breaker position at that point should be automatically indicated at the control station. The manner in which such indication is effected is now described.

With reference to the equipment at the substation and the circuit breaker at point five, it will be apparent that with the automatic trip of the circuit breaker thereat, the auxiliary contacts 751 will be opened to interrupt the holding circuit for the point indication relay 720 and the check determining relay 430. As in the previous example of an automatic trip while the equipment was standing on a point, the restoration of the check determining relay 430 is also accomplished and at its contacts 433 a momentary discharge circuit is completed for the capacitor 417. As the momentary discharge circuit is interrupted, the condenser recharges over the alarm recording relay 490 to effect the operation thereof.

Alarm recording relay 490 in operating is effective at its contacts 491 to effect the operation of alarm sending relay 480, which, in turn, completes an operating circuit for the check transmitter relay 530 to effect closure of its contacts 532 and 536 and the application of a trip supervisory signal (long negative) to the signalling channel conductors 61 and 62.

Alarm sending relay 480 at its contacts 484 completes an obvious operating circuit for the metering point change relay 493, which operates and at its contacts 495 interrupts a point in the operating circuit for the meter relay 400 to terminate the transmission of the metering impulses. Alarm sending relay 480 is also effective at its contacts 483 to effect the release of the alarm recording relay 490 which in turn effects the cascade release of the alarm sending relay 480, the check transmitter relay 530 and the metering point change relay 493.

With the release of the check transmitter relay 530, the long negative trip supervisory signal is terminated, and as the metering point change relay 393 restores the circuit to the metering relay 400 is re-established to re-effect the transmission of metering signals to the control station.

Referring now to the control station equipment and the operation of the line relay 180 responsive to the receipt of the trip supervisory (long negative) signal, the line relay armature is moved to close the negative contacts 182 to effect the operation of the trip supervisory relay 120. The trip supervisory relay 120 is effective at its contacts 122 to prepare a signal comparing circuit for the quipment at the fifth point, such circuit being shunted by the closed line relay contacts 182 at this time, and at its contacts 120' interrupts the holding circuit for the meter point relay 245', it being noted that the meter point relay 245' is currently held up over the contacts 248', 292', conductor 27', contacts 120', conductor 2' and contacts 201'. Such holding circuit was completed with the release of the step preparing relay 150 following stopping of the equipment on the fifth point and the conditioning thereof for the receipt of the control codes. As the meter point relay 245' restores, it is effective at its contacts 246' and 249' to transfer the point from the metering condition to the supervisory condition.

As the line relay 180 now restores responsive to the termination of the impulse to move its armature to the neutral mid-position to effect the opening of contacts 182, the shunt for the disagreement relay 127 is removed to effect the operation thereof in series with the trip supervisory relay 120, the circuit therefore extending from negative battery over resistance 90, the winding of trip supervisory relay 120, contacts 122, conductor 22, contacts 217, conductor 59, contacts 247', conductor 62', contacts 832, contacts 814 (it being remembered that the indication relay 810 is in the operated condition in that the circuit breaker was in the closed position prior to the assumption of an automatic trip), conductor 3, contacts 121', the left hand winding of disagreement relay 127, contacts 210, 211, 202, conductor 8, contacts 147 and 133 to positive battery.

As the disagreement relay 127 operates, it is effective at its contacts 129' to connect a source of positive battery to the point indication relay 810, the circuit extending from positive battery over the contacts 124, 129', conductor 21, contacts 834 and the windings of relay 810 to positive and negative battery respectively. As the point indication relay 810 releases responsive to the application of the positive potential to its windings, it is effective at its contacts 812 to interrupt the energizing circuit for the red close lamp 842', and at its contacts 811 completes an operating circuit for the green trip lamp 841. The indication relay 810 is also effective at its contacts 814 to interrupt the series energizing circuit for the disagreement relay 127 and the trip indication relay 120 to effect the release thereof. The proper indication of the position of the circuit breaker at substation point five has now been accomplished at the control station.

Additionally, disagreement relay 127 in its brief period of operation was effective at its contacts 128' to re-establish the operating circuit for the meter point relay 245', the circuit extending from negative battery over the winding of relay 245', conductors 3', and contacts 128' and 201' to positive battery. The meter point relay 245 operates and at its contacts 246' and 249' transfers the fifth point from the supervisory condition to the metering condition; and at its contacts 249' completes a self-holding circuit over contacts 249', 292', conductor 27', and contacts 120' and 201' to positive battery. It is apparent that the meter point relay 245' is made slow-to-release so that the trip supervisory relay 120 may restore prior to restoration of the meter point relay and thereby re-establish the holding circuit for the meter point relay prior to its restoration.

The equipment is now once more in the "stopped on a point" condition and, point five being a metering point, transmission of positive metering pulses by the substation is once more resumed.

It is seen from the foregoing that in the event of an automatic trip of a circuit breaker on a combined supervisory and metering point, as the equipment is at rest on such point, will be immediately reported to the control station equipment. The reporting of an automatic close of a breaker at a combined supervisory and metering point has not been set forth herewith in view of the comparative infrequency of such occurrence. Further since such operation is automatically picked up as the equipment is released from the point the disclosure of equipment for accomplishing such purpose has not been made herein.

*Controlling closure of breaker on control and supervisory point having metering facilities*

A particular feature of the present embodiment is the manner in which metering and supervisory control may be established for a single point, and it is with the manner of effecting supervisory control of a circuit breaker at a combination point of such type that the following description is concerned.

Assuming, for example, that the circuit breaker at the fifth point is in the tripped position and that the closure of such breaker is desired. The attendant operates the selection key 844 associated with point five to advance the equipment to the fifth point, and when the equipment is brought to rest thereat, as indicated by the illumination of the white selection lamp 843 thereat, operates the close key 191 to effect the transmission of a close code impulse set which, it will be remembered, comprises a negative impulse and a positive impulse.

The operation of the equipment at the control station responsive to closure of the close key 191 is the same as heretofore described in connection with the closing of a breaker on an odd point, and reference to that portion of the description is made at this point.

Briefly, with operation of the close key a first close code pulse comprising a negative impulse followed by a second close code pulse comprising a positive impulse are transmitted by the control station over the signal channel conductors 61 and 62 to the substation. In addition to the repetition of the circuit operations which have been previously described, in the portion above designated, the second counting chain relay 268 is effective in its operation at this time to open contacts 292' to effect the restoration of the metering point relay 245', which relay in its restoration is effective at its contacts 246' to 249' to transfer the operating circuits for point five from the metering to the supervisory condition.

The substation equipment responds to the receipt of the first and second close code impulses in the manner previously set forth and in addition to the circuit operations described thereat, the energizing circuit for the metering relay 490 is interrupted with the operation of the operation hold relay 503 and the opening of its associated contacts 509. The substation equipment absorbs the first and second close code impulses to operate the control counting chain to effect the closure of the breaker in the manner heretofore described.

As the second control counting chain relay 513 is operated, to close the breaker on point five, it is also effective at its contacts 520' to operate the meter point change relay 493 to open contacts 495, and thus further interrupt the circuit for metering equipment during the operation of the control counting chain and the closure of the circuit breaker associated with point five.

Report of the change position of the circuit breaker at point five responsive to receipt of the close impulses is accomplished in the same manner as set forth hereinbefore, the equipment being effective to transmit a close supervisory pulse (long positive) to the control station as the auxiliary switch contacts 751 at point five close with the circuit breaker. As the release of the alarm sending relay 480 is accomplished to terminate the transmission of the close signal the energizing circuit for the metering point change relay 493 is interrupted and as the relay responsively releases it recloses its contacts 495 to re-establish the energizing circuit for the meter relay 490. Metering impulses are therefore now once more applied to the signalling channel.

The control station equipment is operative responsive to receipt of the close supervisory pulse (long positive) in the manner heretofore described to compare the incoming signal with the control board indications and on discovery of the "at variance condition" to operate the indication relay 810 associated with the indication relay for the fifth point and effect the correction of the indication there shown. Specifically, the green trip indication lamp is deenergized and the red close indication lamp 842 is now illuminated.

It will be recalled that such operation is accomplished by a socalled disagreement relay 127 on detection of the disagreement between the incoming signal and the condition indicated at the control board. The disagreement relay 127 in operating is also effective at its contacts 128' to reenergize the meter point relay 245, which in its operation once more transfers the circuits at point five from the supervisory to the metering condition. The control station is accordingly once more conditioned for the receipt of the metering impulses which are again transmitted by the substation briefly after termination of the close supervisory signal.

*Controlling trip of breaker on control and supervisory point having metering facilities*

The supervisory trip of a breaker at a combined supervisory and metering point such as point five, may also be accomplished by the attendant when the equipment has been brought to rest at such point. Such operation is accomplished much in the manner set forth in the description relative to the closing of a breaker at an odd point, the control station equipment being operative responsive to the closure of the trip key 187 to transmit the trip code impulse set comprising a negative pulse followed by two positive impulses.

Such operation is, of course, basically accomplished through the cycling of the control station control counting chain in the manner heretofore described. In addition to the previous operations, the control counting chain 288 is effective at its contacts 292' to interrupt the holding circuit for the meter point relay 245', which responsively releases and transfers the equipment at control station point five from the metering to the supervisory condition in preparation for the change of position indication which is to be subsequently received.

The equipment at the substation responds in much the same manner set forth in the description relating to the tripping of a breaker at an odd point, the equipment being additionally responsive to interrupt the circuit of the metering relay 400, such interruption being accomplished by the operation hold relay 503 at its contacts 509 responsive to receipt of the first incoming trip code pulse. The metering circuit is maintained open at that point for the period that substation counting chain responds to the incoming trip code pulses to energize the trip coil and to effect the tripping of the breaker. The substation equipment is further operative to transmit a trip supervisory signal to indicate to the attendant that the desired change of position of the circuit breaker has been accomplished, the trip supervisory signal being transmitted in the manner previously set forth in the description relating to the change of position of a circuit breaker at an odd point. In addition to the operations set forth thereat, the alarm sending relay 480 in releasing operates its contacts 484 to now interrupt the holding circuit for the metering point change relay 493 to effect the release thereof. As relay 493 releases the closure of contacts 495 is effected to re-establish the metering circuit for the meter relay 400, whereupon metering of the selected point five is once more re-established.

The equipment at the control station, in turn, responds to the received trip supervisory signal to compare the received trip supervisory signal with the close indication provided by the equipment at point five, and on finding these two at variance effects the operation of the disagreement relay 127. The disagreement relay, in turn, is effective to effect release of the indication relay 810 to illuminate the green trip lamp 841 and to extinguish the red close lamp 842 to thereby indicate to the attendant at the control station that the trip of the substation circuit breaker at point five has been accomplished.

The disagreement relay 127 is also effective at its contacts 128' to establish an operating circuit for the meter point relay 245', which in operating effects the transfer of the indicating equipment associated with point five from the supervisory to the metering condition.

Thus, as the metering impulses are once more received from the substation, the control station equipment is operative to provide visual metered indications of the particular load condition under survey at the substation point five.

It is evident that the equipment will operate in the manner previously set forth responsive to the occurrence of an automatic trip or an automatic close of the circuit breaker at point five while the system is in the normal restored condition (as compared with the operation of the equipment when at rest on point five). Briefly, whenever a change of position occurs while the equipment is at rest or prior to the stepping of the equipment over point five, an indication of such change will be recorded in the manner heretofore described and the system will automatically step over the points to pick up such change of position for the control station indicating equipment.

It is apparent from the foregoing that a control system may readily include points adapted solely for metering purposes, points adapted solely for supervisory purposes and points adapted for both of said purposes, the equipment providing the same reliable and dependable control without deference to their classification.

*Releasing from a point by restoration of selection key*

It will be recalled that the foregoing descriptions have been concerned with the operation of the equipment to various ones of the system points and the accomplishment of various supervisory and metering functions as the equipment was moved thereto. The operation of the equipment to a particular point was effected in each case by the operation of the particular selection key which is individual to that point, and once the equipment moves to a selected point it will rest at such point until the operated selection key is restored or until the reset key is operated. Considering first the operation of the equipment as the operated selection key is restored and the manner in which the control station equipment responsively effects the "start-from-point" code comprising a short negative impulse followed by a long positive impulse.

It is noted that a negative signal is transmitted first in the "step-from-point" code, such signal being provided primarily for the purpose of insuring proper signalling when the equipment is brought to rest on a metering point in which current magnitude type metering system is used. Also in systems using impulse type metering (such as has been described herein) the first negative impulse has an advantage over the use of a first positive impulse in the instances when the attendant desires to signal the substation during a metering operation, especially if heavy line leakage conditions are prevalent.

Assuming now that the equipment has been brought to rest on point two as a result of the operation of the selection key 339 associated with point two at the control station. Assuming further that the desired operation of the circuit breaker associated with that point has been accomplished and that the equipment is now to be restored to its normal condition.

Briefly relays 130, 140, 170, 206, 207, 212 and 370 at the control station are operated and relays 418, 470, 540, 559 and 619 at the substation are operated. The release from the point is initiated by effecting restoration of the selection key 339, which in its restoration opens its associated contacts 337 to interrupt the holding circuit for the stop-on-point relay 207 to effect the release thereof. The white selection lamp 328 associated with point two which was previously maintained energized over selection key contacts 336 is now energized over a new circuit extending from positive battery over contacts 373, lamp 328, contacts 329, conductor 47 and resistance 53 to negative battery.

As the stop-on-point relay 207 releases, it is effective at its contacts 211 to interrupt the energizing circuit for the associate stop-on-point relay 206 to effect the release thereof.

The associated start-on-point relay 206 is slow-to-release and accordingly during the period that elapses pending release thereof a momentary energizing circuit is established for the start-on-point relay 257 which extends from negative battery over the winding of relay 257, contacts 211' (relay 207 having restored), contacts 202 (relay 206 holding up momentarily after opening of its circuit), conductor 8, and contacts 147 and 133 to positive battery. Start-from-point relay 257 operates and at its contacts 265 completes a self-holding circuit which extends over contacts 265, conductor 40, and contacts 187 to positive battery.

The main purpose of effecting operation of the start-from-point relay 257 is to initiate operation of the counting chain to effect the transmission of the start-from-point code. Specifically, the application of the first negative impulse to the signalling channel is accomplished by the closing of contacts 259 and 261 of the start-from-point relay 257 in its present operation, the signalling circuit extending from positive battery over resistance 178, conductor 29, contacts 268, 259, 275, 236, and 246 to conductor 62 and negative battery being applied over resistor 179, conductor 35, and contacts 270, 261, 277, 236, and 248 to channel conductor 61.

Start-from-point relay 257 is also effective at its contacts 264 to complete an operating circuit for the auxiliary start relay 100, which operating circuit extends from negative battery over resistance 90, the winding of auxiliary start relay 100, conductor 31, and contacts 264, to positive battery. The auxiliary start relay 100 in operating is effective as before to effect the cascade operation of the step alarm relay 140 and the step preparing relay 150.

The start-from-point relay 257 is further effective at its contacts 262 to complete an operating circuit for the first of the counting chain relays (relay 284) to initiate the cycling of the counting chain circuit, such circuit extending from negative battery over the winding of the first counting chain relay 284, contacts 189, conductor 28, contacts 183, conductor 30, contacts 262, 285, 289, and 293, resistance 218, contacts 256', conductor 42, and contacts 119 and 117 to positive battery.

As the first counting chain relay operates it is effective at its contacts 285' to lock itself over contacts 289 and 293 to the equipment ground on conductor 42; and at its contacts 287 completes an operating circuit for the first control pulsing relay 250 by extending the equipment operating ground on conductor 42 thereto.

Control pulsing relay 250 operates and at its contacts 255 extends the operating potential to the associate control pulsing relay 180' and at its contacts 255' completes a circuit for the second counting chain relay 288 which extends in series with the first counting relay 284.

As the associate control pulsing relay 180' operates it is effective at its contacts 189 to interrupt the energizing circuit for the control pulsing relay 250 to effect the release thereof. Control pulsing relay 250 in releasing is effective at its contacts 255, to interrupt the series energizing circuit for the first and second counting chain relay 284, the second counting chain relay 288 now holding up over a circuit extending over its own contacts 289 to the equipment ground on conductor 42.

With the release of the control pulsing relay 250 and the first counting chain relay 284, an operating circuit is completed for the polarity reversing relay 267, the circuit extending from negative battery over the winding of relay 180', contacts 256, contacts 185, contacts 266 and 273, the winding of polarity reversing relay 267, contacts 291, and 287', conductor 42, and contacts 119 and 117 to positive battery.

As the polarity reversing relay operates, it is effective at its contacts 273 to interrupt the energizing circuit for the control pulsing relay 180' to effect the release thereof and at its contacts 269 and 271 prepares the equipment for the application of a long positive signal to the channel and the removal of the negative signal presently being transmitted.

Specifically, as the polarity reversing relay 267 now operates it is effective at its contacts 268 and 270 to interrupt the application of the negative impulse to the signal channel conductors and at its contacts 269 and 271 to substitute therefor a positive impulse, positive battery being applied over resistance 178, conductor 29, contacts 269, 261, 277, 236, and 248 to the signal channel conductor 61; and negative battery being applied over resistance 179, conductor 35, contacts 271, 259, 275, 236, and 246 to signal channel conductor 62. It is apparent therefrom that the negative impulse is applied to the line for a comparatively short period of time and that instantaneously with the removal of the negative impulse, a positive impulse is applied to the channel.

As the control pulsing relay 180' releases as a result of the operation of the polarity reversing relay 267, the cycling of the counting chain continues in the manner heretofore described. That is, the first controlling pulsing relay 250 once more is reoperated by the release of relay 180', and is in turn effective to reoperate control pulsing relay 180' and to energize the third counting chain relay 295. The cycling continues, control pulsing relay 180' reoperating to effect the restoration of the first pulsing relay 250, which in restoring interrupts the holding circuits for the second counting chain relay 288 and the associate pulsing relay 180' to effect release thereof.

As the associate relay 180' releases after the elapse of the predetermined time period, the first control pulsing relay 250 reoperates for the third time in this cycle and again reenergizes the associate pulsing relay 180', and interrupts the holding circuit for the third counting chain relay 295 to effect the release thereof.

Pulsing relay 180' operates and at its contacts 189 interrupts the holding circuit for the first pulsing relay 250 which responsively releases. Inasmuch as the counting chain has run its cycle and each of the counting chain relays 284, 288 and 295 are in their restored condition, the holding battery on conductor 42 for the polarity reversing relay 267 which is extended over the contacts of one of these relays at all times during the chain cycling, is now interrupted and after a predetermined period of time the restoration thereof is effected. The holding circuit for the start-from-point relay 257 is also interrupted by the open contacts of the counting chain and release thereof is simultaneously effected. The positive impulse which was applied to the channel by the start-from-point relay 257 is now terminated, it being apparent that the positive pulse is applied to the signal channel for a period which is somewhat greater than the period of application of the preceding negative impulse.

With the restoration of the start-from-point relay 257 and the opening of its contacts 262, the associate control pulsing relay 180' is released and an operating circuit for the pertinent one of the stepping relays 230 or 240 is now completed, it being apparent that the particular relay operated at this time will be determined by the nature of the point upon which the equipment has been brought to rest, that is, odd or even.

Specifically, if the equipment has been brought to rest on an even point the stepping relay (odd) 240 will now be operated to move the equipment to the sequential odd point (in this example point three). Should the equipment have been brought to rest on an odd point, such as point 3, then the stepping relay (even) 230 would now be operated to move the equipment to the following even point (point 4).

In any event, it is apparent that following the transmission of the short negative and long positive impulse the control pulsing relay 180' restores to effect the transmission of a stepping impulse to cause the equipment to proceed from the point upon which it is stopped and across the following points.

Assuming that the equipment was stopped on point two with the restoration of the control pulsing relay 180', contacts 184 open and a shunt is removed from a series operating circuit for the stepping relay (odd) 240 and the auxiliary start relay 100, the operating circuit extending from negative battery over resistance 90, the winding of relay 100, contacts 102, contacts 151, conductor 6, the winding of the stepping relay 240, contacts 221, conductor 7, and contacts 103 to positive battery.

The operation of the equipment following energization of the stepping relay (odd) 240 is similar to that heretofore described, that is, as contacts 244 are closed by relay 240, the point selection relay 383 will be energized in series with the series point relay (odd) 220 with the consequent results that the white selection lamp 348 at point three is illuminated, the white selection lamp 339 at point 2 is extinguished, and the auxiliary start relay 100, the point selection relay 370 associated with the second point and the series point (even) 212 are all restored. The restoration of the stepping relay 240, of course, terminates the transmission of the stepping impulse and the equipment now awaits the return of the first revertive pulse from the substation.

Referring now to the equipment at the substation and the operation thereof in response to receipt of the step-from-point code (short negative impulse and a long negative positive impulse) and the subsequent receipt of the first stepping impulse.

As the first short negative impulse is received the substation line relay 305 moves its armature to close its negative contacts 304 to complete an operating circuit for the negative supervisory relay 460, which in operating is effective at its contacts 467 to complete the operating circuit for the operation hold relay 503. As the operation hold relay 503 operates, it is effective at its contacts 505 to complete an operating circuit for the associated hold relay 500 and alarm recording relay 490 in the manner heretofore described.

Alarm recording relay 490 operates and prepares for the transmission of an alarm signal to the controlling station after the points have been completely stepped over and the system is returned to normal. Reference is made to the description of the previous stepping operation, it being apparent that with the operation of the alarm recording relay 490 anytime during the stepping operation, the system will be automatically recycled as the stepping is completed.

The object of such recycling is, of course, to pick up any change in position of a circuit breaker which may have occurred on a point which is previous in sequence to that upon which the equipment was stopped. For example, while the circuit breaker at point two might automatically trip while the equipment is stopped on a further point, such as point four, the indication at the control station point two will accordingly be inaccurate. By providing means for recording a change of position, while the equipment is at rest on a point, whereby automatic recycling is effected following stepping from a point, an extremely reliable control system is effected.

The operation hold relay 503 is further effective at its contacts 509 to interrupt the operating circuit for the meter relay 400 to thus disable the equipment in its transmission of further metering signals in the event that the equipment had been stopped on a metering point.

As the short negative impulse is now followed by the longer positive impulse, the substation line relay 305 responds by moving its armature from its left hand to its right hand position to open the negative contacts 304 and to close the positive contacts 306. The negative supervisory relay 460 is responsively restored and the positive supervisory relay 450 is energized.

When the negative supervisory relay 460 was initially energized responsive to receipt of the short negative impulse, it was effective at its contacts 468 to interrupt the holding circuit for the normal supervisory relay 470 which being slow to release holds approximately until the long positive impulse is received. Although the negative supervisory relay 468 restores to recomplete the circuit for the relay 470, a further point is now interrupted by positive supervisory relay contacts 457. As the normal supervisory relay 470 does release, it is effective at its contacts 472 to complete an operating circuit for the point hold relay 440 which extends from negative battery over the winding of point hold relay 440, contacts 472, 455 to positive battery. The normal supervisory relay 470 is also effective at its contacts 474 to interrupt the holding circuit for the point supervisory relay 540, and at its contacts 473 is effective to interrupt the holding circuit for the off-normal relay 550. Relays 540 and 550 accordingly restore to further open points in the metering circuits.

The point hold relay 440 operates to further prepare the equipment for the stepping operation by effecting the release of the operation hold relay 503 and the associated hold relay 500, such restoration being accomplished by the opening of the contacts 446. Point hold relay 440 at its contacts 443 also transfers the holding circuit for the positive supervisory relay 450 to its contacts 444.

As the long positive pulse is subsequently terminated the line relay 305 returns its armature to its neutral midposition to open the positive contacts 306 to thus effect the restoration of the positive supervisory relay 450. The operating circuit for the point hold relay 440 is interrupted as the positive supervisory relay 450 releases, but being of the slow-to-release type remains operated for a predetermined time interval. During such time period the first stepping impulse is received and the point hold relay is now maintained energized over a new circuit.

Assuming that the equipment was at rest on point two and is being stepped to point three by the first stepping impulse (positive in nature), the point selection relay 620 will be operated in series with the series point relay (odd) 560 in the manner heretofore described to effect the stepping of the equipment in the normal manner. Series point relay (odd) at its contacts 564 completes an energizing circuit for the point hold relay 440 before it has a chance to fall back following the previously mentioned interruption of its energizing circuit and the relay holds up over the circuit while the equipment steps across each of the remaining points in response to the receipt of the further stepping impulses.

It will be remembered that the alarm recording relay 490 was energized as the operated selection key was restored. Accordingly, as the equipment has stepped over the remaining points, a recycling of the equipment over each of the points is effected in the manner heretofore described, the equipment restoring to its normal standby condition as the cycle is completed.

It is seen from the foregoing, therefore, that by the simple expedient of restoring the operated selection key, the equipment responsively steps over the remaining points and then completely recycles to insure the achievement of correct indications at the control station of the circuit breakers at the substation points.

*Releasing from a point by operation of reset key*

The restoration of the equipment from its "stopped on a point" position may also be accomplished by the operation of the reset key 185, the operation of the key effecting the transmission of a single long negative impulse to the substation to prepare it for the receipt of the stepping pulses.

The use of the reset key in effecting the release of the equipment from a point upon which it has been stopped, it is possible to effect the selection of a point which is previous in the point sequence order without having to recycle the equipment over each of the remaining points.

Specifically, the manual operations in moving from point two to point one would comprise the pulling of the selection key at point one, and the momentary operation of the reset key 185. The equipment will responsively leave point two, move to normal, step from normal to point one and stop. The selection key on point two may then be restored to normal and the equipment will remain on point one.

The operation of the equipment responsive to operation of the reset key in cooperation with a point selection key will now be described. Operation of reset key 185 effects the closure of contacts 183 and 184 and the operation of the reset relay 274, the circuit extending from negative battery over the winding of relay 274, C34, contacts 153, 147', and 183 to positive battery.

As the reset relay 274 operates it is effective at its contacts 276 and 278 to apply a negative start-from-normal signal to the signal channel conductors 61 and 62, the positive battery being applied over resistance 178, conductor 29, contacts 276, 236 and 246 to conductor 62, and the negative battery being supplied over resistor 179, conductor 35, contacts 278, 238 and 248 to conductor 61. Reset relay 274 at its contacts 283 also completes a self-holding circuit over conductor 40 and contacts 187 to positive battery and at its contacts 278 interrupts the holding circuits for the series point relay (even) 212, the point selection relay 370 associated with the second point and the off normal relay 130. Further, reset relay 274 at its contacts 282 completes an operating circuit for the auxiliary start relay 100, the circuit extending from negative battery over resistance 90, the winding of relay 100, conductor 31, contacts 263 and 282, conductor 34, contacts 153, 147' and contacts 183 of the operated reset relay 184 to positive battery.

Auxiliary start relay 100 operates and at its contacts 104 completes an obvious operating circuit for the step alarm relay 146 which operates and at its contacts 149' completes an operating circuit for the step preparing relay 150 and the series point relay (even) 212.

The point selection relay 370 in releasing is effective at its contacts 373 to interrupt the energizing circuit for the white selection lamp 328 to extinguish same and indicate to the attendant that the equipment has stepped off point two. Point selection relay 370 at its contacts 373 also interrupts the holding circuit for the stop on point relay 207 to effect the release thereof.

As the off-normal relay 130 restores, it is effective at its contacts 131 to interrupt the holding circuit for the off-normal start relay 140 to effect the restoration thereof if all point selection keys are in the normal position, in the present example it has been assumed that point selection keys 319 and 339 are both in the off normal condition and off normal start relay 140 therefore remains in the operated position. Thus relays 140 and 274 provide a holding circuit for the relay 170. Relay 130 also is effective at its contacts 133 to interrupt the holding circuit for the associate stop on point relay 206 which responsively restores. With the restoration of the associate stop on point relay 206 and the consequent closing of contacts 206', an operating circuit is completed for the first counting chain relay 284. The counting chain is now operated to run its cycle in the manner heretofore described and during such cycle the reset relay 274 remains operated over the described holding circuit to maintain the application of the negative signal on the signal channel conductors 61 and 62. As the cycle of the counting chain is completed the equipment proceeds in the manner heretofore described to step from start until it reaches the operated point which is, in the present example, point one, selection key 1 being effective to stop the equipment at such point.

Referring now to the substation and the operation of the equipment thereat responsive to receipt of the long negative signal, substation line relay 305 will respond to the incoming negative impulse to move its armature to close the negative contacts 304 and to thereby complete an operating circuit for the negative supervisory relay 460 which operates and at its contacts 467 completes an operating circuit for the operation hold relay 503.

As the operation hold relay 503 operates to close its contacts 505, an operating circuit is completed for the associated hold relay 500, and at its contacts 507 completes an operating circuit for the alarm recording relay 490.

As the negative supervisory relay 460 operates, it is also effective at its contacts 468 to interrupt the holding circuit for the normal supervisory relay 470 to effect the restoration thereof. Normal supervisory relay 470 restores and at its contacts 472 completes an operating circuit for the point hold relay 440, the circuit extending from negative battery over the winding of relay 440, contacts 472, contacts 466 and 414 to positive battery. The release of the normal supervisory relay also effects the opening of the point supervision and metering circuits by opening its contacts 474 to interrupt the holding circuit for point supervisory relay 540, and at its contacts 473 interrupts the holding circuits for the off-normal relay 550 and the point indication relay 610 associated with the second point.

As the point hold relay 440 operates over the circuit described, it is effective to further prepare the substation equipment for the stepping operation by opening the contacts 446 and thereby interrupting the holding circuit for the operation hold relay 503 which responsively releases. As the operation hold relay 503 restores to open its contacts 505 the associate hold relay 500 is also released.

The equipment at the substation will now step in synchronism with the equipment at the control station in the manner heretofore described, the control station transmitting the operating impulses and the substation accepting the operating impulses and returning revertive signals to the control station to indicate the position of the circuit breaker for the selected point and that the transmission of the succeeding stepping signal is in order, until the newly selected point (point 1 in the illustrated example) is reached.

Should the reset key be in the operated position as the equipment takes its final step, whether the last step or otherwise, as the stepping relays 230 and 240, respectively, are returned to their normally restored positions, the holding circuit for the step alarm relay 146 will be interrupted by contacts 231 and 241 to effect the restoration thereof. The step alarm relay 146 in its restoration effects the opening of contacts 149' and the interruption of the holding circuit for the step preparing relay 150, which in its release is effective as its contacts 153 to complete an operating circuit for the reset relay 274 and to effect the recycling of the equipment. Briefly, it is seen, then, that if the reset key is depressed and held with all point selection keys normal, the equipment continuously recycles over all the points. If the reset key is depressed and held with point selection key 4 in the off normal position the equipment continuously recycles over points 1 to 4.

*Condition of stall*

In the event of relay contact failure, line failure, or the occurrence of any other possible mechanical difficulties the system will be prevented from stepping in the normal manner. The stalled condition which follows will generally result in the release of the stepping alarm relay 146 and the step preparing relay 150. With these two relays released operation of the reset key 185 will energize the reset relay 274 and thereby once more establish stepping across the points in an effort to overcome the stalled condition of the equipment.

The equipment may be in several of various conditions when a stall occurs, and each one will be considered individually at this point.

First in the event that the equipment is stalled at a time when both stepping relays 230 and 240 are in the deenergized condition, it is apparent that the holding circuit for the step alarm relay 146 will be interrupted at contacts 231 and 241 thereof, and after the stalled condition has existed for a predetermined period of time, the slow to release stepping alarm relay 146 will restore, and at its contacts 149' interrupt the holding circuit for the step preparing relay 150 which will also restore. An operating circuit is now prepared for the reset relay 274 and the operation of the reset key at this time will effect the energization thereof. The reset relay 274 operates in the manner previously described and the re-initiation of the stepping of the equipment is effected to eliminate the stalled condition.

In the event that a stall occurs at the time that the stepping relay (odd) 240 is in the energized condition and the stepping relay (even) 230 is in the restored condition (re as the equipment is stepping to an odd point) the contacts 242 will be opened and after the stall has endured for a predetermined period of time the step preparing relay 150 will restore. As the step preparing relay 150 releases it is effective at its contacts 151 to open the holding circuit for the stepping relay (odd) 240 to effect the restoration thereof, and at its contacts 154 opens its own energizing circuit to prevent reoperation thereof as the stepping relay 240 (odd) restores.

The holding circuit for the step alarm relay 146 is now interrupted by the opened contacts 231 and 241 of both the stepping relays and after a brief time interval the stepping alarm relay 146 will release whereupon an operating circuit to the reset relay is prepared. Operation of the reset key 185 thereafter will operate reset relay 274 and initiate stepping of the equipment over the points to overcome the stalled condition of the equipment.

In the event that the equipment comes to rest with the stepping relay (even) 230 in the energized condition and the stepping relay (odd) 240 in the restored condition, the holding circuit for the step preparing relay 150 will be interrupted at the open contacts 232 and after the stall has presented for a brief period of time the step preparing relay 150 will restore. With restoration of relay 150 contacts 151 will open the energizing circuit for stepping relay 230, and contacts 154 are opened to interrupt a further point in its own energizing circuit. As the stepping relay 230 restores it is effective at its contacts 231 to interrupt the last point in the holding circuit for the step alarm relay 146 which restores after a predetermined interval of time. An operating circuit is now prepared for reset relay 274 and with operation of the reset key 185 thereafter the reset relay 274 operates to initiate stepping of the equipment to overcome the stalled condition.

If the equipment should reach a stalled condition at a time when both of the stepping relays are in the operated position (such occurrence being highly improbable), the energizing circuit for a step preparing relay 150 will be interrupted at both of the contacts 232 and 242 and the step preparing relay 150 will release in the manner just described to open contacts 151 and effect the release of both of the stepping relays 230 and 240. A brief interval of time thereafter the step alarm relay 146 will restore and the operating circuit for the reset relay 274 is prepared as before, operation of the reset key thereafter accomplishing completion of the prepared circuit and restepping of the equipment.

With the occurrence of anyone of these conditions of stall it is important that the attendant be notified. In each instance the eventual release of the step alarm relay 146 is effected and accordingly contacts 147 have been arranged to complete an operating circuit for the flashing relay 165, which extends from negative battery over the winding of relay 165, contacts 157 conductor 49, contacts 201, conductor 8, contacts 147, and 133 to positive battery. The flashing circuit comprising the relays 165 and 156 operates in the manner heretofore described, and flashing relay 156 at its contacts 153 completes an operating circuit for the alarm bell 177 by extending the ground on conductor 49, over contacts 158 the alarm bell 177, and resistor 94, to negative battery. The flashing alarm relays 156 and 165 operate to intermittently energize and de-energize the alarm bell 177 in the manner heretofore described. The attendant responds to the receipt of this audio signal by operating the reset key 185, it being remembered that in each of the four described cases an operating circuit has been prepared for the reset relay 274.

The operation of the reset key 185 to initiate the operation of the equipment will be similar to that set forth in the description relating to the releasing of the equipment from point two by operating the reset key 185 and further description thereof is and believed necessary at this time.

It is apparent from the foregoing that with the stall of the equipment responsive to the occurrence of an unexpected failure of a portion of the equipment, the equipment will automatically reset itself for recycling and will inform the attendant of such condition. The attendant may thereafter operate the reset key to effect the recycling of the equipment and the movement thereof from its stalled position.

Alternative methods of signalling

An important feature of the invention is the manner in which the equipment is readily adapted for use with the various types of signalling systems conventionally used in the field today. The arrangement which has been described heretofore has been particularly concerned with the control of a remote station over a two-wire metallic wire circuit in which direct current signals of either polarity were used for selective control purposes. When the installation permits the use of a transmission path comprising a two-wire metallic circuit, the D. C. type signalling is usually employed for reasons of economy and simplicity of operation. However, in many installations, the running of a metallic line is not economically warranted by lengthy distance runs, unfavorable terrain and/or climate conditions, and other known factors which may seriously affect the direct current type of signal. In such instances the so-called alternating type current signal is necessarily employed.

Synchronous systems known heretofore have not been readily adaptable for use with both A. C. and D. C. signalling equipment and there is therefore a definite need in the art for a system which is sufficiently flexible to permit ready adoption thereof for use with either type of signalling arrangement. The following description is concerned with the manner in which the previously disclosed arrangement may be readily adapted for use with the alternating current type signalling system.

The alternating current signals more commonly used in the field today consist of audio-frequencies, carrier frequencies, and radio-frequencies. The system is especially well suited for micro-wave operations, since with the interference problem being essentially eliminated at these frequencies, the use of two modulating frequencies instead of one is no particular disadvantage. Modulation of a single frequency as well as the use of several frequencies in combination or the code keying of several frequencies are conventionally used in the field today, and the adaptation of the disclosed system for use with any one of these signalling methods will become apparent with reference to the following disclosure which is particularly concerned with the adaptation of the system for use with carrier signalling.

General description

Referring now to Figure 9, the control station "A" and the substation "B" are shown interconnected by a common signalling channel comprising a set of conductors 61 and 62 as in the previous disclosure. The carrier receiver and transmitter may of course be connected to radio transmitter and receiver apparatus, whereby the metallic conductors 61 and 62 could be eliminated. A carrier transmitter 900 and a carrier receiver 901 are connected to the control station end of the signalling channel, and the signal generating equipment which was used to generate the D. C. signals are now effective to control a tone transmitter 903 to alternatively apply one of two tones to the carrier frequency ($f_1$) supplied by the transmitter unit 900. The generated signal is in turn applied to the signalling channel and the substation by the transmitter 900.

A carrier receiver unit 913 arranged to respond to frequency ($f_1$) is connected to the incoming side of the signalling channel at the substation. A tone receiver 914, comprising a pair of tone responsive units 915 and 916, is connected to the carrier receiver, the tone receiver 915 being operatively responsive only to the receipt of a carrier signal modulated by tone 1, and the tone receiver 916 being operated responsive only to receipt of a carrier signal modulated by the tone signal 2. These units are conventional in the art and are accordingly shown in schematic form herein.

Each tone receiver has an associated control relay (917 and 919 respectively) which is operated by the associated receiver responsive to the detection of its assigned tone. Each control relay is arranged to control the substation signal receiving equipment through the means of a set of associated contacts 918 and 920, respectively, these contacts being comparative in operation to the contacts of the previously disclosed polarized substation line relay 305. Thus, the operation of the equipment responsive to the receipt of a carrier modulated with tone 1 or tone 2 is identical to that accomplished in the previous description responsive to transmission of the D. C. signals of positive and negative polarity, the transmission of tone 1 being comparative to the transmission of a positive signal in the previous embodiment, and the modulation of tone 2 of the carrier being comparative to the transmission of the negative signal.

Specifically, operation of the control relay 917 as carrier modulated by tone 2 is received will accomplish the closure of contacts 918 and the same substation equipment operation as was accomplished by the operation of the polarized line relay 305 as a negative signal was received to close the negative contacts 304. Similarly, the operation of the control relay 919 upon receipt of the carrier signal modulated with the tone 1 will effect the closure of the contacts 920 and the same substation circuit operations as were accomplished when the substation polarized line relay 305 was operated by a positive signal to close its positive contacts 306.

The substation equipment in turn includes a carrier transmitter 925 conditioned to transmit a carrier frequency $f_2$ modulated in tone 1 or tone 2 in accordance with the operated state of the substation signal generating equipment. Specifically, a tone transmitter 921 is connected between the signal generating equipment and the carrier transmitter unit 925 and is operative to apply tone 1 from a source 922 or tone 2 from a source 923 to the input side 924 of the carrier transmitter 925 in accordance with the operated condition of the substation signal generating equipment (shown in schematic in Figure 9). The carrier transmitter 925 being connected to the signal channel is in turn operative to apply the basic carrier frequency $f_2$ as modulated by tone 1 or tone 2 to the signal channel conductors 61 and 62 whenever substation signal generation occurs.

The carrier receiver 901 located at the control station is tuned to receive carrier frequency ($f_2$) as transmitted by the substation and is arranged to apply the received signal to a tone receiver unit 902, which is operative to control the control station equipment in accordance with the nature of the signal received. The tone receiver 902 is similar in arrangement to the substation tone receiver 914, comprising two tone responsive units, 907 and 910, which in turn selectively operate individual control relays 908 and 911 respectively to control the control station signal receiving equipment in the manner described hereinbefore.

Specifically, with the receipt of carrier frequency ($f_2$) modulated with tone 1 the tone receiver 907 responds to operate the associated control relay which in turn closes contacts 909 and operates the control station equipment in the manner that the equipment was operated as control station line relay 180 formerly responded to the receipt of a positive signal. The tone receiver 910 responds to receipt of the frequency ($f_2$) modulated by tone 2 to operate the control relay 911 which closes contacts 912 and effects operation of the control station equipment in the manner in which the equipment was operated previously as the control station line relay 180 was energized responsive to receipt of a signal of negative polarity.

*Operation of system*

The operating codes in the D. C. signalling system previously used may also be used in the A. C. signalling system, the application of tone 1 to the carrier in the A. C. signalling arrangement being comparative to the application of a signal of positive polarity in the D. C. signalling arrangement, and the application of tone 2 to the carrier being comparative to a signal of negative polarity. Thus with reference to the following chart the manner in which the equipment is operative to transmit the various signals is clearly apparent therefrom.

*Signal comparing chart*

FROM SUBSTATION

| D. C. Signal | Purpose | A. C. Signal |
| --- | --- | --- |
| Continuous Positive (while normal) | Line Supervision | $f_2$, Tone 1. |
| Long Negative (while normal) | Alarm Signal | $f_2$, (long) Tone 2. |
| Short Positive (while stepping) | Close Supervision | $f_2$, (short) Tone 1. |
| Short Negative (while stepping) | Trip Supervision | $f_2$, (short) Tone 2. |
| Long Positive (on point) | Close Supervision | $f_2$, (long) Tone 1. |
| Long Negative (on point) | Trip Supervision | $f_2$, (long) Tone 2. |
| Positive (on point) | Metering | $f_2$, Tone 1. |

FROM CONTROL OFFICE

| | Purpose | |
| --- | --- | --- |
| Long Negative | Reset and Start from normal. | $f_1$, long Tone 2. |
| Short Negative and Long Positive | Start from point | $f_1$, Tone 2 (short); Tone 1 (long). |
| Short Positive | Odd Steps | $f_1$, Tone 1 (short). |
| Short Negative | Even Steps | $f_1$, Tone 2 (short). |
| Two Short Negatives | Close Code—Even Point. | $f_1$, Tone 2 (short) (Twice). |
| Three Short Negatives | Trip Code—Even Point. | $f_1$, Tone 2 (short) (Three Times). |
| Short Negative and Short Positive | Close Code—Odd Point. | $f_1$, Tone 2 (short); Tone 1, (short). |
| Short Negative and Two Short Positives. | Trip Code — Odd Point. | $f_1$, Tone 2 (short); Tone 1 (short) (Twice). |

*Conclusion*

The synchronous supervisory remote control system which has been described in the foregoing is operable to effect accurate and reliable control in an extremely expeditious manner of a series of remotely disposed apparatus units. Particularly important in the achievement of the improved type control system is the provision of a novel signalling arrangement which is simplex and reliable in structure and which is sufficiently flexible to lend itself to use with direct current or alternating current type signalling.

In addition to the novel signalling arrangement the system includes new and improved signal responsive equipment which is capable of providing supervisory telemetering, and control functions over a two wire system with a minimum of equipment. As a result of such ability the equipment is more economical in use and additionally is comparable in utility to control systems of the direct selection type.

Speed of operation is a particularly noteworthy feature of the system, the equipment being operative to check fifty points in as little as five seconds. Such speed of operation is particularly desirable in installations in which selective telemetered indications must be frequently checked at each of the points. In addition to providing the foregoing features, the equipment is of a comparatively simplex structure which lends itself to ready and simple maintenance whereby upkeep of the equipment is accomplished by power fieldmen having a minimum of special training.

Finally, the inherent check and guard signalling features which are incorporated in the operating arrangement tends to provide a system which is extremely reliable and accurate in its operation and which may be safely used in the control of any type of known installations.

The provision of a system having these many inherent qualities and features is believed to be a definite advancement in the field of supervisory control which should prove particularly advantageous to those who are needful of medium sized supervisory systems.

Various other features of the invention which are believed to be new are set forth in the accompanying claims.

We claim:

1. In a synchronous supervisory control system having at least a first and second station which are interconnected by a single signal channel, a series of points at each of said stations, apparatus units at each of said points of said second station which are operable to several different operating positions or conditions, selection means at each station for stepping over each of the points thereat in a given sequence, signal control means at said first station for effecting the synchronized operation of said selection means at each station, transmitting means at said second station operative with engagement of each point by said selection means in its advancement over said points to transmit a single condition indicating and synchronizing revertive signal to said control means at said first station and indicating means at said first station for reporting the condition of the apparatus units as represented by said revertive signals.

2. In a synchronous supervisory control system having at least a first and second station which are interconnected by a single signal channel, a series of points at each of said stations, apparatus units at each of said points of said second station which are operable to several different operating positions or conditions, selection means at each station for stepping over each of the points thereat in a given sequence and seizing said points as desired for operation of the unit thereat, signal control means at said first station for effecting the synchronized operation of said selection means at each station, transmitting means at said second station operative with engagement of each point by said selection means in its advancement over said points to simultaneously transmit a condition indicating and synchronizing reverted signal to said signal control means at said first station, check means at said first station operative to prevent further stepping of said signal control means pending receipt of a revertive signal with advancement to a point in said stepping, and indicating means at said first station for reporting the condition of the apparatus units as represented by said revertive signals.

3. In a synchronous supervisory control system having a control station and at least one substation which are interconnected by a two-wire signal channel, a series of points at each of said stations, apparatus units at each of said points of said second station which are operable to several different positions, selection means at each station for stepping over each of the points thereat in a given sequence and seizing points thereof as desired for control of the apparatus units associated therewith, signal control means at said first station for effecting synchronized operation of said selection means at both stations to select the points in a given sequence, indicating means at said points at each of said stations operable to indicate the particular position to which the associated apparatus unit is operated, transmitting means at said substation operative with engagement of each point by said selection means in its advancement over said points to transmit a single condition indicating and synchronizing revertive signal to signal control means at said first station, said signal being determined by the position of said apparatus unit thereat as represented by the associated substation indicating means, and signal responsive means at said control station operative responsive to receipt of said signal to effect energization of the local point indicating means in accordance with the apparatus position denoted by the received signal.

4. In a synchronous supervisory control system having a control station and at least one substation interconnected by a two-wire signal channel, a series of points at each of said stations, apparatus units at each of said points of said second station which are operable to several different positions, selection means at each station for stepping over each of said points in a given sequence, control signalling means at said first station for applying stepping signals to said channel to effect operation of said selection means at both stations in synchronization, said stepping signals being different for alternate stepping signal transmissions to prevent out of synchronism stepping, transmitting means at said second station operated with engagement of each point by said selection means in its sequential advancement over said points to transmit a single position representative and synchronizing revertive signal to said control signalling means at said first station, said position representative signals being of the same characteristics as said alternate stepping signals, the character of the position representative signal in each case being determined by the position of the substation indicating means at the point selected, synchronizing check means for preventing advancement of the equipment to a further point pending receipt of a revertive signal following advancement to the previous point, and signal responsive means for energizing the control station indicating means in accordance with the nature of the received revertive signal.

5. In a synchronous supervisory control system having at least a first and second station which are interconnected by a two-wire signal channel, a series of points at each of said stations, apparatus units at each of said points of said second station which are operable to several different operating positions or conditions, selection means at each station for stepping over each of the points thereat in a given sequence, signal control means at said first station for effecting the synchronized operation of said selection means at each station, transmitting means at said second station operative with engagement of each point by said selection means in its sequential advancement over said points to simultaneously transmit a condition indicating and synchronizing revertive signal to said control means at said first station, local indicating means at said points at said first station for indicating the operated condition of the apparatus unit at the associated point, and signal comparing means for comparing the position indicated by said local indicating means with the position indicated by said received signal and for conforming said local indicating means thereto in the event of variance therebetween.

6. In a synchronous supervisory control system having at least a first and second station which are interconnected by a two-wire signal channel, a series of points at each of said stations, apparatus units at each of said points of said second station which are operable to several different operating positions or conditions, selection means at each station for stepping over each of the points thereat in a given sequence, signal control means at said first station for effecting the synchronized operation of said selection means at each station, transmitting means at said second station operative with engagement of each point by said selection means in its sequential advancement over said points to transmit simultaneously a single condition indicating and synchronizing revertive signal to said signal control means at said first station, synchronizing check means operative to prevent further stepping of said signal control means pending receipt of said revertive signal following stepping of each successive point, local indicating means at said points at said first station for indicating the operated condition of the apparatus unit at the associated point, signal comparing means for comparing the position indicated by said local indicating means with the position indicated by said received signal and for conforming said local indicating means thereto in the event of variance therebetween, and circuit control means controlled by said signal comparing means to prevent the further operation of said signal control means pending the conforming of said point indicating means with said received signal.

7. In a synchronous supervisory control system having at least a first and second station which are interconnected by a two-wire signal channel, a series of points at each of said stations, apparatus units at each of said points of said second station which are operable to several different operating positions or conditions, selection means at each station for stepping over each of the points thereat in a given sequence and seizing said points as desired for functional purposes, signal control means at said first station for effecting the synchronized operation of said selection means at each station, transmitting means at said second station operative with engagement of each point by said selection means in its sequential advancement over said points to transmit a single condition indicating and synchronizing revertive signal to said signal control means at said first station, check means operative to prevent further stepping of said signal control means pending receipt of said revertive signal with the advancement to each point, local indicating means at said points at said first station for indicating the operated condition of the apparatus unit at the associated point, signal comparing means for comparing the position indicated by said local indicating means with the position indicated by said received signal and for conforming said local indicating means thereto in the event of variance therebetween, and alarm means arranged to be energized responsive to the detection of a variance between the position indicated locally and the position indicated by the received signal.

8. In a synchronous supervisory control system having a control station and at least one substation interconnected by a two-wire parallel line circuit, a series of points at each of said stations, apparatus units at each of said points of said second station which are operable to several different positions, selection means at each station for stepping over each of said points in a given sequence, control signalling means at said first station for applying stepping signals to said channel over a parallel line circuit to effect operation of said selection means at both stations in synchronization, said stepping signals being of a positive polarity in effecting stepping to an odd numbered point and being of a negative polarity in effecting stepping to an even numbered point, all relay switching and indicating means at each of said control and substation points operable to indicate the particular position to which the associated apparatus unit is operated, transmitting means at said second station operated with engagement of each point by said selection means in its sequential advancement over said points to transmit a single condition indicating and synchronizing revertive signal to said signal control means at said first station, said position representative signal being alternatively of a positive or a negative polarity as determined by the position of the substation indicating means, synchronous check means operative to prevent further stepping by said signal control means pending receipt of said revertive signal with advancement to each point, and signal responsive means for energizing the control station indicating means in accordance with the nature of the received signal.

9. In a synchronous supervisory control system having a control station and at least one substation interconnected by a two-wire signal channel, a series of points at each of said stations, apparatus units at each of said points of said second station which are operable to several different positions, selection means at each station for stepping over each of said points in a given sequence, control signalling means at said first station for applying stepping signals to said channel to effect operation of said selection means at both stations in synchronization, indicating means at each of said control and substation points operable to indicate the particular position to which the associated apparatus unit is operated, transmitting means at said second station operated with engagement of each point by said selection means in its sequential advancement over said points to transmit a condition indicating and synchronizing revertive signal to said signal control means at said first station, said condition indicating signal being of negative polarity to indicate one of said apparatus positions and being of a positive polarity to indicate another of said apparatus positions.

10. In a synchronous supervisory control system having at least a first and second station which are interconnected by a signal channel over which only signals of a common genus are transmitted, supervisory means at said second station for normally applying a supervisory signal of said genus to said channel, and alarm means at said first station arranged to be operated responsive to interruption of said supervisory signal by the occurrence of a fault on said channel, a series of points at each of said stations, apparatus units at each of said substation points which are operable to several different operating positions or conditions, selection means at each station for stepping over each of said points thereat in a given sequence, signal control means at said first station for effecting synchronized operation of said selection means at each of said stations, said signal control means at said first station being operative to transmit operative signals of said common genus to said second station with said supervisory signal on said channel, transmitting means at said second station operative with engagement of each point by said selection means in its advancement over said points to transmit a single condition indicating and synchronizing revertive signal to said signal control means at said first station, said signal being representative of the position of the apparatus unit at the selected point, synchronizing check means operative to prevent further stepping by said signal control means pending receipt of a revertive signal following advance- which are interconnected by a two wire signal points at said first station for indicating the information taught by said revertive signal.

11. In a synchronous supervisory control system having at least a first and second station which are interconnected by a two-wire signal channel, supervisory means at said second station for normally applying a supervisory signal of a predetermined polarity to said channel, associate supervisory means at said first station arranged to be normally energized responsive thereto and alarm means arranged to be operatively controlled by said associate supervisory means responsive to interruption of said supervisory signal by the occurrence of a fault on said channel, apparatus units at each of said second station points which are operable to several different operating positions or conditions, selection means at each station for stepping over each of said points thereat in a given sequence, signal control means at said first station for effecting synchronized operation of said selection means at each of said stations, said signal control means at said first station being operative to transmit initial operating signals to said second station of a different polarity than said supervisory signal whereby said first station may signal said second station even with the existence of normal line supervision, transmitting means at said second station for transmitting a position-representative revertive signal over said same two wire signal channel to said first station as each point is selected in said sequential advancement, said signal being representative of the position of the apparatus unit at the selected point and being of the same order as said operating signals which are transmitted by said signal control means to effect synchronized operation of the selection means at each of the stations, synchronizing check means operative to prevent further stepping of said signal control means pending receipt of said revertive signal following advancement to each point and indicating means at said first station points for indicating the information taught by said revertive signals.

12. In a synchronous supervisory control system having at least a first and second station which are interconnected by a signal channel, supervisory means at said second station for normally applying a supervisory signal to said channel, and alarm means at said first station operated responsive to interruption of said supervisory signal by the occurrence of a fault in said channel, apparatus units at each of said second station points which are operable to several different operating positions or conditions, selection means at each station for stepping over each of said points thereat in a given sequence, signal control means at said first station for effecting synchronized operation of said selection means at each of said stations, said signal control means at said first station being operative to transmit initial operating signals to said second station with said supervisory signal on said channel, and step preparing means at said second station operated responsive to receipt of said initial operating signal to remove said supervisory signal from said channel, transmitting means at said second station for transmitting a position representative revertive signal over said two-wire channel to said first station as each point is selected in said stepping operation, said signal being representative of the position of the apparatus unit at the selected point, and indicating means at said points at said first station for indicating the information taught by said revertive signals.

13. In a synchronous supervisory control system having at least a first and second station which are interconnected by a single signal channel and in which each of said stations includes means for connecting the equipment thereat to a source of operating potential which is local thereto, a series of points at each of said stations, apparatus units at each of said points of said second station which are operable to several different operating positions or conditions, selection means at each station for selecting each of the points thereat in a given sequence, signal control means at said first station for applying stepping signals to said single channel to effect the synchronized operation of said selection means at each station, transmitting means at said second station for transmitting a revertive signal over said single signal channel to said first station as each point is selected which signal is representative of the condition of the apparatus unit at the selected point, indicating means at said first station for reporting the condition of the apparatus units as represented by said revertive signals, and potential responsive means for effecting operation of said signal control means and the stepping over of each of the system points responsive to the loss and subsequent restoration of a given one of said sources of energizing potential at either of said stations, whereby any change of position of said apparatus which occurs during the period that the system is incapacitated is immediately discovered with system reenergization.

14. In a synchronous supervisory control system having at least a first and second station which are operatively connected by a communication link, a series of points at each of said stations, apparatus units at each of said points of said second station which are operable to several different operating positions or conditions, selection means at each station for stepping over each of the points thereat in a given sequence, signal control means at said first station operative with said link to effect the synchronized operation of said selection means at each station, transmitting means at said second station operative with engagement of each point by said selection means in its sequential advancement over said points to transmit a single condition indicating and synchronizing revertive signal to said signal control means at said first station, said revertive signal having a given variable characteristic which in its nature is representative of the particular condition of the apparatus unit at the selected point, synchronizing check means operative to prevent further stepping by said signal control means pending receipt of said revertive signal following advancement to each point and indicating means at said first station for reporting the condition of the apparatus units as represented by said revertive signals.

15. In a synchronous supervisory control system having at least a first and second station which are operatively connected by a signal channel, a series of points at each of said stations, apparatus units at each of said points of said second station which are operable to several different operating positions or conditions, selection means at each station for stepping over each of the points thereat in a given sequence, signal control means at said first station operative over said channel to effect the synchronized operation of said selection means at each station, transmitting means at said second station for transmitting a revertive signal over said link to said first station as each point is selected in said stepping operation, said revertive signal having a given variable characteristic which in its nature is representative of the particular condition of the apparatus unit at the selected point, indicating means at said first station for reporting the condition of the apparatus units as represented by said revertive signals, synchronous check means operative to prevent further stepping of said signal control means pending receipt of a revertive signal following advancement to each point, alarm generating means at said second station for effecting transmission of one of said revertive signals as lengthened as a selection initiating signal over said signal channel to said first station, and signal responsive means at said first station for initiating operation of said signal control means thereat responsive to receipt of said selection initiating signal.

16. In a synchronous supervisory control system having at least a first and second station which are operatively connected by a single communication path, a series of points at each of said stations, apparatus units at each of said points of said second station which are operable to several different operating positions or conditions, selection means at each station for stepping over each of the points thereat in a given sequence, signal control means at said first station operative over said link for effecting the synchronized operation of said selection means at each station, transmitting means at said second station for transmitting an indication of the position of the unit at each point as selected in said stepping operation, indicating means at said first station for reporting the condition of the apparatus units as represented by said received indications, and alarm generating means at said second station operative responsive to the automatic change of position of an apparatus unit to effect transmission of one of said revertive signals as lengthened as a selection initiating signal over said single path to said first station for initiating operation of said signal control means.

17. In a synchronous supervisory control system having at least a first and second station which are operatively connected by a single communication path, a series of points at each of said stations, apparatus units at each of said points of said second station which are operable to several different operating positions, selection means at each station for stepping over each of the points thereat in a given sequence, signal control means at said first station for effecting the synchronized operation of said selection means at each station, transmitting means at said second station for transmitting a revertive position indicating signal over said path to said first station as each point is selected, said revertive signal having a particular characteristic which is varied in accordance with the condition of the apparatus unit at the selected point, indicating means at said first station for reporting the condition of the apparatus units as represented by said revertive signals, and alarm operating means at said second station operative responsive to the automatic change of position of an apparatus unit during the period of a selecting operation to record said change of position and to transmit a selection initiating signal to said first station over said path subsequent to the accomplishment of the effective selection operation.

18. In a synchronous supervisory control system having at least a first and second station which are operatively connected by a communication link, a series of points at each of said stations, apparatus units at each of said points of said second station which are operable to several different operating positions or conditions, selection means at each station for stepping over each of the points thereat in a given sequence, signal control means at said first station operative over said link to effect the synchronized operation of said selection means at each station, transmitting means at said second station for transmitting a revertive signal over said link to said first station as each point is selected in paid stepping operation, said revertive signal having a given characteristic which is varied in accordance with the particular condition of the apparatus unit at the selected point, indicated means at said first station for reporting the condition of the apparatus units as represented by said revertive signals, and alarm generating means for effecting the transmission of a selection initiating signal over said link to said first station, said alarm generating means comprising a normally charged condenser connected in series with an alarm recording relay, circuit means for connecting said condenser-relay combination to each of said second station points, means at each of said points for completing a momentary discharge circuit to said condenser over said circuit means responsive to a given change of position of one of said apparatus units, means for completing an operating circuit for said relay in series with said condenser to effect recharging thereof after said discharge and means controlled by said relay in its operation to initiate said alarm signal transmission.

19. A supervisory system as set forth in claim 18 in which each second station point includes means for completing an energizing circuit over said circuit means to said alarm recording relay independent of said condenser in response to another given change of position of the associated apparatus unit.

20. In a synchronous supervisory control system having at least a first and second station which are operatively connected by a communication link, supervisory means at said second station for normally applying a supervisory signal to said channel, and associate supervisory means at said first station operated responsive to interruption of said supervisory signal to attract the attendant's attention, a series of points at each of said stations, apparatus units at each of said second station points which are operable to several different operating positions or conditions, selection means at each station for selecting each of said points thereat in a given sequence, signal control means at said first station operative over said link for effecting synchronized operation of said selection means at each of said stations, transmitting means at said second station for transmitting a position-representative revertive signal over said channel to said first station as each point is selected, which signal is representative of the position of the apparatus unit at the selected point, indicating means at said points at said first station for indicating the apparatus positions taught by said revertive signals, and alarm generating means at said second station for effecting the transmission of a selection initiating signal over said link to said first station with a change of position of one of said apparatus units and for simultaneously interrupting the transmission of said supervisory signal at said second station whereby the attendant is informed by the associate supervisory means that a circuit operation has occurred at the substation even though the selection initiating signal might be lost in transmission.

21. In a synchronous supervisory control system having a control and a substation which are operatively connected by a single communication path, a series of points at each of said stations, a circuit breaker at certain of said substation points which are operable to an open and a closed position, selection means at each station for stepping over each of the points thereat in a given sequence, signal control means at said control station operative over said path to effect the synchronized operation of said selection means at each station, transmitting means at said substation operative with engagement of each point by said selection means in its advancement over said points to simultaneously transmit a single condition indicating and synchronizing revertive signal to said first station, said revertive signal having a polarity which is determined by the particular condition of the apparatus unit at the selected point, indicating means at said control station for reporting the condition of the apparatus units as represented by said revertive signals, synchronizing check means operative to prevent further stepping of said signal control means pending receipt of said revertive signal following movement to each point, and signal generating means at said substation for initiating operation of said signal control means over said path responsive to the automatic opening or closing of a circuit breaker whereby any change of position at the substation is immediately reported at the control station.

22. A supervisory system as set forth in claim 21 which includes point control means which are operated by the tripping of a closed breaker at an effective point followed by automatic reclosure thereof to effect operation of said signal generating means for the period of two cyclings of the selection equipment, said revertive signal transmitted as the effective point is selected during the first of said cycles being indicative of a circuit breaker in the tripped condition and said revertive signal transmitted during the second of said cycles being indicative of a circuit breaker in the closed position.

23. A supervisory system as set forth in claim 21 which includes point control means which are operated by the automatic closure of a circuit breaker at an effective point to effect operation of said signal generating means for a period sufficient to effect two cyclings of the selection equipment, said revertive signal transmitted for the effective point during the first of said cycles indicating a tripped circuit breaker and said revertive signal transmitted for the effective point during the second of said cycles indicating a closed circuit breaker thereat.

24. A supervisory system as claimed in claim 21 which includes point control means which are operated by the automatic closure of a breaker at an effective point followed by an automatic trip of that breaker to effect the energization of said signal generating means for a period sufficient to effect one cycling of said selection equipment, said revertive signal transmitted for the effective point during said cycle being indicative of a tripped breaker at that point.

25. In a synchronous supervisory control system having at least a first and second station which are operatively connected by a single communication path, a series of points at each of said stations, apparatus units at each of said points of said second station which are operable to several different operating positions or conditions, selection means at each station for selecting each of the points thereat in a given sequence, signal control means at said first station operative over said link to effect the synchronized operation of said selection means at each station, point selection means at each of said first station points for effecting energization of said signal control means to seize the associated point for control purposes, transmitting means at said second station for transmitting a revertive signal over said link to said first station as each point in the sequence prior to the desired point is selected, said revertive signal being operative to effect further operation of said selection means and having a variable characteristic which in its nature is representative of the particular condition of the apparatus unit at the point engaged, indicating means at said first station for reporting the condition of the apparatus units as represented by said revertive signals, and stopping means at said first station for terminating the point selection operation as the point associated with the operated one of said selection means is seized.

26. In a synchronous supervisory control system having at least a first and second station which are operatively connected by a single communication link path, a series of points at each of said stations, apparatus units at each of said points of said second station which are operable to several different operating positions or conditions, selection means at each station for selecting each of the points thereat in a given sequence, signal control means at said first station operative over said given path to effect the synchronized operation of said selection means at each station, point selection means at each point which are operative to energize said signal control means and effect seizure of its associated point for control purposes, transmitting means at said second station for transmitting a revertive signal over said path to said first station as each point is selected, said revertive signal effecting a further selecting operation with each transmission and having a variable characteristic which in its nature is representative of the particular condition of the apparatus unit at that point, indicating means at said first station for reporting the condition of the apparatus units as represented by said revertive signals, and common control means at said first station which are effective over said path to operate the apparatus unit at the point which is seized by the operated point selection means to any one of its operable conditions.

27. In a synchronous supervisory control system having at least a first and second station which are operatively connected by a communication link, a series of points at each of said stations, apparatus units at each of said points of said second station which are operable to several different operating positions or conditions, selection means at each station for selecting each of the points thereat in a given sequence, signal control means at said first station operative over said link to effect the synchronized operation of said selection means at each station, point selection means at each point which are operative to energize said signal control means and effect seizure of its associated point for control purposes, transmitting means at said second station for transmitting a revertive signal over said link to said first station as each point is selected, said revertive signal effecting a further selecting operation with each transmission and having a variable characteristic which in its nature is representative of the particular condition of the apparatus unit at that point, indicating means at said first station for reporting the condition of the apparatus units as represented by said revertive signals, and common control means at said first station which are effective on operation to transmit coded operating impulses to operate the unit at the point seized for control to any one of its operable positions, different ones of the control means being operated to effect operation of the unit to different positions, each of said control means being operative to effect transmission of a code signal different from the other in their operation, and each of said control means effecting transmission of a different control code in accordance with the place in the sequence which is assigned to the seized point.

28. In a synchronous supervisory control system having a control station and a substation which are operatively connected by a communication link, a series of points at each of said stations, circuit breaker units at each of said substation points which are operable to several different operating positions, selection means at each station for selecting each of the points thereat in a given sequence, signal control means at said control station operative over said link to effect the synchronized operation of said selection means at each station, transmitting means at said substation for transmitting a revertive signal over said link to said control station as each point is selected, said revertive signal having a given variable characteristic which in its nature is representative of the particular condition of the apparatus unit at the selected point, indicating means at said first station for reporting the position of the circuit breaker units as represented by said revertive signals, point selection means at each control station point effective in operation to cause said station selection means to seize the associated point for control purposes, and common trip and close control means for effecting the control of said breakers, said trip control means effecting in operation the transmission of a given code over said link whenever the seized point is an even number in the sequence and a second code whenever the seized point is an odd number, said close control means effecting on operation the transmission of a third given code whenever the seized point is even and the transmission of a fourth code whenever the seized point is odd.

29. In a synchronous supervisory control system having at least a first and second station which are operatively connected by a single channel, a series of points at each of said stations, certain of said points at said second station having metering and apparatus units thereat, said units being operable to several different operating positions or conditions, selection means at each station for selecting each of the points thereat in a given sequence, signal control means at said first station operative over said channel to effect the synchronized operation of said selection means at each station, point selection means at each point for effecting the seizure of the associated point by said selection means for supervisory and control purposes, meter control means at said certain points for automatically effecting instantaneous application of metered indications of the point to the channel whenever one of said metering points is seized for supervisory and control purposes by operation of the associated point selection means, and common control means at said first station effective in operation to interrupt said metering indications on said channel and effect a control operation of the apparatus unit at the seized point.

30. A synchronous control system as set forth in claim 29 in which said channel is a two-wire channel and in which the metering indications are transmitted as direct current pulses of one polarity and in which the control operation comprises the transmission of a code of direct current pulses, the portion of said code which effects the termination of the metering indications being of opposite polarity to the metering pulses.

31. In a synchronous supervisory control system having at least a first and second station which are operatively connected by a two wire communication link, a series of points at each of said stations, a first group of said points having only metering equipment thereat, a second group of said points having only an apparatus unit thereat which is operable to several different operating positions or conditions, and a third group having both apparatus units and metering equipment thereat, selection means at each station for selecting each of the points thereat in a given sequence, signal control means only at said first station operative over said link to effect the synchronized operation of said selection means at each station, point selection means at each point for effecting the operation of said selection means to seize its associated point for supervisory and control purposes, means associated with said points in said first and third groups for effecting application of metered indications over said link to said first station with seizure thereof responsive to operation of its associated selection means, and common control keys for effecting operation of the apparatus unit associated with the points in the second and third groups with the seizure of one of such points for supervisory or control purposes.

32. In a synchronous supervisory control system having at least a first and second station which are operatively connected by a communication link, a series of points at each of said stations, apparatus units at each of said points of said second station which are operable to several different operating positions or conditions, selection means at each station for selecting each of the points thereat in a given sequence, signal control means at said first station operative over said link to effect the synchronized operation of said selection means at each station, transmitting means at said second station for transmitting a revertive signal over said link to said first station as each point is selected, said revertive signal having a given variable characteristic which in its nature is representative of the particular condition of the apparatus unit at the selected point, indicating means at said station for reporting the condition of the apparatus units as represented by said revertive signals, point selection means at each point at said first station for effecting seizure of its associated point for supervisory and control purposes and recycling control means at said first station common to each of said point selection means operative to control the continuation of the selection operation from a point which has been seized for supervisory and control purposes and controlling same to reselect each of the points in the system after selection of the remaining points in the sequence, whereby any changes of condition of the apparatus units which occurred during the period of point seizure will be detected.

33. A supervisory system as claimed in claim 32 which includes circuit preparing means for conditioning the equipment for a further stepping operation, said preparing means requiring a comparatively long period of energization to be effective, and in which said recycling control means effects the transmission of a code comprising at least one pulse of comparatively long duration to effect the energization of said circuit preparing means for said predetermined period, whereby the improper initiation of the selection operation from a point by transient impulses is substantially eliminated.

34. In a synchronous supervisory control system having at least a first and second station which are operatively connected by a communication link, a series of points at each of said stations, apparatus units at each of said points of said second station which are operable to several different operating positions or conditions, selection means at each station for selecting each of the points thereat in a given sequence, signal control means at said first station having a normal rest position operative over said link to effect the synchronized operation of said selection means at each station, reset means operative to initiate operation of said signal means and selection of each of said points, transmitting means at said second station for transmitting a revertive signal over said link to said first station as each point is selected, said revertive signal having a given variable characteristic which in its nature is representative of the particular condition of the apparatus unit at the selected point, and indicating means at said first station for reporting the condition of the apparatus units as represented by said revertive signals, means for seizing a point and bringing the equipment to rest thereon, said reset means being also effective when operated with said equipment resting on a point to effect restoration of the equipment to its normal position without passing over the remaining points in the sequence.

35. In a synchronous supervisory control system having at least a first and second station which are operatively connected by a single signalling path, a series of points at each of said stations, apparatus units at each of said points of said second station which are operable to several different operating positions or conditions, selection means at each station for selecting each of the points thereat in a given sequence, signal control means at said first station operative over said path to effect the synchronized operation of said selection means at each station, point selection means including a point selection key at each point for effecting seizure of its associated point, means for releasing said equipment from a seized point, said selective means being normally operative to step over the remaining points in the sequence and thereafter over each of the system points, and reset means including a reset key for releasing said equipment from a seized point, said system operative responsive to operation of said reset key and operation of a point selection key for a point prior in sequence to said seized point, to restore to normal and recycle to the point associated with the operated selection key.

36. In a synchronous supervisory control system having at least a first and second station which are operatively connected by a two-wire channel, each station having a polarized relay which is arranged to be connected to said channel at various times in the operation of the system, a series of points at each of said stations, apparatus units at each of said points of said second station which are operable to several different operating positions or conditions, indicating means at each of said points of said first station which are operable to indicate the position of the unit at the associated second station point, selection means at each station for selecting each of the points thereat in a given sequence, and signal control means at said first station for transmitting stepping signals to said local selection means and over said two-wire channel to said polarized relay at said second station, said second polarized relay being operative responsive thereto to control operation of the second station selection means whereby synchronized operation of the selection means at the two stations is effected, transmitting means at said second station for transmitting a revertive signal over said link to said first station as each point at said second station is selected, said signal control means effecting connection of said polarized relay at said first station to said link after each transmittal of a stepping pulse, and being controlled to operate to transmit a succeeding stepping impulse thereafter only responsive to operation of said polarized line relay by a revertive pulse.

37. A synchronous system as claimed in claim 36 in which said signal control means effect the transmission of direct current signals of alternate polarities for alternate transmission to prevent out of step operation of the stations and in which said revertive signal is a direct current signal having a polarity which is determined by the position of the unit at the point selected as the revertive signal is transmitted.

38. A synchronous supervisory system as claimed in claim 36 in which said signal control means includes only two stepping relays which are operative to effect transmission of the stepping pulses, one of which is operative as the equipment steps to an even numbered point in the sequence and the other of which is operative as the equipment steps to an odd numbered point in the sequence, said one relay effecting the transmission of pulses of a negative polarity and said other relay effecting the transmission of pulses of a positive polarity.

39. A supervisory control system as claimed in claim 36 which includes transmitting preparing means at said second station for preparing said transmitting means for operation responsive to receipt of the stepping signal and in which said transmitter means are shunted by such stepping signal to prevent operation thereof until the stepping signal is completed, said signal control means being prepared to transmit a succeeding stepping signal responsive to receipt of the revertive signal and being shunted by said revertive signal to prevent operation thereof until the revertive signal is complete.

40. A supervisory control system as claimed in claim 36 in which said revertive signal transmitted by said means at said second station is indicative of the condition of the apparatus at each point as engaged and which includes means at said first station for comparing the indication of unit position provided by each revertive signal with the indications registered at the corresponding control station point, said last means being operative to also shunt said signal control means to prevent transmission of a succeeding stepping signal thereby whenever the registered and received indications are at variance and to interrupt said shunt as the indications are conformed.

41. In a synchronous supervisory control system having at least a first and second station which are operatively connected by a communication link, a series of points at each of said stations, apparatus units at each of said points of said second station which are operable to several different operating positions or conditions, selection means at each station for stepping over each of the points thereat in a given sequence, signal control means at said first station operative over said link to prepare the system for operation by effecting the transmission of a start from normal signal and to transmit stepping signals thereafter to effect the synchronized operation of said selection means at each station, transmitting means at said second station for transmitting a revertive signal over said link to said first station as each point is selected in said stepping operation, said revertive signal having a given variable characteristic which in its nature is representative of the particular condition of the apparatus unit at the selected point, and indicating means at said first station for reporting the condition of the apparatus units as represented by said revertive signals, said signal control means being operative to transmit a succeeding stepping signal only with receipt of a revertive signal responsive to a previous stepping signal.

42. A supervisory control system as set forth in claim 41 in which said system is arranged to respond only to a preparatory start from normal signal of a comparatively long duration, whereby false system operation by transient pulses is minimized.

43. In a synchronous supervisory control system having at least a first and second station which are operatively connected by a communication link, a series of points at each of said stations, apparatus units at each of said points of said second station which are operable to several different operating positions or conditions, selection means at each station for stepping over each of the points thereat in a given sequence, signal control means only at said first station for transmitting alternating current signals over said link to effect the synchronized operation of said selection means at each station, transmitting means at said second station for transmitting an alternating current revertive signal over said link to said first station as each point is selected in said stepping operation, said revertive signal having a given variable characteristic which in its nature is representative of the particular condition of the apparatus unit at the selected point, and indicating means at said first station for reporting the condition of the apparatus units as represented by said revertive signals.

44. A synchronous supervisory control system as set forth in claim 43 in which the means for sending and receiving said operating and said revertive signals over said link comprise a carrier transmitter and a pair of signal tone generators at said first station for transmitting a first frequency modulated alternatively by a first and second tone signal, a carrier receiver and tone responsive units at said second station for responding to said first carrier as modulated by said tone signals, a carrier transmitter and a first and second tone generator at said second station for transmitting a second carrier modulated by a first and second tone signal, and a carrier receiver and tone responsive means at said first station for responding to said second carrier frequency as modulated by said first and second signal tones.

45. In a synchronous supervisory control system having at least a first and second station which are operatively connected by a communication link, a series of points at each of said stations, apparatus units at each of said points of said second station which are operable to several different operating positions or conditions, selection means at each station for stepping over each of the points thereat in a given sequence, signal control means at said first station operative over said link to effect the synchronized operation of said selection means at each station, transmitting means at said second station operative with engagement of each point by said selection means in its advancement over said points to transmit simultaneously a condition indicating and synchronizing revertive signal to said signal control means at said first station, said revertive signal having a given variable characteristic which in its nature is representative of the particular condition of the apparatus unit at the selected point, synchronizing check means operative to prevent further stepping of said signal control means pending receipt of said revertive signal with advancement of the equipment to each point and indicating means at said first station for reporting the condition of the apparatus units as represented by said revertive signals, said system being operative to step over a set of fifty points in approximately five seconds.

46. In a synchronous supervisory control system having at least a first and second station which are operatively connected by a two wire communication link, a series of points at each of said stations, apparatus units at each of said points which are operable to several different operating positions, control means for effecting the transmission of signals of a single given genus between said stations, and signal responsive means at each station operative responsive thereto to effect the selection of each of the points at the two stations in synchronization, to provide an indication of the condition of the apparatus at each point with each engagement thereof in the synchronized contacting operation, to effect seizing of a desired point, and to effect control of the apparatus at the points as seized.

47. In a synchronous supervisory control system having at least a first and second station which are operatively connected by single communication path, a series of points at each of said stations, apparatus units at each of said points of said second station which are operable to several different operating positions or conditions, selection means at each of said stations for stepping over each of the points thereat in a given sequence, signal control means at said first station for transmitting direct current signals over said link to effect the synchronized operation of said selection means at each station, transmitting means at said second station for transmitting a direct current condition indicating and synchronizing signal over said link to said first station as each point is selected in said stepping operation, and indicating means at said first station for reporting the condition of the apparatus units as represented by said revertive signals.

48. In a synchronous supervisory control system having at least a first and second station which are operatively connected by a communication link, a series of points at each of said stations, apparatus units at each of said points of said second station which are operable to several different operating positions or conditions, each of said points having only two relays associated therewith, selection means at each of said stations for stepping over each of the points thereat in a given sequence, and for seizing the points thereat as desired for functional purposes, and circuit control means controlled by said two relays at each point as seized to provide point selection, trip control, close control, metering, trip indication, close indication, automatic trip indication, automatic close indication for the apparatus at its associated point.

49. In a synchronous supervisory control system having at least a first and second station which are operatively connected by a communication link over which line supervision is normally provided, a series of points at each of said stations, apparatus units at each of said points which are operable to several different operating positions, and control means for transmitting direct current signals between said stations to provide line supervision, synchronized stepping over each of the points at each station, indicating signals during said stepping to provide an indication at one station of the positions of the apparatus at the points of the other station, seizure of a point as desired, and movement of said apparatus at a seized point to its several positions under control of said one station; said signals for line supervision comprising the application of a signal of positive polarity to the line by said second station, a start from point signal in initiating stepping comprising a signal of short negative polarity followed by a signal of long positive polarity; a start from normal and reset signal consisting of a signal of long negative polarity; a signal for operating said apparatus at an even point in said sequence to one position comprising two short negative pulses and to a second position comprising three signals of short negative polarity; a signal for moving the apparatus on an odd point in said sequence to a first position comprising a signal of negative polarity for a short period followed by a signal of positive polarity for a short period, and a signal for moving the odd point apparatus to a second position, comprising a signal of a negative polarity applied for a short period followed by two positive polarity signals of short duration, and in which metered indications of the apparatus at a point is accomplished by the transmission of positive polarity indications.

50. In a synchronous supervisory control system having at least a first and second station which are operatively connected by a communication link, a series of points at each of said stations, apparatus units at each of said points of said second station which are operable to several different operating positions or conditions, selection means at each of said stations for stepping over each of the points thereat in a given sequence, and signal control means for transmitting signals over said link to effect the synchronized operation of said selection means at each station, said signal control means including transmitting means at said first station for transmitting signals of alternate polarity for each successive step, transmitting means at said second station for transmitting a revertive synchronizing signal over said link to said first station as each point is selected in said stepping operation, and control apparatus at said first station operative to transmit one set of polarity code signals to effect control of the apparatus at a seized point which is an even number in the sequence and a second set of polarity code signals responsive to seizure of an odd numbered point in said sequence.

51. In a synchronous supervisory control system having at least a first and second station which are operatively connected by a communication link, a series of points at each of said stations, apparatus units at each of said points of said second station which are operable to several different operating positions or conditions, selection means at each of said stations having a normal rest position and being adapted to step over each of the points thereat in a given sequence and for selecting a point thereat as desired, signal control means at said first station for transmitting signals over said link to initiate stepping from said normal position and the synchronized operation of said selection means at each station over said points, stopping at a point, and restepping from said point, said signal for stepping from said normal position comprising a signal of negative polarity of a comparatively long duration, and a signal for stepping from a point comprising a signal of negative polarity for a short duration followed by a signal of positive polarity for a long duration.

52. An arrangement as set forth in claim 41 which includes means for seizing each of said points as desired, and in which said signal control means is operative to transmit close-code signals to effect control of apparatus at a seized point which comprises a pair of signals separated by an interval of a given length, and in which said signal control means is operative to transmit a reset signal followed by a stepping signal, the duration of the reset signal being appreciably longer than the combined time duration of the first signal of said pair and said interval, the time of termination of the reset signal and the initiation of the stepping signal being substantially coincident.

53. An arrangement as set forth in claim 41 in which said signal control means are operative to transmit a start from point signal comprising application of a relatively short negative pulse, followed immediately by the application of a relatively long positive pulse; a stepping-to-odd-point signal comprising application of a relatively short positive pulse; a stepping-to-even-point signal comprising application of a relatively short negative pulse; a first control signal whenever said equipment is at rest on an odd point comprising application of a relatively short negative pulse and two relatively short positive pulses separated by given time intervals; and a second control signal whenever said equipment is at rest on an odd point comprising application of a relatively short negative signal and a relatively short positive signal separated by a given time interval.

54. A control system as set forth in claim 26 which includes means for causing said transmitting means to transmit signals while standing on a point which are representative of the particular condition of the apparatus unit at that point, and which are of a nature to have precedence over such signals as are simultaneously transmitted by said common control means at said first station.

References Cited in the file of this patent

UNITED STATES PATENTS

| Number | Name | Date |
|---|---|---|
| 1,632,106 | Zogbaum | June 14, 1927 |
| 1,674,127 | Bellamy | June 19, 1928 |
| 1,714,973 | White et al. | May 28, 1929 |
| 1,726,131 | Wensley et al. | Aug. 27, 1929 |
| 1,740,487 | White | Dec. 24, 1929 |
| 1,740,556 | White | Dec. 24, 1929 |
| 1,765,474 | White | June 24, 1930 |
| 1,765,475 | White et al. | June 24, 1930 |
| 1,806,262 | Moreau et al. | May 19, 1931 |
| 2,059,896 | Oliver | Nov. 3, 1936 |
| 2,125,093 | White | July 26, 1938 |
| 2,128,812 | Fricke | Aug. 30, 1938 |
| 2,135,794 | Burns | Nov. 8, 1938 |
| 2,298,907 | Stewart | Oct. 13, 1942 |
| 2,314,692 | Derr | Mar. 23, 1943 |
| 2,398,572 | Baughman | Apr. 16, 1946 |